US012714217B2

(12) United States Patent
Soskic et al.

(10) Patent No.: US 12,714,217 B2
(45) Date of Patent: Aug. 25, 2026

(54) INTERREALITY COSMETICS FOR A SMART COSMETIC DEVICE SYSTEM

(71) Applicant: HUMANOID LABS, INC, Los Angeles, CA (US)

(72) Inventors: Sandra Soskic, Los Angeles, CA (US); Pia Hunter, San Francisco, CA (US); Kristina Brown, Los Angeles, CA (US); Priyanka Kanse, Los Angeles, CA (US); Brett Wedewer, Los Angeles, CA (US); Kendra Iverson, Los Angeles, CA (US); Christine Van Rossum, Los Angeles, CA (US)

(73) Assignee: HUMANOID LABS, INC, Los Angeles, CA (US)

( * ) Notice: Subject to any disclaimer, the term of this patent is extended or adjusted under 35 U.S.C. 154(b) by 349 days.

(21) Appl. No.: 18/219,700

(22) Filed: Jul. 9, 2023

(65) Prior Publication Data

US 2024/0065420 A1 Feb. 29, 2024

Related U.S. Application Data

(60) Provisional application No. 63/402,405, filed on Aug. 30, 2022, provisional application No. 63/402,396, (Continued)

(51) Int. Cl.

*A45D 44/00* (2006.01)
*G06T 13/40* (2011.01)
*G06T 19/00* (2011.01)

(52) U.S. Cl.

CPC ............ *A45D 44/005* (2013.01); *G06T 13/40* (2013.01); *G06T 19/006* (2013.01); *A45D 2044/007* (2013.01)

(58) Field of Classification Search

CPC A45D 44/005; A45D 2044/007; G06T 13/40; G06T 19/006

See application file for complete search history.

(56) References Cited

U.S. PATENT DOCUMENTS 6,168,590 B1 1/2001 Neev
10,885,697 B1 * 1/2021 Viswanathan ............ G06T 7/44
(Continued)

OTHER PUBLICATIONS

Lulus, How-To: 3, 5 & 10 Minute Makeup Tutorial, Apr. 8, 2014, Lulus.com, pp. 1-3, at https://www.lulus.com/blog/beauty/ lulus-how-to-3-5-10-minute-makeup-tutorial/ (last visited Sep. 26, 2025) (Year: 2014).

*Primary Examiner* — Steve Rowland
(74) *Attorney, Agent, or Firm* — FP; Sikander M. Khan

(57) ABSTRACT

A system for the processing of one or more makeup look recommendations for the recommendation of a respective output makeup look recommendation, wherein the respective output makeup look recommendation is renderable in a particular rendering environment (e.g., physical world, augmented reality world, or a metaverse virtual reality world). The system allows for iterative generation of makeup look recommendations within a single rendering environment (e.g., generating new physical world makeup look recommendations from previously user-selected physical world makeup look recommendations) or interreality feedback loop generation of makeup look recommendations within a plurality of rendering environments (e.g., generating a new physical world makeup look recommendation from previously user-selected augmented reality makeup look recommendations.

20 Claims, 22 Drawing Sheets
(18 of 22 Drawing Sheet(s) Filed in Color)

Related U.S. Application Data filed on Aug. 30, 2022, provisional application No. 63/402,400, filed on Aug. 30, 2022.

(56) References Cited

U.S. PATENT DOCUMENTS 11,069,094 B1 * 7/2021 Evangelista ............ G06T 11/60
11,315,173 B2 * 4/2022 Sartori Odizzio . G06Q 30/0643
11,580,682 B1 * 2/2023 Luo ........................ G06V 20/20
12,315,090 B1 * 5/2025 Suresh .................. G06V 20/20
2002/0024528 A1 * 2/2002 Lambertsen ....... G06Q 30/0601 345/646
2003/0063794 A1 * 4/2003 Rubinstenn ............ A61B 5/446 382/154
2003/0065525 A1 * 4/2003 Giacchetti ............ A61B 5/7264 705/1.1
2004/0110113 A1 * 6/2004 Huang ................... G09B 19/00 434/100
2007/0167204 A1 * 7/2007 Lyle ...................... A63F 13/655 463/9
2010/0160849 A1 6/2010 Barbour
2016/0128919 A1 * 5/2016 Sveine .................. A45D 40/30 401/268
2016/0143422 A1 * 5/2016 Yamanashi ............. G06T 11/60 345/634
2017/0256084 A1 * 9/2017 Iglehart .................. G06V 40/16
2018/0075523 A1 * 3/2018 Sartori Odizzio . G06Q 30/0623
2019/0066348 A1 * 2/2019 Jennings .............. G06V 40/165
2019/0213908 A1 7/2019 Besen et al.
2020/0196937 A1 6/2020 Gopalan
2020/0305579 A1 10/2020 Yang et al.
2021/0019926 A1 1/2021 Hwang et al.
2021/0307484 A1 10/2021 Gouchtchina et al.
2021/0407181 A1 12/2021 Charraud et al.
2022/0007813 A1 1/2022 Spinelli et al.
2022/0031229 A1 2/2022 Lewis et al.
2022/0101418 A1 * 3/2022 Dehtiarov .............. H04N 7/157
2022/0101566 A1 * 3/2022 Boscolo .................. G06F 3/011
2022/0202168 A1 * 6/2022 Troutman ............... G06T 11/00
2022/0207802 A1 * 6/2022 Troutman .............. G06N 3/045
2022/0215463 A1 * 7/2022 Sartori Odizzio .. G06F 3/04845
2022/0240650 A1 8/2022 Malaprade et al.
2023/0066846 A1 3/2023 Kelley et al.
2025/0017355 A1 1/2025 Charraud

* cited by examiner

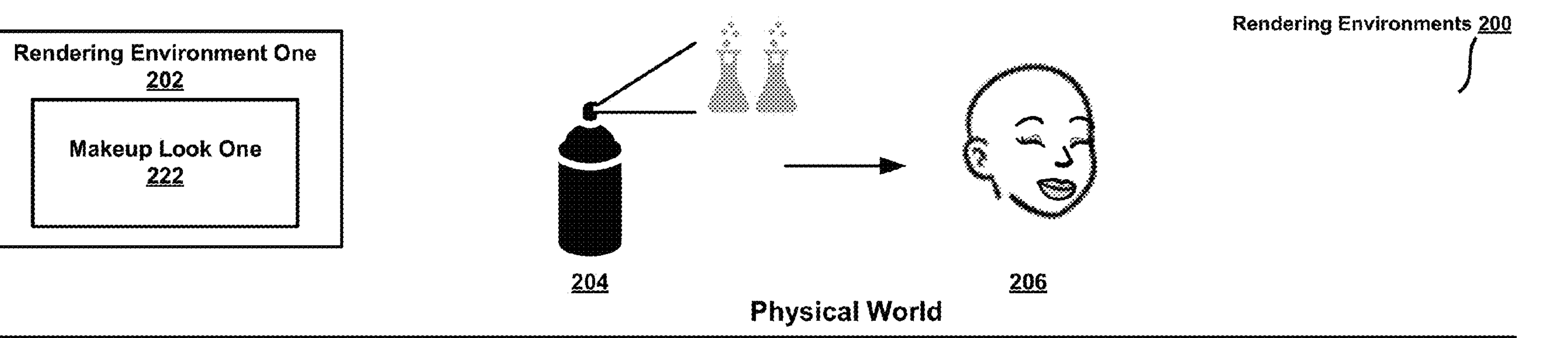
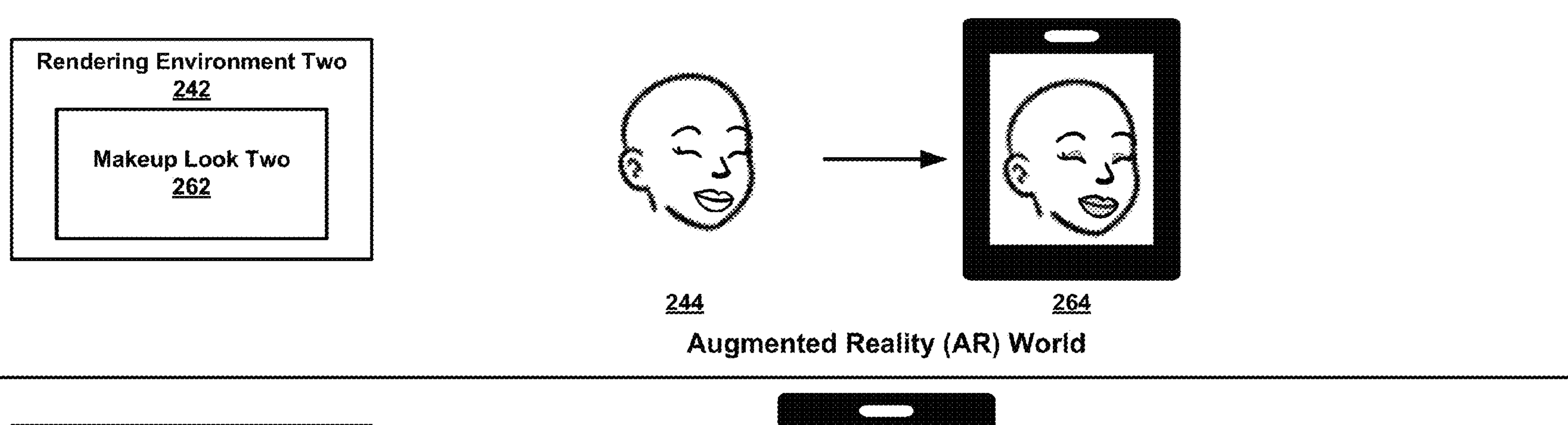
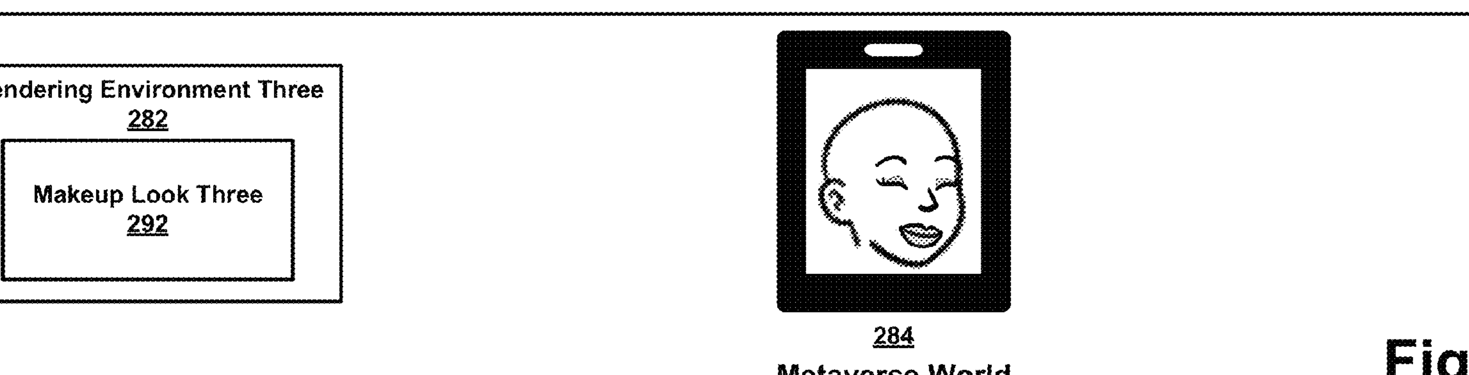
Figure 2

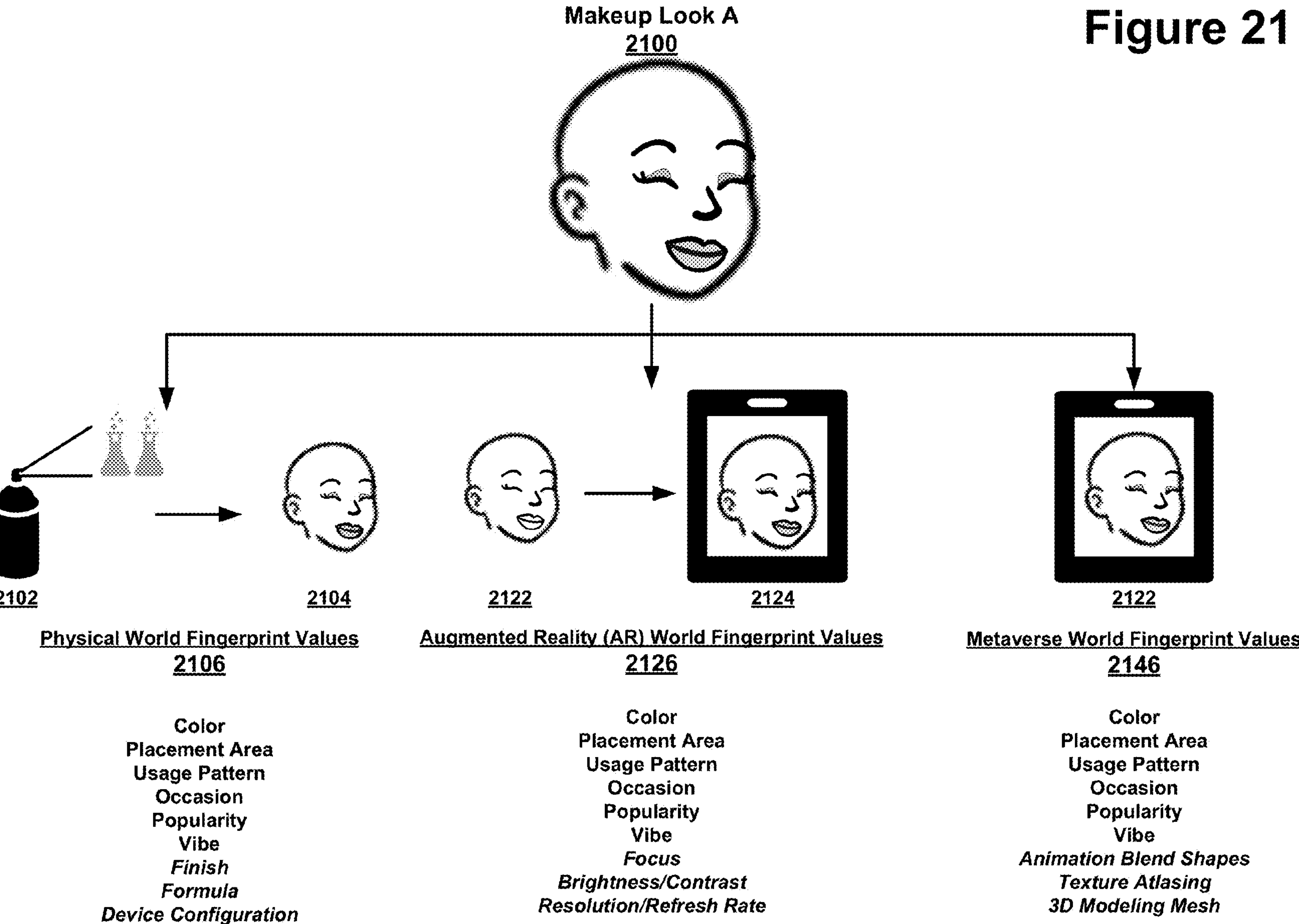
Makeup Look A
2100
Figure 21
2102
2104
2122
2124
2122
Physical World Fingerprint Values
2106
Color
Placement Area
Usage Pattern
Occasion
Popularity
Vibe
Finish
Formula
Device Configuration
Augmented Reality (AR) World Fingerprint Values
2126
Color
Placement Area
Usage Pattern
Occasion
Popularity
Vibe
Focus
Brightness/Contrast
Resolution/Refresh Rate
Metaverse World Fingerprint Values
2146
Color
Placement Area
Usage Pattern
Occasion
Popularity
Vibe
Animation Blend Shapes
Texture Atlasing
3D Modeling Mesh

INTERREALITY COSMETICS FOR A SMART COSMETIC DEVICE SYSTEM

PRIORITY APPLICATIONS

This U.S. Nonprovisional Patent Application claims the benefit of and priority to the following applications, which are incorporated by reference for all purposes as if fully set forth herein:

U.S. Provisional Patent Application No. 63/402,396, titled "SMART COSMETIC DEVICE SYSTEM," filed Aug. 30, 2022;

U.S. Provisional Patent Application No. 63/402,400, titled "MAKEUP RECOMMENDATION SYSTEM FOR A SMART COSMETIC DEVICE SYSTEM," filed Aug. 30, 2022; and U.S. Provisional Patent Application No. 63/402,405, titled "INTERREALITY COSMETICS FOR A SMART COSMETIC DEVICE SYSTEM," filed Aug. 30, 2022.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks.

CONTEMPORANEOUSLY FILED NONPROVISIONAL APPLICATIONS INCORPORATED BY REFERENCE

The following contemporaneously filed applications are incorporated by reference for all purposes as if fully set forth herein:

U.S. Nonprovisional Patent Application No. 18/219,698 titled "SMART COSMETIC DEVICE SYSTEM," filed on Jul. 9, 2023; and U.S. Nonprovisional Patent Application No. 18/219,699 titled "MAKEUP RECOMMENDATION SYSTEM FOR A SMART COSMETIC DEVICE SYSTEM," filed on Jul. 9, 2023.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Makeup application is a complex field of art requiring both sufficient knowledge and technical skill. A broad range of makeup application techniques and styles exist, often requiring a time-consuming exploration process to learn a repertoire of makeup looks. A combination of technical innovation within the field of cosmetic products and the rise of accessibility to educational information on makeup application via Internet resources has led to an overwhelming cosmetic landscape, particularly for an average layperson without professional training. Experimentation with cosmetic products is time- and cost-intensive, typically without any option for the consumer to know the outcome of product application until time and cost have already been spent, leading to frustration and waste.

Furthermore, even once a makeup routine has been established with consumer-preferred cosmetic products, the makeup application process is still exceedingly time-consuming. A consumer may search through dozens of makeup look tutorials or inspiration posts on social media and entertainment resources to find a makeup look that fits their desired outcome and available cosmetic products. The process of applying makeup requires close study of a tutorial or inspiration photo (often looking at similar steps repeatedly to grasp the intricacies of replicating a technique fully), trial and error of technique replication, and finding the correct applicator tools, or adequate substitutions for the proper applicator tools, out of a plethora of applicator options. Despite one's best effort, following a makeup routine may not achieve desired results due to vague instructions, challenging techniques, lack of available requirements, or facial differences between an online model and the consumer.

A wide variety of cosmetic products are available to reduce barriers to accessible makeup application. Cosmetic substances with tone-matching chemistry, such as skin tone match foundation and pH-sensitive lipstick, aim to simplify the makeup selection process by creating universally flattering makeup. These products are rare, limited in range, and often primarily cater to fair skin tones. Novel application technologies include airbrush machines, intelligent makeup assistants (e.g., personalized cosmetic substance dispensing systems, cosmetic devices with Internet of Things (IoT) capability for makeup application tracking), and educational software such as smartphone applications with tutorial content. Only a subset of these technologies are available to laypeople compared to professional makeup artists, and predominantly fail to address more than a niche fraction of the overall makeup accessibility dilemma. Historically, the cosmetic landscape lacks a comprehensive smart makeup application system that fully addresses accessibility and efficiency of each step of the makeup application process.

An opportunity arises to implement AI-driven cosmetics in the metaverse, resulting in an improved consumer experience.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 2 expands upon the concept of makeup look rendering environments introduced in FIG. 1.

FIG. 21 is an illustration of makeup look fingerprint features corresponding to different rendering environments.

DETAILED DESCRIPTION

Figure 1:
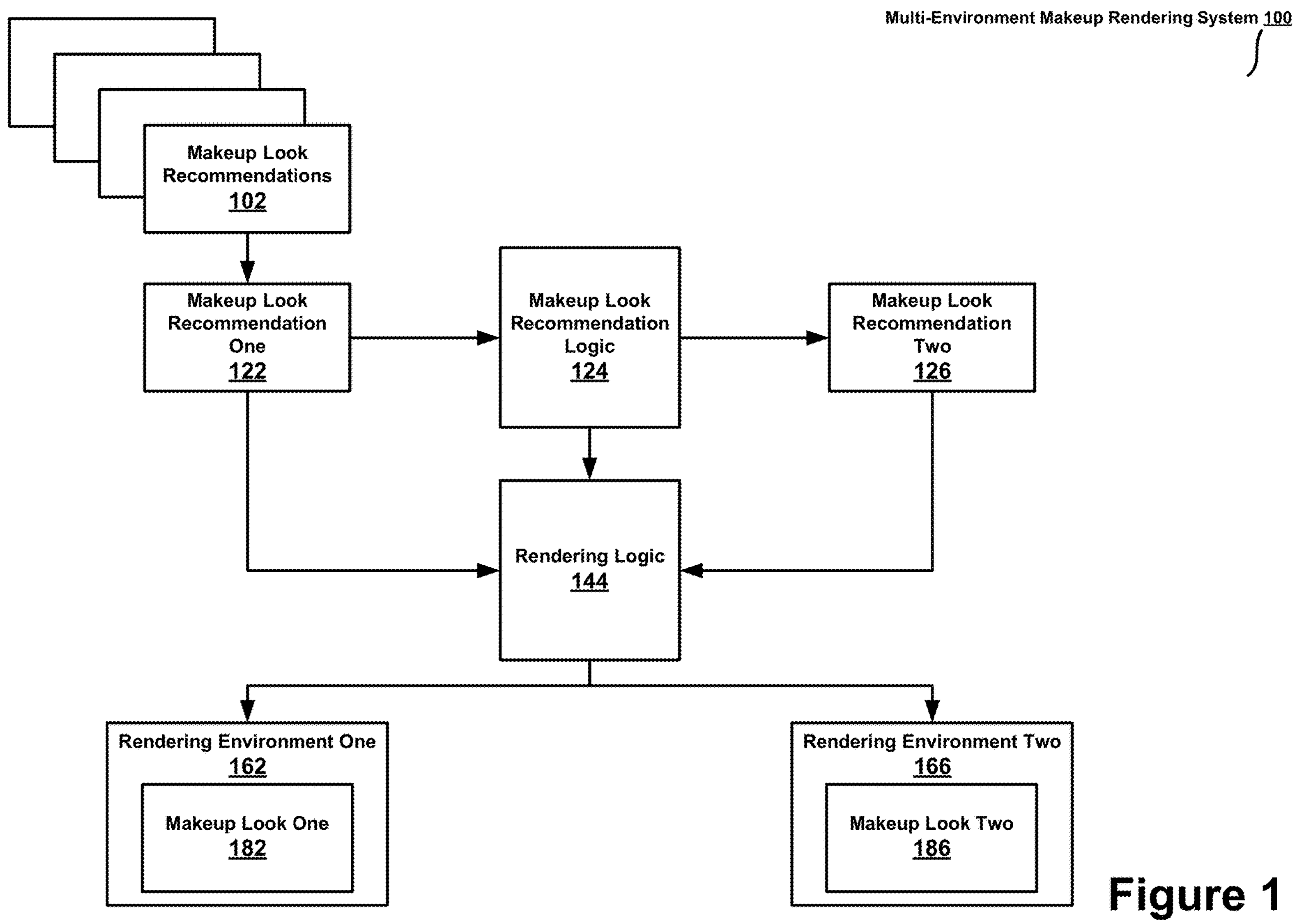
FIG. 1 is a flow diagram of a multi-environment makeup rendering system.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

The technology disclosed can improve the user experience for cosmetic application. The technology disclosed achieves this goal by improving the efficiency of the recommendation, selection, and application of makeup looks through artificial intelligence and mixed reality technologies. The smart cosmetic delivery system's collaborative interface provided to a user introduces a heightened degree of cosmetic skill previously unavailable to the average consumer, as well as a novel method of digital integration of a consumer's beauty persona.

The beauty industry grew from USD 483 billion in 2020 to USD 511 billion in 2021, and with a global annual compounded growth rate of 4.75%, the industry is predicted to expand to USD 716 billion by 2025, per Reports Global. Expansion of the beauty sector has invited innovation in the forms of educational material, inclusivity (e.g., market audience diversification, environmental awareness, and a new focus on health and safety), and technological advancement.

In particular, the cosmetics industry (demonstrating a growth rate of +32% in segment revenue within the beauty industry) has introduced a swath of novel developments aggregating research advances in biology and technology. For instance, beauty brands have leveraged hardware advancements such as near-range communication and "smart home" technology to allow for deeper integration of a user's personal cosmetic application experience with online resources, as well as software advancements such as augmented reality (AR) and machine learning prediction integration for digital platforms to further increase the personalization of the cosmetic application experience.

Of note, artificial intelligence models are increasingly popular for beauty applications. The use of an artificial intelligence model for beauty recommendations may be advantageous to a user for various reasons, including, but not limited to, accessibility to high-quality beauty products and information from home, cost-effective product selection, and streamlined cosmetic application. Artificial intelligence programs can be implemented to advise a user on makeup decisions for a particular skin type, color scheme, or boldness level. A user skilled in the art will appreciate that skin type, color scheme, and boldness level are listed explicitly as examples, and a wide range of additional features may be implemented for training purposes of a beauty-targeted artificial intelligence model. Moreover, an artificial intelligence model (e.g., deep learning) as compared to other data analytics offers more advanced trend analysis to better leverage the behavioral history of a particular user. The technology disclosed comprises an artificial intelligence model trained to predict suitable makeup look recommendations for a user in response to user-specific behavioral history data across an interreality system comprising a plurality of rendering environments, user-input assessments, and data trends from a plurality of users within a given demographic.

In some implementations of the technology disclosed, the makeup look recommendation system is a classification model (e.g., discriminant analyses, regression, decision trees, neural networks, and so on). In other implementations of the technology disclosed, the makeup look recommendation system is a form of cluster analysis (e.g., hierarchical clustering, K-means, density-based spatial clustering of applications with noise (DBSCAN), and so on). In yet other technology implementations disclosed, other pattern recognition analyses may be implemented, such as ensemble learning (e.g., boosting, bagging, and so on), Bayesian networks, or Markov random fields. In any of the implementations mentioned above, neural networks and deep learning may be applied as decision-making tools in ensemble models with additional classification models.

A makeup look recommendation comprises a wide range of descriptive features corresponding to the rendering (e.g., application and implementation), visualization (e.g., color scheme, complexity, and placement areas), or interpretation (e.g., aesthetic vibe, appropriate occasions, and social media trending patterns) of the particular makeup look. These features may be combined into a feature vector to be processed as input for a makeup look recommendation system. Each respective feature is weighted by a respective feature importance, where the magnitude of a feature importance value proportionally relates to the influence a respective feature has on the output of the makeup look recommendation system. Feature importance weights can be learned by a machine learning model, or they may be manually edited. Thus, a makeup look recommendation system may be configured to process inputs with a larger weight on a particular feature within a plurality of features (e.g., prioritizing color in a generated makeup look recommendations over aesthetic vibe). The resulting model allows for a heightened accessibility to makeup ideas and inspiration, regardless of a user's cosmetic knowledge or skill set.

A countless number of cosmetic products and cosmetic applicators exist on the market. A typical makeup routine for a full-face makeup look can take a large array of tools to complete skin coverage, eye, and lip makeup application. The option of a multifunctional cosmetic device that saves time, space, money, and user effort is highly appealing to a consumer. The majority of cosmetic products and cosmetic applicators are frequently single-function items (e.g., a cosmetic substance used exclusively as lipstick or a brush that is used solely for facial contouring).

The narrow range of functionality for cosmetic products stems from their specialization for a particular placement area upon the face or a specific application style. Cosmetic products and applicators for skin complexion coverage come in a plethora of options. Primer, concealer, foundation, and contour products may come in a gel, liquid, powder, or cream format with infinite target functions (e.g., oil control, hypoallergenic, degree of coverage, moisturizing, sun protection, et cetera) and are typically applied in layers. Each layer will have a respective cosmetic product and one or more corresponding applicators (e.g., brushes, sponges, and fingerprints), wherein cosmetic product instructions are often ambiguous, and applicators are used in combination. A typical makeup user may own over a dozen skin complexion coverage cosmetic products (e.g., one or more of a primer, tinted moisturizer, under-eye concealer, blemish concealer, foundation, cheek contour product, nose contour product, blush, bronzer, highlighter, and so on) and one or more corresponding applicators.

Other cosmetic products follow a similar trend. Eye makeup, lip makeup, and niche products such as acne care, eyebrow grooming, or special event cosmetic products are more complex than skin complexion coverage cosmetic products. Furthermore, cosmetic products and applicators are disposable or of limited use. Curating a collection of cosmetic products is energy-intensive, high cost, and storage-intensive. The technology disclosed comprises many implementations of a comprehensive cosmetic device and cosmetic product application system wherein a single applicator can apply a broad range of cosmetic products to a wide range of placement areas. The cosmetic device is an Internet of Things (IoT) device functioning as a multi-use cosmetic applicator and a smart applicator capable of communicating with a computer system to produce personalized makeup recommendations, tutorials, and a detailed cosmetic history for a user.

The IoT is an ecosystem of interconnected, uniquely-identified computers, mechanical and digital devices, or other objects that possess the ability to transfer data over a network to other IoT devices. Any object that can be assigned an Internet Protocol (IP) address and transfer data over a network is considered an IoT device, also referred to as a "smart device." Users may interact with the IoT ecosystem, but human intervention is not required for IoT device function. IoT devices employ embedded systems to acquire, transmit, and respond to data from their environments; wherein data is transmitted to a cloud server accessible to the other IoT devices within the IoT ecosystem (or a subset of the IoT ecosystem) via connection to an edge gateway (e.g., via Bluetooth or another proprietary protocol). The technology disclosed may serve as a single IoT device (i.e., a particular cosmetic device of a particular configuration) connected to a mobile IoT app (i.e., a mobile device application responsible for regulating the IoT ecosystem) or as a network of two or more IoT devices (i.e., a first cosmetic device of a first particular configuration, a second cosmetic device of a second particular configuration, and so on).

In addition to modulation of IoT device function and collection of data, mobile IoT applications can enhance IoT systems by providing trend analysis, artificial intelligence prediction, ambient intelligence features, and additional IoT analytics tools. IoT analytics processes may be carried out on a cloud server or locally on an endpoint. Data acquired by IoT device sensors can be analyzed by real-time, predictive, and descriptive analytics.

Combined, these analyses offer valuable insight into usage trends that inform predictive and recommendation services offered to a user, leading to an enhanced user experience. Artificial intelligence models can "learn" trends from sensor data collected by an IoT device (i.e., the model is trained). The trained model can be used to predict future outputs (i.e., the model is tested). For instance, an IoT cosmetic device may collect data about a user's usage history, where each usage instance is a data observation and each measured property of an instance is a feature (e.g., frequency of device usage, the pattern of use, the volume of cosmetic substance dispensed, the color of cosmetic substance dispensed, and so on). An artificial intelligence model may be trained on the cosmetic device usage history of a particular user to predict desirable makeup look recommendations for the particular user. Artificial intelligence, as well as other predictive analytics such as data mining and regression modeling, may be used in combination with descriptive analytics (e.g., trend analysis of cosmetic substance color selections over eight weeks of usage history data) and real-time analytics (e.g., recommendation of makeup looks realized by a particular color in response to the cosmetic device detecting a loaded cartridge containing the cosmetic substance of the particular color).

In addition to artificial intelligence features, IoT devices provide enhanced user experience due to their capacity for ambient intelligence. Ambient intelligence builds upon existing artificial intelligence and sensor technology to process input from the surrounding environment and output an appropriate, relevant response. IoT devices utilize ambient intelligence processes to present personalized, contextually-specific responses to a user. Technologies such as close-range communication (e.g., Bluetooth, near-field communication, radio frequency identification, and so on), biometrics, and sensors (e.g., accelerometers, photodetectors, proximity sensors, and other devices designed to respond to a physical phenomenon) augment and interact with artificial intelligence processes to provide highly-personalized responses to external stimuli and improve user experience. As an example, an IoT cosmetic device may offer suggestions for bold makeup looks in response to detecting a cartridge containing a red cosmetic substance or provide suggestions for makeup looks of a specific intricacy (e.g., a makeup look that can be completed in five minutes) based on a user's usage history at a particular time of day.

The challenge of recommending highly-personalized makeup looks for a particular user involves high-dimensional big data analysis. As a result, machine learning algorithms are well-suited to identify patterns within cosmetic user data, compare a particular user's preferences with a plurality of other users within the user's demographic (e.g., processing aggregated data describing usage patterns of users aged 18-24 to produce makeup look recommendations for a single particular user aged 19), and predict a makeup look recommendation for a particular user in response to processing the particular user's input data (e.g., usage history, user-specified features, and so on).

Artificial intelligence models are frequently implemented with the goals of increasing accessibility, decreasing barriers to resources, and improving quality of life. An opportunity arises to implement such technologies within the field of cosmetics to overcome the time-complexity and ability-related barriers for the average consumer.

The boundaries between the internet and the physical world continue to become less defined as we progress into the Web3 era. Web3 generally describes a new iteration of the internet based on decentralized technology (primarily, blockchain). Web3, as compared to prior frameworks Web2 (centralized web applications focused on user creation of content) and Web1 (centralized web applications focused on user consumption of content), allows for decentralized autonomous organizations (DAOs), decentralized finance (DeFi), and other blockchain technologies. The resulting benefits include self-sovereign identities for users, increased data security, scalability, and privacy.

Web3 platform development strongly influences the advancement of three-dimensional, immersive virtual worlds collectively described as the metaverse. The metaverse comprises VR simulation of experiences such that a user may join a virtual environment as an avatar image and interact with the virtual world. The metaverse may also occasionally be described as a combination of VR and AR technology; however, the inclusion or exclusion of AR technology is often use-case specific. In the technology disclosed, the use cases of VR and AR are often non-overlapping (e.g., a user may apply makeup looks to their VR avatar to interact with other users on a social network, whereas the user may apply makeup looks via an AR filter to test a makeup look before physical world application).

For much of the history of cosmetic application, makeup products have been limited in accessibility and range of customizable options for the consumer. Despite wide popularity, products are often limited by financial, demographic, educational, and time limitations. Cosmetics can become quite expensive, exacerbated by the necessity for a wide range of individual products and applicators that are frequently single-use only. Previously, beauty products (of note, but not limited to, makeup) have been limited in marketing and representation to women-particularly, fair-skinned women. While the diversity of product availability has improved, minority demographics may experience a higher degree of difficulty finding personalized educational content.

Moreover, a discrepancy often exists between the makeup looks available to the average consumer compared to makeup looks represented in the media by celebrities and social media influencers. Defining looks of a current beauty standard may only be realized with the proper combination of professional training, financial freedom, and product availability. While the rise of Internet resources has substantially improved this dilemma (e.g., YouTube tutorials, Instagram and Pinterest "beauty inspo," activism campaigns for inclusive cosmetics, and so on), creating a genuinely accessible cosmetics environment requires a multi-faceted approach.

One could consider the barriers to cosmetic application in the following stages: research, purchase, consumption, and presentation. The typical makeup consumer performs substantial research before purchasing a cosmetic product, as the cosmetic landscape has grown exponentially in terms of available products (e.g., formulation, brand, desired effect, affordability, and so on). The research process is time-consuming and limited by prior knowledge (i.e., advanced information can be challenging to access without proper guidance or information provided by previous experience). Moreover, very few centralized resources exist. As a result, a makeup consumer can quickly become overwhelmed by the range of information scattered across countless websites, magazines, film and music media, and interpersonal sharing of anecdotes. Once the consumer selects a desired product or aesthetic, obtaining the required components can be inconvenient and complex. The consumer must identify a supplier, additional required tools and applicators, compatibility requirements with other products, and instructional material for the selected product—guidance material for each listed component may be ambiguous or subjective to a particular audience.

Realization of a desired makeup look can take many iterations of trial-and-error attempts. Users may follow tutorials (which are not personalized and may-or-may-not be directed towards the user's specific racial or gender demographic), free-hand experiment, or pay for professional guidance to achieve their desired final result. Consumers often find that their initially selected cosmetic products or applicators do not sufficiently meet their needs for their desired aesthetic or determine that their desired aesthetic is unrealistic in terms of difficulty, financial cost, or time requirements. Following the realization of a makeup look, a user often intends to share their results with their social network. Beauty presentation has become increasingly digitalized during the 21$^{st}$ century in response to the rise of social media; notably, Generation Z (the demographic succeeding Millennials, generally considered to be born in 1997 onward) is defined by their deep integration within the digital world and unique perspective on the importance of online presence. However, consumers of all ages may strongly prioritize and value the ability to present their achieved look, share their cosmetic knowledge and results, and connect with other cosmetic users.

The technology disclosed addresses current needs within the cosmetic industry by improving accessibility within each stage of the makeup application process. The technology disclosed comprises a comprehensive smart cosmetic device system configured to reduce barriers to the cosmetic application process's research, purchasing, consumption, and presentation components. A mobile device application comprising a database of makeup routines, a makeup look recommendation artificial intelligence model, Metaverse integration, and social networking services interfaces with one or more IoT cosmetic devices comprising a cosmetic substance cartridge and dispensing system. Collaboration between the makeup routine instructional tutorial within the application and the ergonomic, user-friendly cosmetic device allows for simple application of cosmetic products to achieve makeup looks of any complexity level, regardless of user experience.

The makeup look recommendation system provides a centralized database of makeup looks for a user, including a wide range of feature filters (e.g., complexity, aesthetic vibe, color components, and so on) and a corresponding routine tutorial for each look. Users receive highly-personalized makeup look recommendations as the makeup look recommendation system learns the user's preferences and behavioral history, significantly decreasing the time and energy required to identify desired makeup looks and aesthetics. The comprehensive nature of the system allows for a user to purchase the exact cosmetic substances and application tools to achieve each look, removing any need for extensive research or wasteful purchasing on behalf of the user. Moreover, corresponding augmented reality (AR), virtual reality (VR), and mixed reality (MR) components within the Metaverse application feature allow a user to experiment with new makeup looks without time- or cost-prohibitive barriers. Once a look has been applied, either upon the user's physical appearance or within the Metaverse, users can easily share their results with a broad social network within the mobile device application.

The technology disclosed describes various implementations of the cosmetic device and its functional components in further detail.

System Architecture

FIG. 1 is a flow diagram 100 of a multi-environment makeup rendering system. A set of makeup look recommendations 102 is presented toward a user, allowing the user to select a single makeup look recommendation to implement. In one implementation of the technology disclosed, makeup look recommendation one 122 is selected. Following the selection of makeup look recommendation one 122, makeup look recommendation 122 may be used as input for a rendering logic 144. The rendering logic 144 is responsible for instigating the implementation of a particular makeup look within a particular rendering environment. The implementation of a particular makeup look within a particular rendering environment is specific to that particular rendering environment (i.e., the method of implementation of a particular makeup look for a first rendering environment will be different from the method of implementation of the particular makeup look for the second rendering environment). The rendering logic 144 processes makeup look recommendation 122 to generate an output of makeup look one 182 within rendering environment one 162. In some implementations of the technology disclosed, a presentation logic is configured to present one or more makeup look recommendations to a user for selection prior to the rendering logic 144; however, this presentation logic component is not shown in the makeup look recommendation system drawings for simplicity.

In some implementations of the technology disclosed, makeup look recommendation one can also be processed as input for makeup look recommendation logic 124 in addition to rendering logic 144. The makeup look recommendation logic 124 processes user behavioral data as input to generate one or more makeup look recommendations to present toward a user. In one implementation of the technology disclosed, this input comprises one or more makeup look recommendations a user has previously or currently selected in one or more rendering environments. In other implementations of the technology disclosed, this may also be a descriptive feature of the makeup look (e.g., color, aesthetic vibe, and so on) or a descriptive feature of the implementation process (e.g., a required tool or rendering environment). In yet another implementation of the technology disclosed, a combination of a plurality of input data sources can be processed as input for the makeup look recommendation logic 124.

In the example implementation shown within FIG. 1, makeup look recommendation logic processes makeup look recommendation one 122 as input to generate makeup look recommendation two 126 as output. A user skilled in the art will recognize that makeup look recommendation 122 may also be a makeup look recommendation two 126 may also be used as an input for rendering logic 144 to instigate the implementation of makeup look two 186 within rendering environment two 166. Rendering environment one 162 and rendering environment two 166 share at least one non-overlapping feature (e.g., belonging to a physical reality versus a virtual reality, such that a physical reality rendering environment comprises at least one feature determined by a chemical formula that does not exist as a feature for a virtual reality rendering environment whereas a virtual reality rendering environment comprises at least one feature determined by a CGI parameter that does not exist as a feature for physical reality).

The discussion now turns to a discussion of the described rendering environments in further detail. Note that "virtual reality (VR)" and "metaverse" are used interchangeably within this document.

FIG. 2 expands upon the concept of makeup look rendering environments introduced in FIG. 1. Makeup look one 222 is rendered within rendering environment 202. Rendering environment one 202 is a physical world reality. Thus, makeup look one 222 must be implemented using physical tools and cosmetic substances onto a user's appearance. In one implementation of the technology disclosed, makeup looks rendered within rendering environment one 202 (e.g., makeup look one 222) may be rendered using a cosmetic device 204. A person skilled in the art will appreciate that a wide range of cosmetic devices and applicators may be implemented to render a makeup look onto a user within the physical world (i.e., rendering environment one 202). In one implementation of the technology disclosed, the cosmetic device 204 is a spray canister that disperses pigmented cosmetic substances onto a user's appearance, such as a blue cosmetic substance applied to the eyes of user 206 and a pink cosmetic substance applied to the lips of user 206.

Makeup look two 262 is rendered within rendering environment two 242. Rendering environment two 242 is an AR world reality. Thus, makeup look two 262 can be implemented using an overlay filter projected onto an image or live video of the appearance of user 244, controlled by AR-specific features such as resolution and refresh rate. In one implementation of the technology disclosed, makeup looks rendered within rendering environment two 242 (e.g., makeup look two 262) may be rendered using a camera on a smart device 264. A person skilled in the art will appreciate that a wide range of sources of imagery (e.g., live camera image, photograph, video, and so on) may be used as input onto which an AR filter is overlaid. In comparison to makeup look one 222 on user 206, the AR filter displayed on smart phone 264 renders makeup look two 262 such that the AR makeup look two 262 is visually identical to the physical makeup look one 222. The image projected by smart phone 264 displays the face of user 244 with AR blue cosmetic substance applied to the eyes and pink cosmetic substance applied to the lips to give the appearance of a physical makeup look such as makeup look one 222. In contrast to makeup look one 222 being directly applied to the face of user 206, makeup look 262 is solely applied to the image of user 244 without changing the physical appearance of user 244 in the physical world.

In one implementation of the technology disclosed, makeup look two 262 possesses at least one non-overlapping, non-translatable feature with makeup look one 222. Translatable features between makeup look one 222 and makeup look two 262 may include color and placement area of a particular cosmetic. Non-translatable features between makeup look one 222 and makeup look two 262 may include formula or facial structure alteration for rendering environment one 202 or rendering environment two 242, respectively. Makeup look two 262 may contain a non-overlapping feature (e.g., bone structure alteration, skin smoothing, and so on) that is non-translatable to makeup look one 222; however, makeup look one 222 and makeup look two 262 are still clustered in the same category due to the proportion of overlapping features and high visual and aesthetic similarity.

In one implementation of the technology disclosed, the AR filter overlay projected on smart device 264 is created using image target methodology. In another implementation of the technology disclosed, the AR filter overlay projected on smart device 264 is created using plane detection methodology. In yet another implementation of the technology disclosed, the AR filter overlay projected on smart device 264 is created using depth sensoring methodology. In yet another implementation of the technology disclosed, the AR filter overlay projected on smart device 264 is created using motion tracking methodology. In yet another implementation of the technology disclosed, the AR filter overlay projected on smart device 264 is created using camera scene capture and advanced scene processing methodology. In some implementations of the technology disclosed, the AR filter overlay projected onto smart device 264 is compatible with existing AR packages and frameworks (e.g., ARKit, ARCore, LiDAR, and so on). A person skilled in the art will appreciate that a wide range of computer-generated imagery and mixed reality development methodologies exist and may be implemented in a number of combinations.

Makeup look three 292 is rendered within rendering environment three 282. Rendering environment three 282 is a metaverse world reality. Thus, makeup look three 292 can be implemented using a VR avatar (i.e., a user Humanoid), controlled by VR-specific features such as character mesh and animation blend. The VR avatar is customizable by the user and may contain a large plurality of adjustable features corresponding to the appearance, animation, and interactive components of the avatar. In one implementation of the technology disclosed, makeup looks rendered within rendering environment three 282 (e.g., makeup look three 292) may be rendered using a metaverse-integrated application on smart device 284. In some implementations of the technology disclosed, the avatar is designed to bear a resemblance to the user. In other implementations of the technology disclosed, the avatar is designed to possess one or more different qualities from the user (e.g., a different hair color, eye color, non-human or supernatural characteristics, and so on).

In comparison to makeup look one 222 and makeup look two 262, makeup look three 292 is rendered such that the VR makeup look three 292 is visually identical to the physical makeup look one 222 and the AR makeup look two 262. The avatar possesses blue cosmetic substance applied to the eyes of the avatar and pink cosmetic substance applied to the lips of the avatar. In contrast to makeup look one 222 and makeup look two 262, makeup look three 292 does not require interaction with the user's physical appearance. Whereas makeup looks rendered within rendering environment one 202 are applied to the user's face and makeup looks rendered within rendering environment two 242 are overlaid onto an image of the user's face, makeup looks within rendering environment 282 exist solely in the metaverse world.

In one implementation of the technology disclosed, makeup look three 292 possesses at least one non-overlapping, non-translatable feature with makeup look one 222. Translatable features between makeup look one 222 and makeup look two 262 may include color and placement area of a particular cosmetic. Non-translatable features between makeup look one 222 and makeup look three 292 may include formula or CGI animation for rendering environment one 202 or rendering environment three 282, respectively. Makeup look three 292 may contain a non-overlapping feature (e.g., unnatural eye color, animation effects and so on) that is non-translatable to makeup look one 222; however, makeup look one 222 and makeup look three 292 are still clustered in the same category due to the proportion of overlapping features and high visual and aesthetic similarity.

Likewise, in another implementation of the technology disclosed, makeup look three 292 possesses at least one non-overlapping, non-translatable feature with makeup look two 262. Translatable features between makeup look two 262 and makeup look three 292 may include color and placement area of a particular cosmetic. Non-translatable features between makeup look two 262 and makeup look three 292 may include depth sensoring or CGI animation for rendering environment two 242 or rendering environment three 282, respectively. Makeup look three 292 may contain a non-overlapping feature (e.g., non-human form of avatar, animation effects and so on) that is non-translatable to makeup look two 262; however, makeup look two 262 and makeup look three 292 are still clustered in the same category due to the proportion of overlapping features and high visual and aesthetic similarity.

In one implementation of the technology disclosed, the VR avatar within the metaverse-integrated application on smart device 284 is rendered using a polygon mesh 3D CGI representation. In another implementation of the technology disclosed, the VR avatar within the metaverse-integrated application on smart device 284 is rendered using a point cloud 3D CGI representation. In yet another implementation of the technology disclosed, the VR avatar within the metaverse-integrated application on smart device 284 is rendered using a voxelated 3D CGI representation. In some implementations of the technology disclosed, the VR avatar is compatible with, and transportable to, existing metaverse and Web3 packages and frameworks. A person skilled in the art will appreciate that a wide range of three-dimensional computer graphics and Web3 development methodologies exist and may be implemented in a number of combinations.

Rendering Environments

Each rendering environment will be elaborated upon further below.

Figure 3:
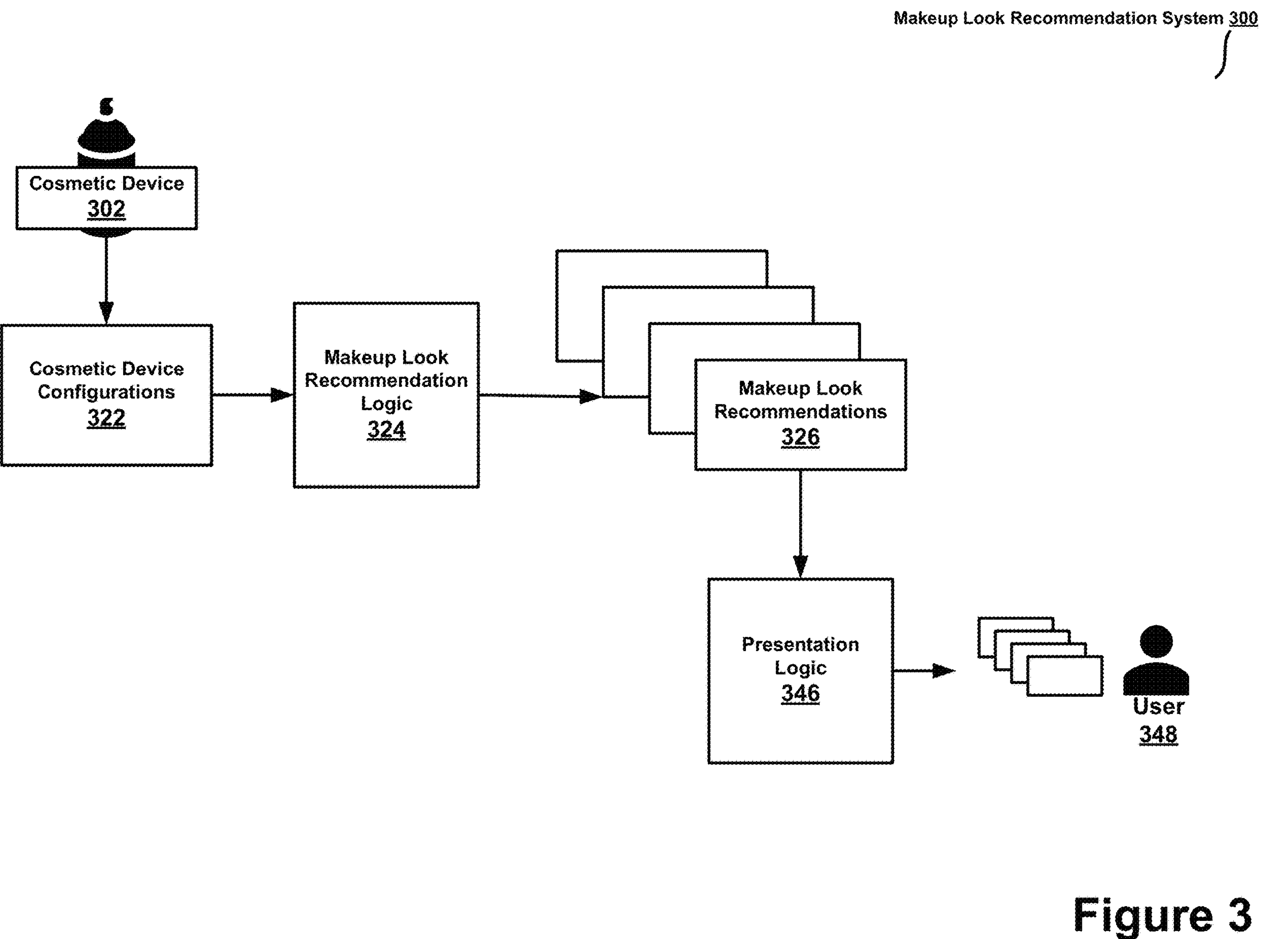
FIG. 3 is a flow diagram of a makeup look recommendation logic particular to a physical world rendering environment.

FIG. 3 is a flow diagram 300 of a makeup look recommendation logic particular to a physical world rendering environment. In some implementations of the technology disclosed, the interreality feedback loop illustrated in FIG. 1 for the three rendering environments shown in FIG. 2 is augmented by input data received from a user's behavioral history and interaction behavior with a smart cosmetic device system. A cosmetic device 302 possesses a plurality of cosmetic device configurations 322. The cosmetic device is configured to dispense a cosmetic substance. The plurality of configurations of the cosmetic device 322 include data describing a particular cosmetic substance formula, usage patterns of a particular cosmetic substance, and a design configuration of the cosmetic substance. A respective design configuration of the cosmetic device will possess a respective form configured for a respective function.

In one implementation of the technology disclosed, the design configuration of the cosmetic device is a spray canister configured to dispense the cosmetic substance as a mist of liquid particles, such as an aerosol spray (e.g., airbrush makeup systems). In another implementation of the technology disclosed, the design configuration of the cosmetic device is a pen configured to dispense liquid in a controlled fine-line makeup application (e.g., gel or felt-tip liner tools). In yet another implementation of the technology disclosed, the design configuration of the cosmetic device is a tape dispenser configured to dispense the cosmetic substance onto an adhesive material to be affixed onto human skin (e.g., medical-grade makeup tape for creating defined makeup styles or patterned adhesive). By comprising a variety of implementations possessing a broad range of high-specialized functionalities within a compact system, the technology disclosed serves as a comprehensive cosmetic application system capable of creating a limitless number of makeup looks. A cosmetic device of a particular configuration may be used in isolation, or in combination with one or more other cosmetic devices of other respective configurations (e.g., a makeup look wherein respective components of the look are respectively implemented by a spray canister, pen, and tape dispenser).

In other implementations of the technology disclosed, the design configuration of the cosmetic device is further augmented by one or more adaptors. Adaptors are configured to apply the cosmetic substance in a manner such that dispersion and application of the cosmetic substance are modified from the base design configuration (i.e., a spray canister, pen, or tape dispenser without any adaptors). Adaptors include spray nozzle attachments, brushes, and sponges. Spray nozzle attachments augment the spray pattern in which the cosmetic substance is dispersed (e.g., a broader range or more concentrated spray). Brush and sponge adaptors augment the blend and consistency with which the cosmetic substance is dispersed by the cosmetic device. In some implementations of the technology disclosed, stencils are implemented as adaptors wherein one or more shaped stencils are configured to apply the cosmetic substance to create detailed designs upon the skin with the cosmetic substance. A person skilled in the art will appreciate that additional implementations of the technology disclosed with further design configurations of the cosmetic device (i.e., alternative base configurations intended to apply cosmetic substances with alternative consistencies, coverage, or means of application) and design configurations of the adaptors are possible (e.g., additional brush shapes, nozzle attachments, and so on).

A cartridge comprising the cosmetic substance is loaded within the cosmetic device 302. In some implementations of the technology disclosed, a plurality of cartridges is loaded within the cosmetic device 302. The cosmetic substance has a current volume, wherein the current volume of the cosmetic substance within the cartridge may be monitored by the cosmetic device 302. The color of the cosmetic substance may also be also monitored by the cosmetic device 302.

The formula ingredients of the cosmetic substance determine one or more features in addition to color, such as finish (e.g., gloss, matte, or glitter finish) and target function (e.g., hypoallergenic formula, redness reduction formula, pigment retention formula, or waterproof formula) wherein a first cosmetic substance and a second cosmetic substance can have the same color but differing formula ingredients (e.g., a plurality of foundation cosmetic substances comprising an identical shade wherein only one foundation cosmetic substance is formulated for sensitive skin; a plurality of lip tint cosmetic substances comprising an identical shade wherein only one is formulated for a matte finish).

The cosmetic device 302 collects data on the usage pattern of a given cosmetic substance. The usage pattern tracks days of week when a particular cosmetic substance is dispensed and times of day when a particular cosmetic substance is dispensed (i.e., a cosmetic substance is dispensed at a higher frequency at a respective time of day on a respective day of week as compared to other cosmetic substances).

In one implementation of the technology disclosed, one or more device configurations pertaining to the cosmetic substance correspond to a cosmetic substance currently loaded in the cosmetic device 302. In another implementation of the technology disclosed, one or more device configurations pertaining to the cosmetic substance correspond to two or more cosmetic substances concurrently loaded in the cosmetic device 302. In yet another implementation of the technology disclosed, one or more device configurations pertaining to the cosmetic substance correspond to one or more cosmetic substances previously loaded in the cosmetic device 302.

As data specifying configurations of a cosmetic device are processed by the makeup look recommendation logic 324, the makeup look recommendation logic 324 learns a history and usage pattern of one or more cosmetic substances currently and previously loaded in the cosmetic device and generates one or more makeup look recommendations implementable by the plurality of cosmetic substances currently loaded in the cosmetic device or previously loaded as determined by the cosmetic device usage history (e.g., a cosmetic device is currently loaded with a blue cosmetic substance and has previously been loaded with a pink cosmetic substance, therefore a makeup look is recommended that is realized by the color blue and/or the color pink). In some implementations of the technology disclosed, the makeup look recommendation logic 324 is a machine learning model. In certain implementations of the technology disclosed, the makeup look recommendation logic 324 is a deep learning model.

The makeup look recommendation logic 324 processes the plurality of cosmetic device configurations 322 as input to generate a plurality of makeup look recommendations 326 as output. As an example, input data comprising information related to the application of a red lipstick with an edgy aesthetic vibe using cosmetic device 302 may be processed by the makeup look recommendation logic 324 to generate a plurality of makeup look recommendations 326 comprising one or more makeup looks comprising red lipstick and one or more makeup looks comprising edgy aesthetic vibes. A person skilled in the art will recognize that this example is not limiting and given purely for educational purposes, whereas the range of possible makeup looks and descriptive features of a particular makeup look are infinite.

Makeup look recommendations 326 generated by the makeup look recommendation logic 324 can be presented to a user 348 by a presentation logic 346 configured by a particular user interface on a smart device or another display device. In one implementation of the technology disclosed, the plurality of makeup look recommendations 326 generated are specific to rendering environment one 202 in FIG. 2. In another implementation of the technology disclosed, the plurality of makeup look recommendations 326 generated are specific to rendering environment two 242 in FIG. 2. In yet another implementation of the technology disclosed, the plurality of makeup look recommendations 326 generated are specific to rendering environment three 282 in FIG. 2. In some implementations of the technology disclosed, the plurality of makeup look recommendations 326 generated comprise some combination of makeup look recommendations from two or more rendering environments.

Likewise, the input data processed by makeup look recommendation logic 324 is not limited to data extracted from makeup looks rendered in the physical world by a smart cosmetic device 302. In one implementation of the technology disclosed, input data processed by makeup look recommendation logic 324 corresponds to one or more makeup looks (or features associated with makeup looks) rendered in an AR rendering environment. In another implementation of the technology disclosed, input data processed by makeup look recommendation logic 324 corresponds to one or more makeup looks (or features associated with makeup looks) rendered in a metaverse rendering environment. In some implementations of the technology disclosed, input data processed by makeup look recommendation logic 324 comprises some combination of makeup look data from two or more rendering environments.

Figure 4:
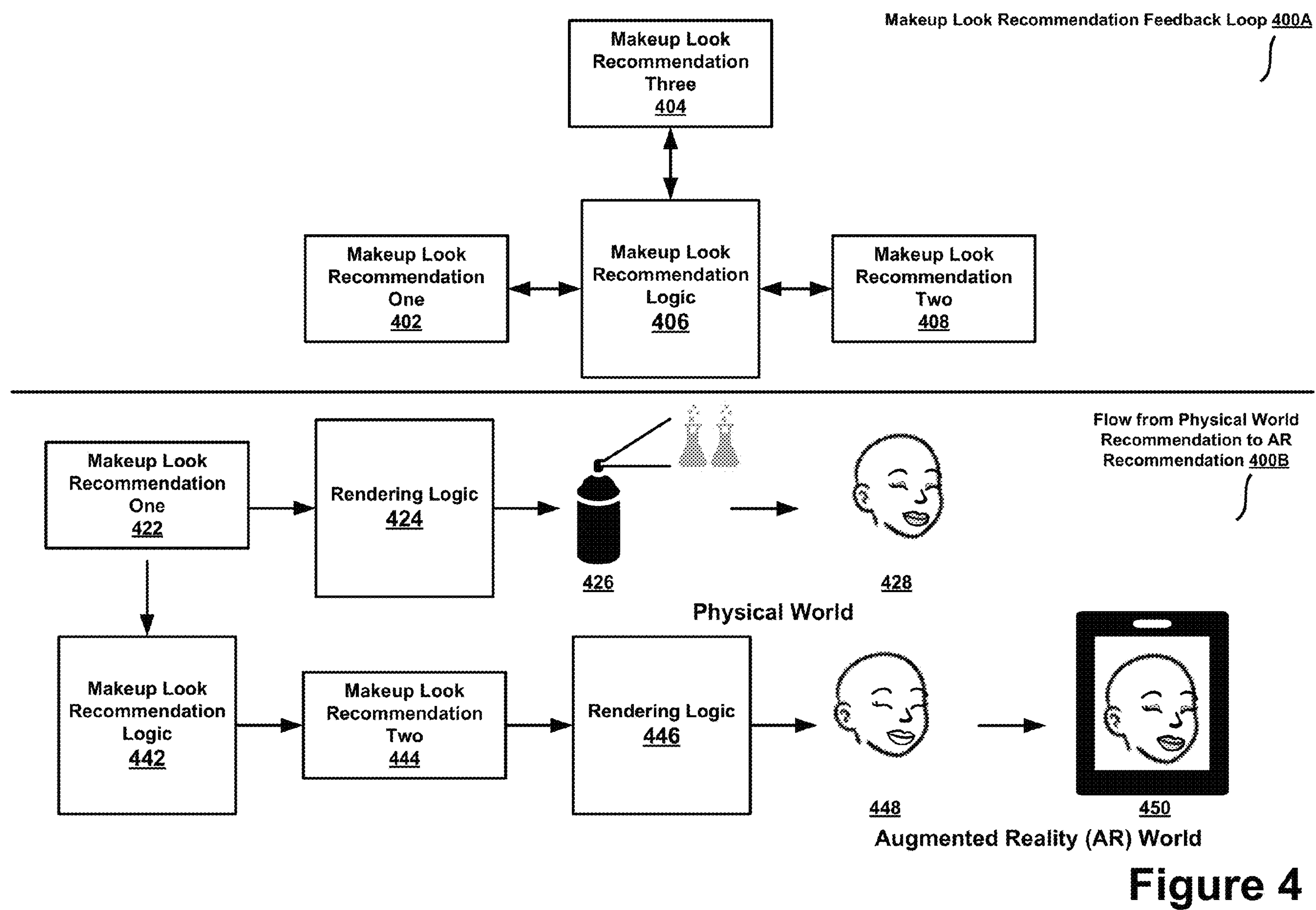
FIG. 4 is a flow diagram demonstrating the processing of a makeup look rendered in the physical world by a makeup look recommendation logic to generate the recommendation of a makeup look rendered in the AR world.

FIG. 4 is a flow diagram demonstrating the processing of a makeup look rendered in the physical world by a makeup look recommendation logic to generate the recommendation of a makeup look rendered in the AR world.

Feedback loop 400A illustrates the interactive dynamic between makeup look recommendation one 402, makeup look recommendation two 408, and makeup look recommendation 404. Let makeup look recommendation one 402 be a recommended makeup look implementable within a physical world rendering environment. Let makeup look recommendation two 408 be a recommended makeup look implementable within an AR world rendering environment. Let makeup look recommendation three 404 be a recommended makeup look implementable within a metaverse world rendering environment. Makeup look recommendation one 402, makeup look recommendation two 408, and makeup look recommendation three 404 may each respectively be processed as input, or generated as output, for the makeup look recommendation logic 406 (e.g., makeup look one recommendation one 402 may be processed as input to generate makeup look recommendation two 408 as output, makeup look recommendation three 404 may be processed as input to generate makeup look recommendation one 402, and so on).

Flow diagram 400B illustrates makeup look recommendation one 422 being processed as input for makeup look recommendation logic 442 to generate makeup look recommendation two 444 as output. Makeup look recommendation one 422 is renderable in a physical world rendering environment, thus, when processed by rendering logic 424, instructions are provided as output to apply makeup look recommendation one 422 onto the face of user 428. A smart cosmetic device 426 is loaded with a cartridge comprising blue cosmetic substance and a cartridge comprising pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 428 and the pink cosmetic substance is applied to the lips of user 428.

In addition to being processed by the rendering logic 424, makeup look recommendation one 422 is also processed by makeup look recommendation logic 442 to generate makeup look recommendation two 444. Makeup look recommendation two 444 is renderable in an AR world rendering environment, thus, when processed by rendering logic 426, an AR overlay filter compatible with the camera of a smart device 450 is provided as output to digitally apply makeup look recommendation two 444 onto the face of user 448.

Makeup look recommendation two 444 is aesthetically overlapping with makeup look recommendation one 422 (i.e., both possessing blue cosmetic substance on the eyelids and pink cosmetic substance on the lips) but comprises non-overlapping, non-translatable features with makeup look recommendation one 422 (e.g., makeup look recommendation one 422 requires chemical formulation whereas makeup look recommendation two 444 requires depth sensoring).

As an output of rendering logic 446, user 448 will appear as if they are wearing makeup look recommendation two 444 in the AR world on the user interface of smart device 450, independent of the presence of any physical cosmetics applied to the physical face of user 448.

Figure 5:
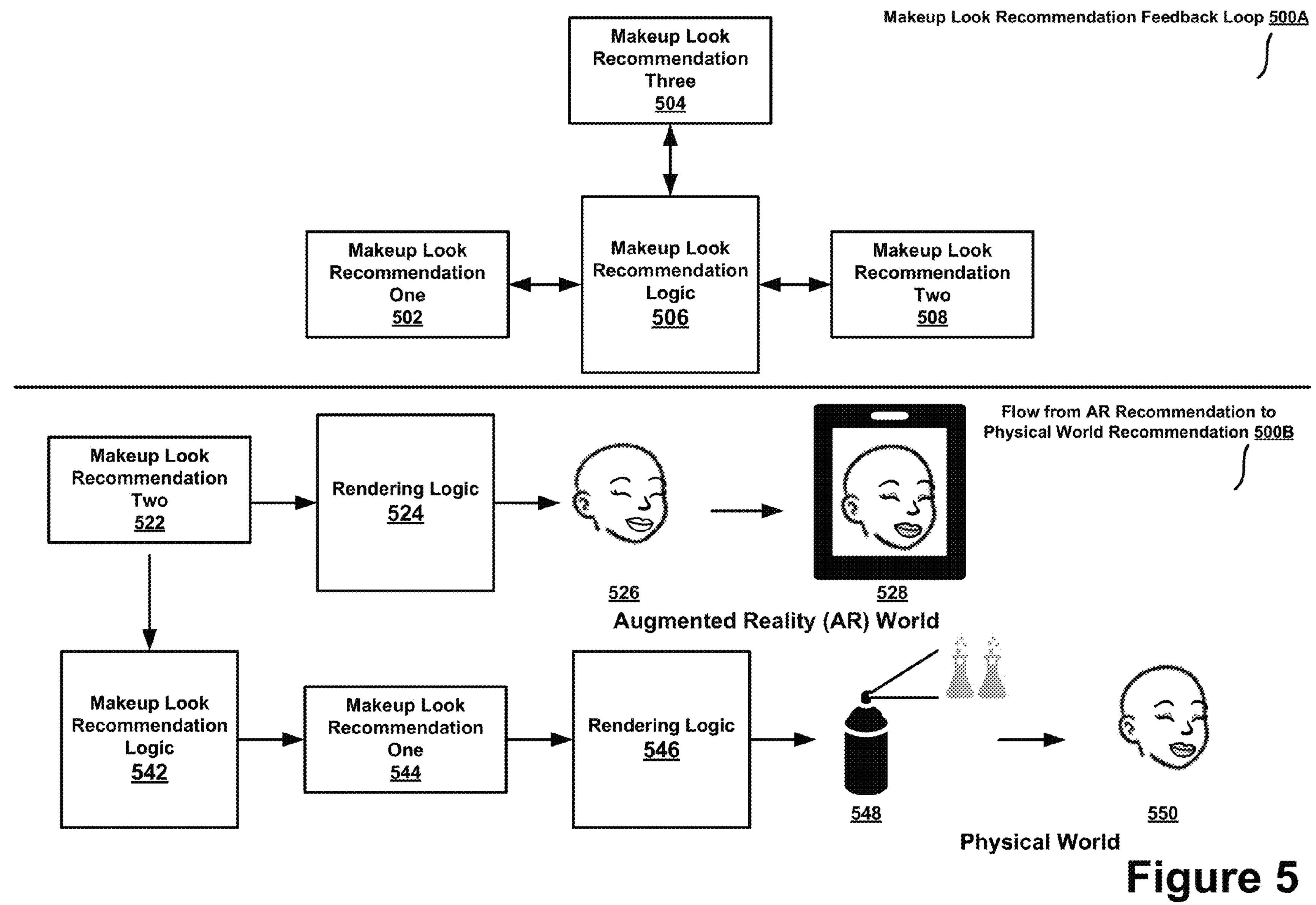
FIG. 5 is a flow diagram demonstrating the processing of a makeup look rendered in the AR world by a makeup look recommendation logic to generate the recommendation of a makeup look rendered in the physical world.

FIG. 5 is a flow diagram demonstrating the processing of a makeup look rendered in the AR world by a makeup look recommendation logic to generate the recommendation of a makeup look rendered in the physical world.

Feedback loop 500A illustrates the interactive dynamic between makeup look recommendation one 502, makeup look recommendation two 508, and makeup look recommendation 504. Let makeup look recommendation one 502 be a recommended makeup look implementable within a physical world rendering environment. Let makeup look recommendation two 508 be a recommended makeup look implementable within an AR world rendering environment. Let makeup look recommendation three 504 be a recommended makeup look implementable within a metaverse world rendering environment. Makeup look recommendation one 502, makeup look recommendation two 508, and makeup look recommendation three 504 may each respectively be processed as input, or generated as output, for the makeup look recommendation logic 506 (e.g., makeup look one recommendation one 502 may be processed as input to generate makeup look recommendation two 508 as output, makeup look recommendation three 504 may be processed as input to generate makeup look recommendation one 502, and so on).

Flow diagram 500B illustrates makeup look recommendation two 522 being processed as input for makeup look recommendation logic 542 to generate makeup look recommendation one 544 as output. Makeup look recommendation two 522 is renderable in an AR world rendering environment, thus, when processed by rendering logic 524, an AR overlay filter compatible with the camera of a smart device 528 is provided as output to digitally apply makeup look recommendation two 522 onto the face of user 526. Blue cosmetic substance is digitally applied to the eyelids of user 526 and pink cosmetic substance is digitally applied to the lips of user 526. As an output of rendering logic 524, user 526 will appear as if they are wearing makeup look recommendation two 522 in the AR world on the user interface of smart device 528, independent of the presence of any physical cosmetics applied to the physical face of user 526.

In addition to being processed by the rendering logic 524, makeup look recommendation two 522 is also processed by makeup look recommendation logic 542 to generate makeup look recommendation one 544. Makeup look recommendation one 544 is renderable in a physical world rendering environment, thus, when processed by rendering logic 546, instructions are provided as output to apply makeup look recommendation one 544 onto the face of user 550. A smart cosmetic device 548 is loaded with a cartridge comprising blue cosmetic substance and a cartridge comprising pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 550 and the pink cosmetic substance is applied to the lips of user 550.

Makeup look recommendation two 522 is aesthetically overlapping with makeup look recommendation one 544 (i.e., both possessing blue cosmetic substance on the eyelids and pink cosmetic substance on the lips) but comprises non-overlapping, non-translatable features with makeup look recommendation one 544 (e.g., makeup look recommendation one 522 requires chemical formulation whereas makeup look recommendation two 544 requires depth sensoring).

While the flow diagram in FIG. 500B is similar to the flow diagram in FIG. 400B, the difference in directionality provides a key distinction for the purpose of demonstrating the applicability range of the makeup look recommendation system. In FIG. 400B, a user's cosmetic usage behavior in real life influences the user's cosmetic usage behavior in the digital world through means of AR. In FIG. 500B, a user's cosmetic usage behavior in the digital world influence's the user's cosmetic usage behavior in real life. The technology disclosed may be implemented for the use of artificial intelligence guidance of a consumer's digital and Web3 presence in response to physical world behavior. In this particular use case, the technology disclosed expands upon the utility of a smart cosmetic device system and benefits from the rich source of data provided by smart cosmetic device usage patterns. The technology disclosed may also be implemented for the use of artificial intelligence guidance of a consumer's cosmetic purchases in response to digital world behavior. In this particular use case, the technology disclosed allows a user to easily access product information from any location and digitally test any available cosmetic product prior to spending any financial or time cost.

Figure 6:
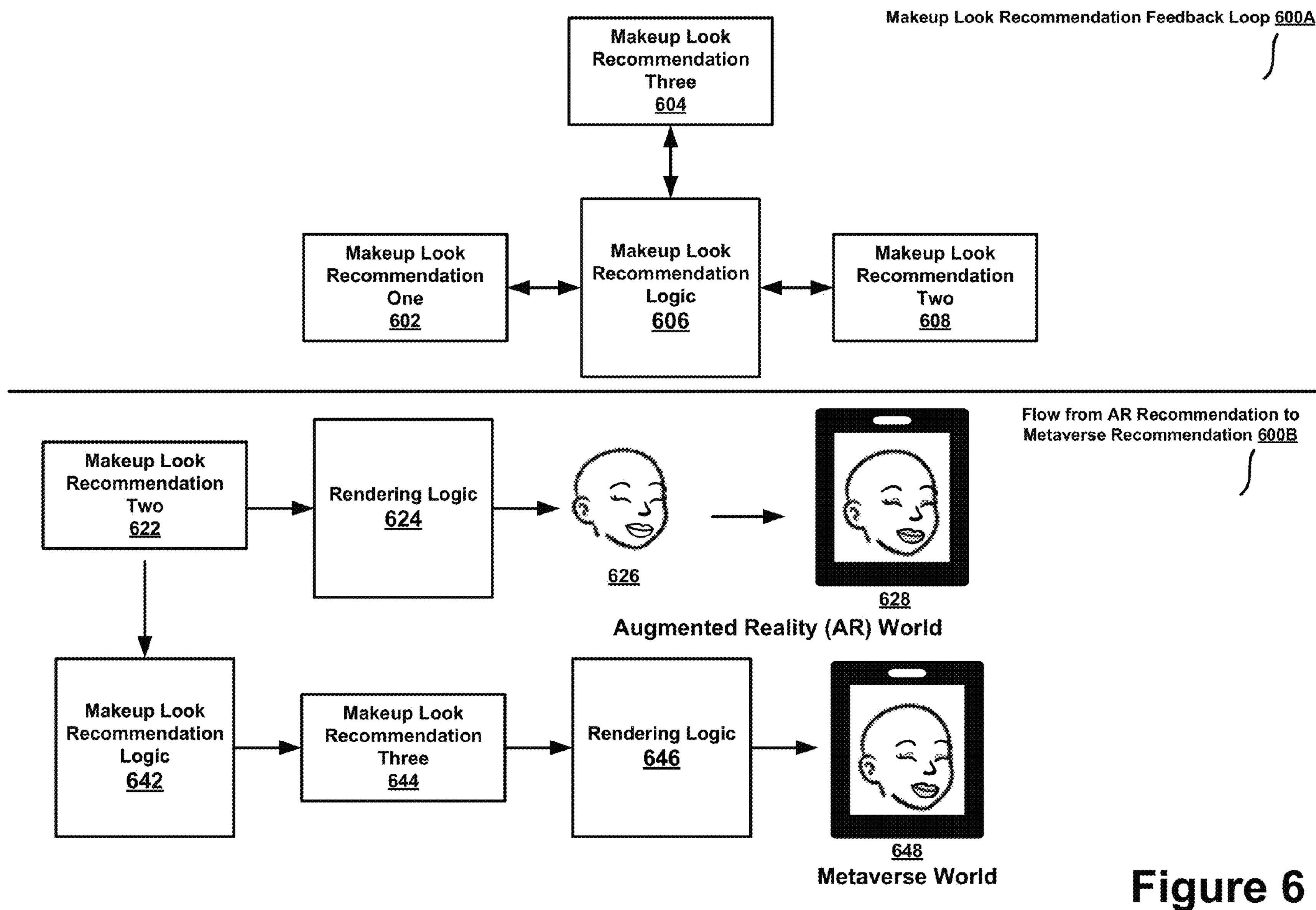
FIG. 6 is a flow diagram demonstrating the processing of a makeup look rendered in the AR world by a makeup look recommendation logic to generate the recommendation of a makeup look rendered in the metaverse world.

FIG. 6 is a flow diagram demonstrating the processing of a makeup look rendered in the AR world by a makeup look recommendation logic to generate the recommendation of a makeup look rendered in the metaverse world.

Feedback loop 600A illustrates the interactive dynamic between makeup look recommendation one 602, makeup look recommendation two 608, and makeup look recommendation 604. Let makeup look recommendation one 602 be a recommended makeup look implementable within a physical world rendering environment. Let makeup look recommendation two 608 be a recommended makeup look implementable within an AR world rendering environment. Let makeup look recommendation three 604 be a recommended makeup look implementable within a metaverse world rendering environment. Makeup look recommendation one 602, makeup look recommendation two 608, and makeup look recommendation three 604 may each respectively be processed as input, or generated as output, for the makeup look recommendation logic 606 (e.g., makeup look one recommendation one 602 may be processed as input to generate makeup look recommendation two 608 as output, makeup look recommendation three 604 may be processed as input to generate makeup look recommendation one 602, and so on).

Flow diagram 600B illustrates makeup look recommendation two 622 being processed as input for makeup look recommendation logic 642 to generate makeup look recommendation three 644 as output. Makeup look recommendation two 622 is renderable in an AR world rendering environment, thus, when processed by rendering logic 624, an AR overlay filter compatible with the camera of a smart device 628 is provided as output to digitally apply makeup look recommendation two 622 onto the face of user 626. Blue cosmetic substance is digitally applied to the eyelids of user 626 and pink cosmetic substance is digitally applied to the lips of user 626. As an output of rendering logic 624, user 626 will appear as if they are wearing makeup look recommendation two 622 in the AR world on the user interface of smart device 628, independent of the presence of any physical cosmetics applied to the physical face of user 626.

In addition to being processed by the rendering logic 624, makeup look recommendation two 622 is also processed by makeup look recommendation logic 642 to generate makeup look recommendation three 644. Makeup look recommendation three 644 is renderable in a metaverse world rendering environment, thus, when processed by rendering logic 646, code is initiated to alter the appearance of a VR avatar to reflect blue cosmetic substance on the eyelids of the avatar and pink cosmetic substance on the lips of the avatar. As previously demonstrated in FIG. 2, the rendering of makeup look recommendation three 644 onto the user VR avatar does not require any interaction or input from the user's physical world appearance.

Makeup look recommendation two 622 is aesthetically overlapping with makeup look recommendation three 644 (i.e., both possessing blue cosmetic substance on the eyelids and pink cosmetic substance on the lips) but comprises non-overlapping, non-translatable features with makeup look recommendation one 644 (e.g., makeup look recommendation two 622 requires depth sensoring whereas makeup look recommendation three 644 requires a character mesh).

FIG. 600B is notably distinct from FIG. 400B and FIG. 500B in that the makeup look recommendations apply exclusively to a digital, mixed reality world and do not require any alteration steps to a user's physical appearance. The technology disclosed presents a unique, novel use case of expanding upon an existing cosmetic device system to include a user's digital presence without any ties to a user's physical appearance and enrich a user's digital social network experience (i.e., in comparison to beauty social network frameworks wherein a user applies a particular makeup look and posts a photograph, a user applies a particular AR filter requiring camera input, and so on). The lack of a physical appearance limitation results in a wide range of creative options available to the user for makeup look customizations.

Figure 7:
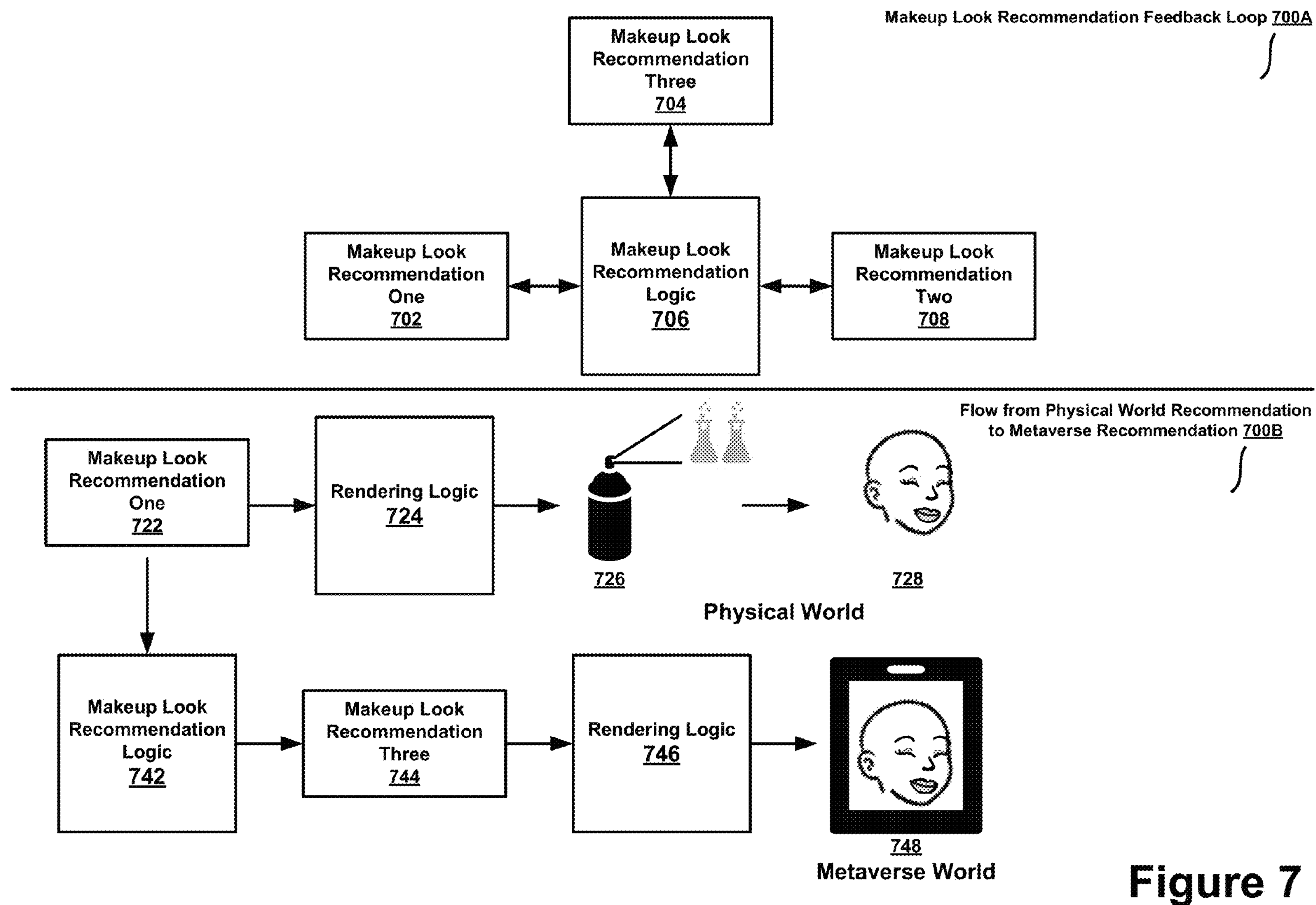
FIG. 7 is a flow diagram demonstrating the processing of a makeup look rendered in the physical world by a makeup look recommendation logic to generate the recommendation of a makeup look rendered in the metaverse world.

FIG. 7 is a flow diagram demonstrating the processing of a makeup look rendered in the physical world by a makeup look recommendation logic to generate the recommendation of a makeup look rendered in the metaverse world.

Feedback loop 700A illustrates the interactive dynamic between makeup look recommendation one 702, makeup look recommendation two 708, and makeup look recommendation 704. Let makeup look recommendation one 702 be a recommended makeup look implementable within a physical world rendering environment. Let makeup look recommendation two 708 be a recommended makeup look implementable within an metaverse world rendering environment. Let makeup look recommendation three 704 be a recommended makeup look implementable within a metaverse world rendering environment. Makeup look recommendation one 702, makeup look recommendation two 708, and makeup look recommendation three 704 may each respectively be processed as input, or generated as output, for the makeup look recommendation logic 706 (e.g., makeup look one recommendation one 702 may be processed as input to generate makeup look recommendation two 708 as output, makeup look recommendation three 704 may be processed as input to generate makeup look recommendation one 702, and so on).

Flow diagram 700B illustrates makeup look recommendation one 722 being processed as input for makeup look recommendation logic 772 to generate makeup look recommendation three 744 as output. Makeup look recommendation one 722 is renderable in a physical world rendering environment, thus, when processed by rendering logic 742, instructions are provided as output to apply makeup look recommendation one 722 onto the face of user 728. A smart cosmetic device 726 is loaded with a cartridge comprising blue cosmetic substance and a cartridge comprising pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 728 and the pink cosmetic substance is applied to the lips of user 728.

In addition to being processed by the rendering logic 724, makeup look recommendation one 722 is also processed by makeup look recommendation logic 742 to generate makeup look recommendation three 744. Makeup look recommendation three 744 is renderable in a metaverse world rendering environment, thus, when processed by rendering logic 746, code is initiated to alter the appearance of a VR avatar to reflect blue cosmetic substance on the eyelids of the avatar and pink cosmetic substance on the lips of the avatar. As previously demonstrated in FIG. 2, the rendering of makeup look recommendation three 744 onto the user VR avatar does not require any interaction or input from the user's physical world appearance.

Makeup look recommendation one 722 is aesthetically overlapping with makeup look recommendation three 744 (i.e., both possessing blue cosmetic substance on the eyelids and pink cosmetic substance on the lips) but comprises non-overlapping, non-translatable features with makeup look recommendation one 722 (e.g., makeup look recommendation one 722 requires chemical formulation whereas makeup look recommendation three 744 requires a character mesh).

FIG. 700B demonstrates a use case for the technology disclosed to improve user accessibility within the Web3 beauty landscape. Traditionally, for a beauty consumer to digitally share their cosmetic results with their social network, one must take a photograph or a video of their physical appearance to upload. While metaverse avatars are increasing in popularity, these avatars are not directly connected to a user's cosmetic usage behavior in the physical world. In some implementations of the technology disclosed, augmentation of a smart cosmetic device system with metaverse integration allows a user to alter their metaverse avatar to reflect their physical world look for a streamlined method of sharing beauty expression with a user's social network.

Figure 8:
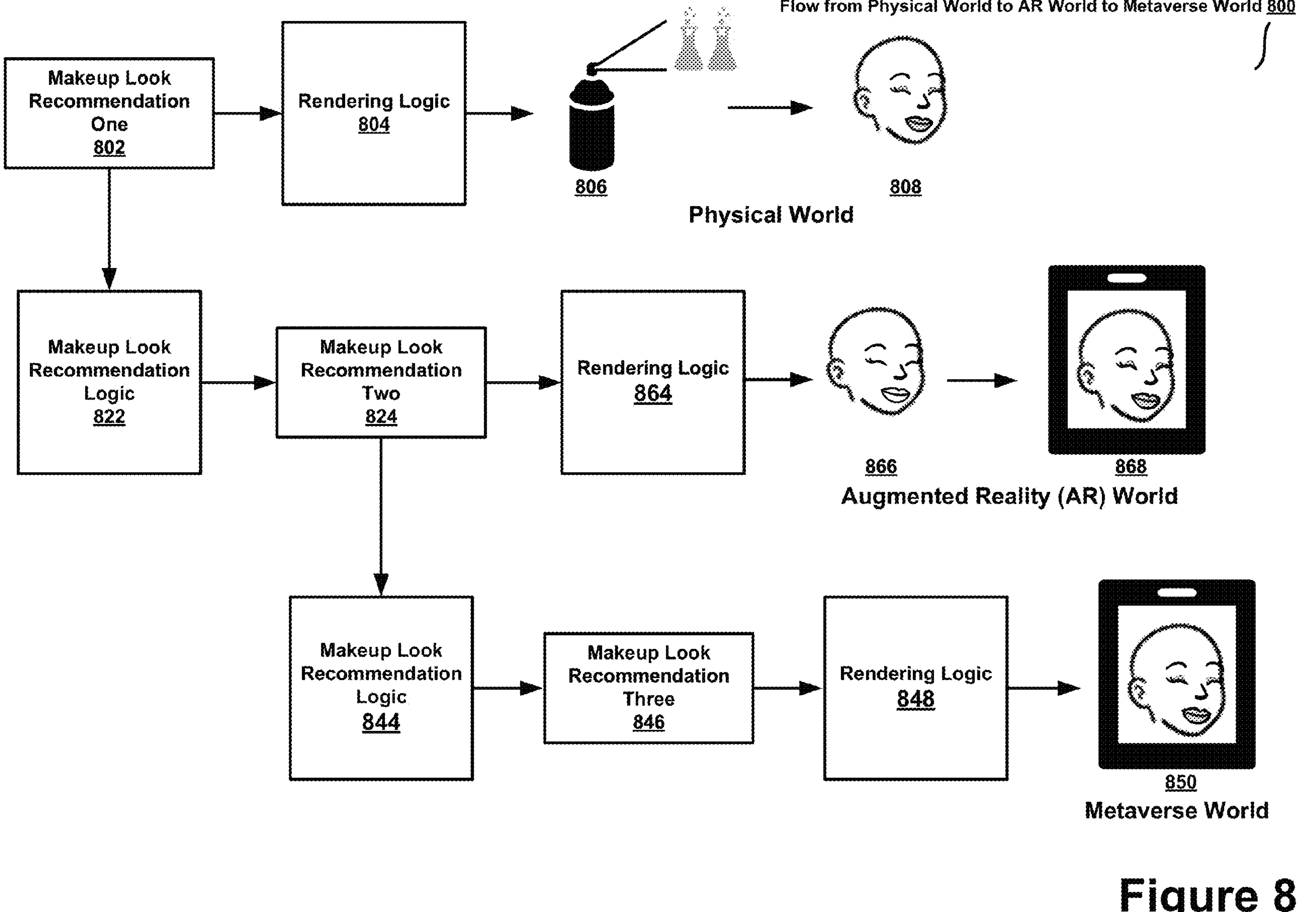
FIG. 8 is a flow diagram demonstrating the processing of a makeup look rendered in the physical world by a makeup look recommendation logic to generate the recommendation of a makeup look rendered in the AR world, which is in turn processed by a makeup look recommendation logic to generate a makeup look rendered in the metaverse world.

FIG. 8 is a flow diagram demonstrating the processing of a makeup look rendered in the physical world by a makeup look recommendation logic to generate the recommendation of a makeup look rendered in the AR world, which is in turn processed by a makeup look recommendation logic to generate a makeup look rendered in the metaverse world.

The makeup look recommendation system disclosed continuously processes new inputs to produce new recommendation outputs. As an example, makeup look recommendation one 802 is renderable in a physical world rendering environment, thus, when processed by rendering logic 804, instructions are provided as output to apply makeup look recommendation one 802 onto the face of user 808. A smart cosmetic device 806 is loaded with a cartridge comprising blue cosmetic substance and a cartridge comprising pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 808 and the pink cosmetic substance is applied to the lips of user 808.

In addition to being processed by the rendering logic 804, makeup look recommendation one 802 is also processed by makeup look recommendation logic 822 to generate makeup look recommendation two 824. Makeup look recommendation two 824 is renderable in an AR world rendering environment, thus, when processed by rendering logic 864, an AR overlay filter compatible with the camera of a smart device 868 is provided as output to digitally apply makeup look recommendation two 824 onto the face of user 866. Makeup look recommendation two 824 is aesthetically overlapping with makeup look recommendation one 802 (i.e., both possessing blue cosmetic substance on the eyelids and pink cosmetic substance on the lips) but comprises non-overlapping, non-translatable features with makeup look recommendation one 802 (e.g., makeup look recommendation one 802 requires chemical formulation whereas makeup look recommendation two 824 requires depth sensoring).

As an output of rendering logic 864, user 866 will appear as if they are wearing makeup look recommendation two 824 in the AR world on the user interface of smart device 868, independent of the presence of any physical cosmetics applied to the physical face of user 866.

In addition to being processed by the rendering logic 864, makeup look recommendation two 824 is also processed by makeup look recommendation logic 844 to generate makeup look recommendation three 846. In some implementations of the technology disclosed, makeup look recommendation logic 822 is an equivalent algorithm to makeup look recommendation logic 844. In other implementations of the technology disclosed, makeup look recommendation logic 822 is a different algorithm from makeup look recommendation logic 844. Makeup look recommendation three 846 is renderable in a metaverse world rendering environment, thus, when processed by rendering logic 848, code is initiated to alter the appearance of a VR avatar to reflect blue cosmetic substance on the eyelids of the avatar and pink cosmetic substance on the lips of the avatar. As previously demonstrated in FIG. 2, the rendering of makeup look recommendation three 846 onto the user VR avatar does not require any interaction or input from the user's physical world appearance.

Makeup look recommendation two 824 is aesthetically overlapping with makeup look recommendation three 846 (i.e., both possessing blue cosmetic substance on the eyelids and pink cosmetic substance on the lips) but comprises non-overlapping, non-translatable features with makeup look recommendation one 802 (e.g., makeup look recommendation two 824 requires depth sensoring whereas makeup look recommendation three 846 requires a character mesh).

As a result of the similar overlap between makeup look recommendation one 802 and makeup look recommendation two 824, and the similar overlap between makeup look recommendation two 824 and makeup look recommendation three 846, it is also true that there is an aesthetic overlap between makeup look recommendation one 802 and makeup look recommendation 846. Each respective makeup look recommendation comprises blue cosmetic substance rendered on the eyelids and pink cosmetic substance rendered on the lips.

In comparison to example implementations given in Flows 400B-700B, the implementation of the technology disclosed illustrated in Flow 800B comprises a multistep process in which a makeup look recommendation logic (or a plurality of makeup look recommendation logics) iteratively processes a plurality of successive inputs to generate a plurality of successive outputs. In one implementation of the technology disclosed, makeup look recommendation logic 844 processes input data corresponding to both makeup look recommendation two 824 and makeup look recommendation one 802. In another implementation of the technology disclosed, makeup look recommendation logic 844 processes data corresponding to makeup look recommendation 824 as input without including data corresponding to makeup look implementation one.

A person skilled in the art will appreciate that the feedback loop-like nature of the makeup look recommendation system allows for a multitude of implementations not explicitly represented within the described flow diagrams. The makeup look recommendation system may process one or more makeup look recommendations corresponding to one or more rendering environments as input to generate one or more makeup look recommendations corresponding to one or more rendering environments. An infinite number of makeup look recommendations may be generated in an infinite number of output steps. Additionally, the makeup look recommendation system input is not limited to makeup look recommendations selected by the user (e.g., user demographic data, the color of a user's outfit, an occasion to which the makeup look will be worn, and so on).

Feature Overlap of Makeup Look Recommendations

In contrast to the description above, the discussion now turns to the recommendation of a makeup look on the basis of features, which may or may not be overlapping or translatable between rendering environments.

Figure 9:
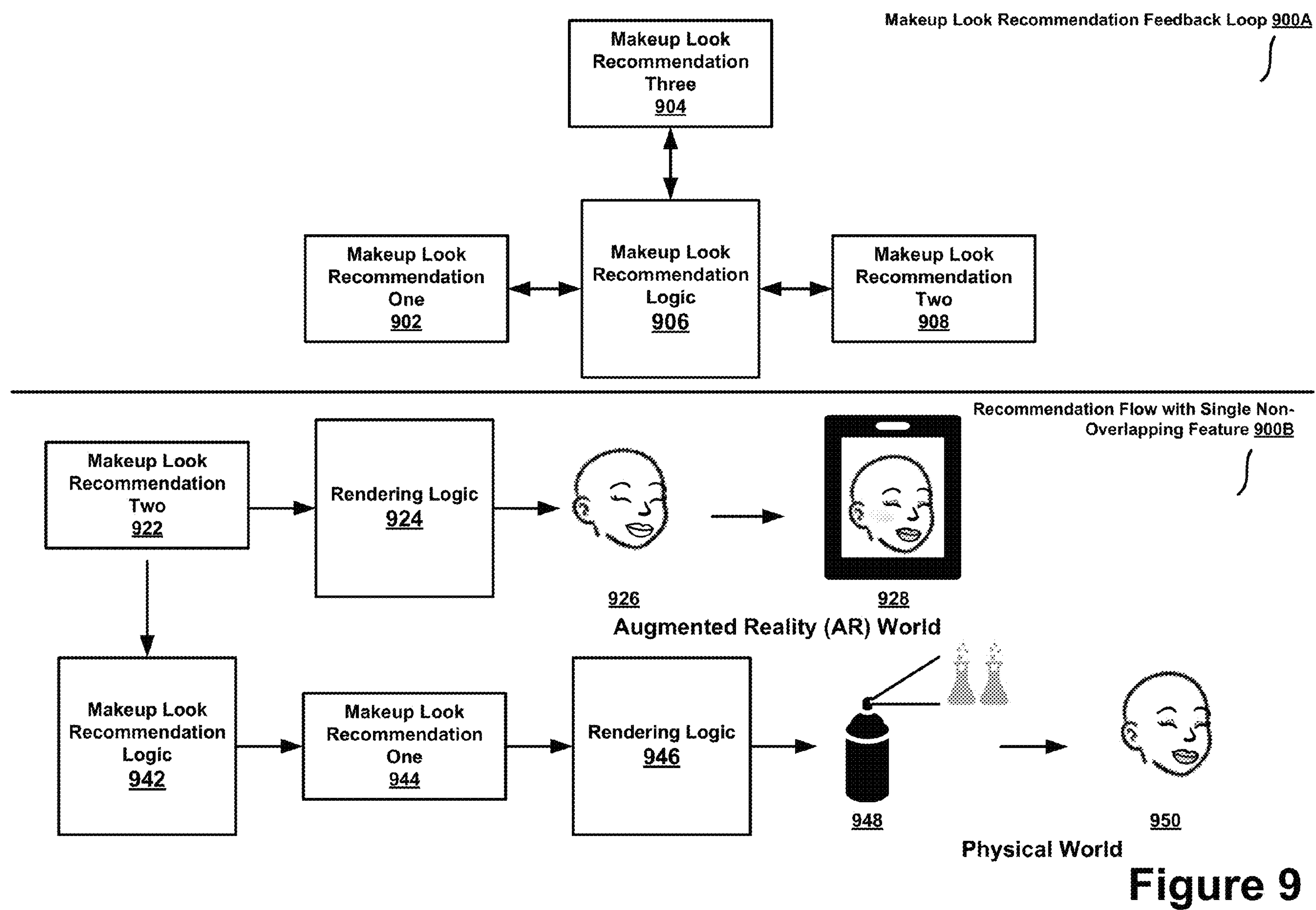
FIG. 9 is a flow diagram demonstrating the processing of a first makeup look recommendation to generate a second makeup look recommendation wherein the first and second makeup look recommendations possess a non-overlapping, translatable feature.

FIG. 9 is a flow diagram demonstrating the processing of a first makeup look recommendation to generate a second makeup look recommendation wherein the first and second makeup look recommendations possess a non-overlapping, translatable feature. Feedback loop 900A illustrates the interactive dynamic between makeup look recommendation one 902, makeup look recommendation two 908, and makeup look recommendation 904. Let makeup look recommendation one 902 be a recommended makeup look implementable within a physical world rendering environment. Let makeup look recommendation two 908 be a recommended makeup look implementable within an AR world rendering environment. Let makeup look recommendation three 904 be a recommended makeup look implementable within a metaverse world rendering environment. Makeup look recommendation one 902, makeup look recommendation two 908, and makeup look recommendation three 904 may each respectively be processed as input, or generated as output, for the makeup look recommendation logic 906 (e.g., makeup look one recommendation one 902 may be processed as input to generate makeup look recommendation two 908 as output, makeup look recommendation three 904 may be processed as input to generate makeup look recommendation one 902, and so on).

Flow diagram 900B illustrates makeup look recommendation two 922 being processed as input for makeup look recommendation logic 942 to generate makeup look recommendation one 944 as output. Makeup look recommendation two 922 is renderable in an AR world rendering environment, thus, when processed by rendering logic 924, an AR overlay filter compatible with the camera of a smart device 928 is provided as output to digitally apply makeup look recommendation two 922 onto the face of user 926. Blue cosmetic substance is digitally applied to the eyelids of user 926, pink cosmetic substance is digitally applied to the lips of user 926, and a shimmer pink cosmetic substance is digitally applied to the cheekbones of user 926. As an output of rendering logic 924, user 926 will appear as if they are wearing makeup look recommendation two 922 in the AR world on the user interface of smart device 928, independent of the presence of any physical cosmetics applied to the physical face of user 926.

In addition to being processed by the rendering logic 924, makeup look recommendation two 922 is also processed by makeup look recommendation logic 942 to generate makeup look recommendation one 944. Makeup look recommendation one 944 is renderable in a physical world rendering environment, thus, when processed by rendering logic 946, instructions are provided as output to apply makeup look recommendation one 944 onto the face of user 950. A smart cosmetic device 948 is loaded with a cartridge comprising blue cosmetic substance and a cartridge comprising pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 950 and the pink cosmetic substance is applied to the lips of user 950.

Makeup look recommendation two 922 is aesthetically overlapping with makeup look recommendation one 944 (i.e., both possessing blue cosmetic substance on the eyelids and pink cosmetic substance on the lips) but comprises non-overlapping, non-translatable features with makeup look recommendation one 944 (e.g., makeup look recommendation one 922 requires chemical formulation whereas makeup look recommendation two 944 requires depth sensoring). In comparison to Flow 500, makeup look recommendation two 922 also comprises a non-overlapping, translatable feature. While non-translatable features comprise features that are specific to a respective rendering environment, translatable features may correspond to a plurality of rendering environments (e.g., the color of a cosmetic substance, the aesthetic vibe of a makeup look, placement area to which a cosmetic substance is applied, and so on). Whereas makeup look recommendation two 922 comprises a shimmer pink cosmetic substance digitally applied to the cheekbones of user 926, makeup look recommendation one 944 does not. In some implementations of the technology disclosed, this may be due to user 950 electing to not apply a shimmer pink cosmetic substance by choice or necessity from lack of product. However, in other implementations of the technology disclosed, makeup look recommendation logic 942 is configured to output makeup look recommendations that are not aesthetically identical to the processed input makeup look recommendations as shown in Flow 500B.

Despite possessing non-overlapping, translatable features, makeup look recommendation one 944 and makeup look recommendation 922 comprise a high degree of similarity and it is therefore plausible that makeup look recommendation one 944 may be an output of a makeup look recommendation logic after the makeup look recommendation logic 942 processes makeup look recommendation two 922 (e.g., implementations of the technology disclosed wherein the makeup look recommendation logic 942 comprises a K-nearest neighbors or similar clustering algorithm, a random forest or similar decision tree model, or a deep learning network). Generating makeup look recommendations to be presented towards a user that are aesthetically differing from a currently selected or previously selected makeup look recommendation widens the proportion of a makeup look recommendation database accessible for the user, encouraging creativity and potentially increasing usage of the smart cosmetic device system.

Figure 10:
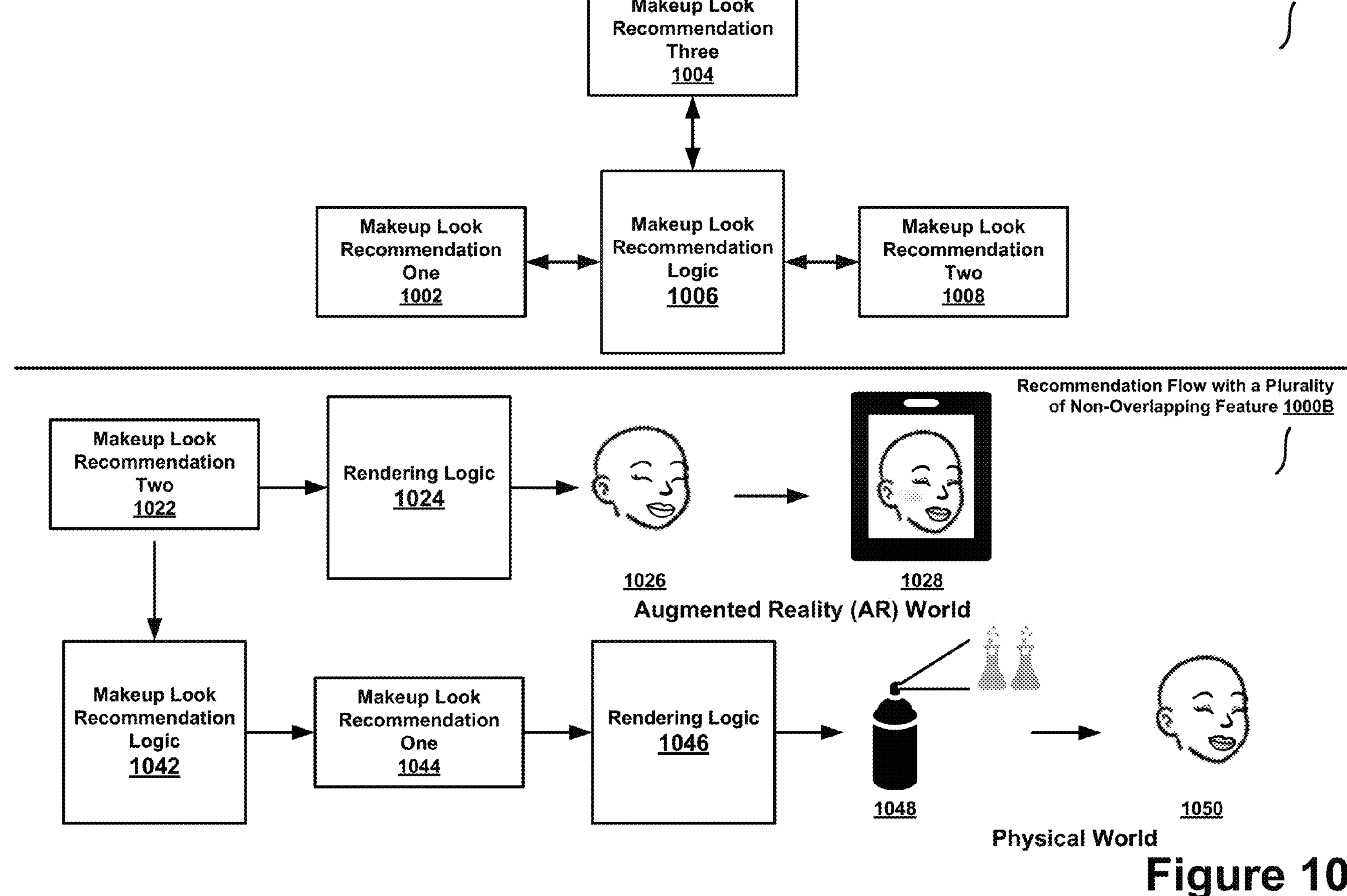
FIG. 10 is a flow diagram demonstrating the processing of a first makeup look recommendation to generate a second makeup look recommendation wherein the first and second makeup look recommendations possess a plurality of non-overlapping, translatable features.

FIG. 10 is a flow diagram demonstrating the processing of a first makeup look recommendation to generate a second makeup look recommendation wherein the first and second makeup look recommendations possess a plurality of non-overlapping, translatable features. Feedback loop 1000A illustrates the interactive dynamic between makeup look recommendation one 1002, makeup look recommendation two 1008, and makeup look recommendation 1004. Let makeup look recommendation one 1002 be a recommended makeup look implementable within a physical world rendering environment. Let makeup look recommendation two 1008 be a recommended makeup look implementable within an AR world rendering environment. Let makeup look recommendation three 1004 be a recommended makeup look implementable within a metaverse world rendering environment. Makeup look recommendation one 1002, makeup look recommendation two 1008, and makeup look recommendation three 1004 may each respectively be processed as input, or generated as output, for the makeup look recommendation logic 1006 (e.g., makeup look one recommendation one 1002 may be processed as input to generate makeup look recommendation two 1008 as output, makeup look recommendation three 1004 may be processed as input to generate makeup look recommendation one 1002, and so on).

Flow diagram 1000B illustrates makeup look recommendation two 1022 being processed as input for makeup look recommendation logic 1042 to generate makeup look recommendation one 1044 as output. Makeup look recommendation two 1022 is renderable in an AR world rendering environment, thus, when processed by rendering logic 1024, an AR overlay filter compatible with the camera of a smart device 1028 is provided as output to digitally apply makeup look recommendation two 1022 onto the face of user 1026. A holographic pastel cosmetic substance is digitally applied to the eyelids of user 1026, a pink cosmetic substance is digitally applied to the lips of user 1026, and a shimmer pink cosmetic substance is digitally applied to the cheekbones of user 1026. As an output of rendering logic 1024, user 1026 will appear as if they are wearing makeup look recommendation two 1022 in the AR world on the user interface of smart device 1028, independent of the presence of any physical cosmetics applied to the physical face of user 1026.

In addition to being processed by the rendering logic 1024, makeup look recommendation two 1022 is also processed by makeup look recommendation logic 1042 to generate makeup look recommendation one 1044. Makeup look recommendation one 1044 is renderable in a physical world rendering environment, thus, when processed by rendering logic 1046, instructions are provided as output to apply makeup look recommendation one 1044 onto the face of user 1050. A smart cosmetic device 1048 is loaded with a cartridge comprising blue cosmetic substance and a cartridge comprising pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 1050 and the pink cosmetic substance is applied to the lips of user 1050.

Makeup look recommendation two 1022 is aesthetically overlapping with makeup look recommendation one 1044 (i.e., both possessing a pink cosmetic substance applied to the lips) but comprises non-overlapping, non-translatable features with makeup look recommendation one 1044 (e.g., makeup look recommendation one 1022 requires chemical formulation whereas makeup look recommendation two 1044 requires depth sensoring). In comparison to Flow 500, makeup look recommendation two 1022 also comprises a non-overlapping, translatable feature. Whereas makeup look recommendation two 1022 comprises a holographic pastel cosmetic substance applied to the eyelids of user 1026 and a shimmer pink cosmetic substance digitally applied to the cheekbones of user 1026, makeup look recommendation one 1044 does not. In some implementations of the technology disclosed, this may be due to user 1050 electing to not apply a cosmetic substance by choice or necessity from lack of product. In another implementation of the technology disclosed, a particular cosmetic rendering may be non-translatable (e.g., if a holographic cosmetic substance comprises CGI animation). However, in other implementations of the technology disclosed, makeup look recommendation logic 1042 is configured to output makeup look recommendations that are not aesthetically similar to the processed input makeup look recommendations as shown in Flow 500B.

In contrast to Flow 900B, Flow 1000B illustrates a process by which a makeup recommendation logic 1042 generates a makeup look recommendation that does not possess a high degree of aesthetic similarity to the processed input makeup look recommendation. Makeup look recommendation one 1044 and makeup look recommendation two 1022 comprise overlapping, translatable features such as colors implemented, aesthetic vibe, and corresponding occasions or events (e.g., weekend versus weekday, festivities versus professional events, and so on). However, these features are implemented in different ways resulting in aesthetically differing makeup look recommendations.

In one implementation of the technology disclosed, the makeup look recommendation logic 1042 may be configured to comprise differing feature importances to result in a corresponding difference in output (e.g., a higher feature importance assigned to aesthetic vibe than color may result in recommended looks comprising lower aesthetic similarity but the same aesthetic vibe, such as whimsical makeup looks comprising respectively differing color schemes, whereas a higher feature importance assigned to color than aesthetic vibe may result in recommended looks comprising high aesthetic similarity but differing aesthetic vibes, such as makeup looks comprising red lipstick; however, the input makeup look comprises an edgy aesthetic vibe and the output makeup look comprises a romantic aesthetic vibe).

Figure 11:
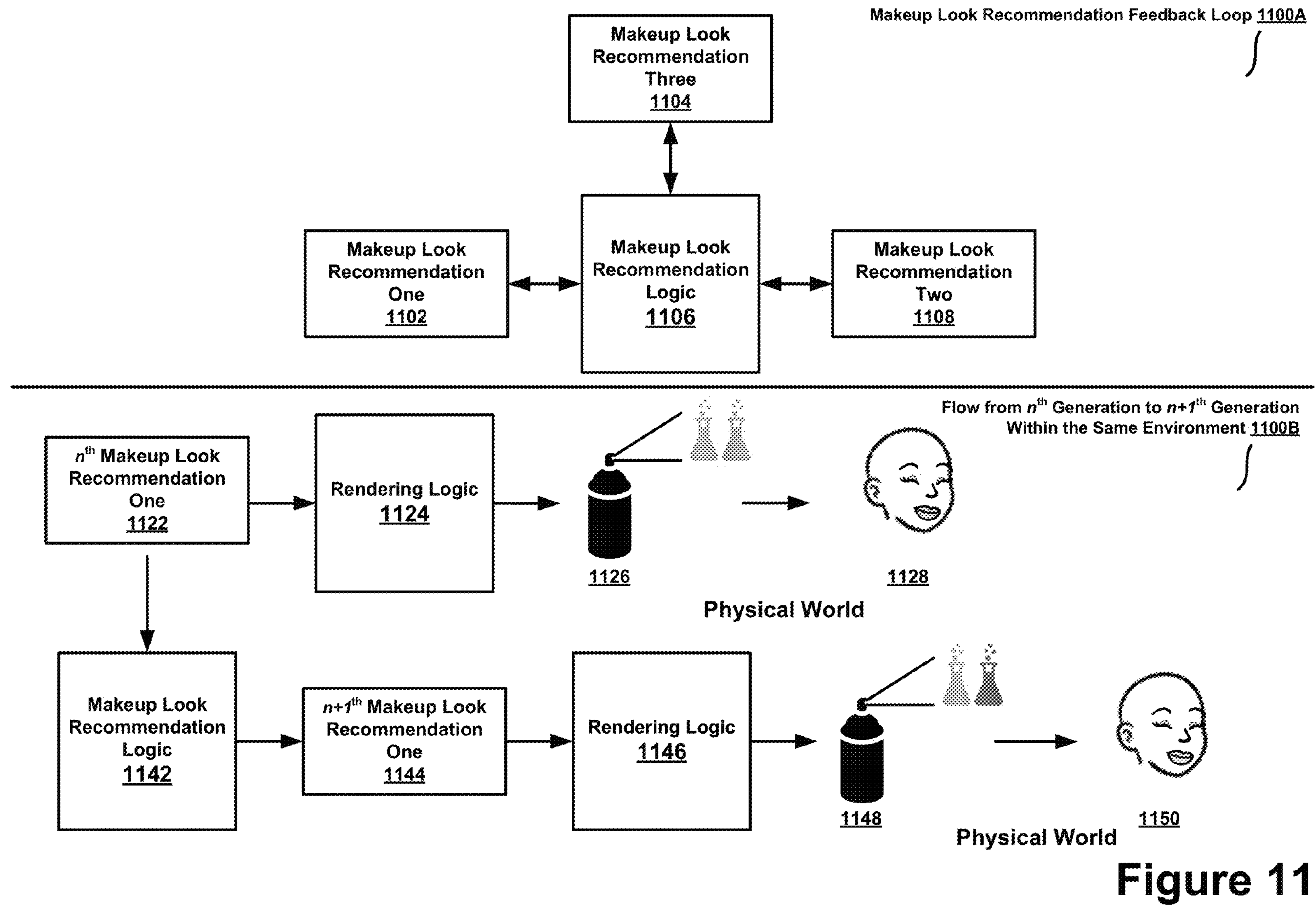
FIG. 11 is a flow diagram demonstrating the processing of a first-generation makeup look recommendation within a particular rendering environment to generate a second-generation makeup look recommendation within the same rendering environment.

FIG. 11 is a flow diagram demonstrating the processing of a first-generation makeup look recommendation within a particular rendering environment to generate a second-generation makeup look recommendation within the same rendering environment. Feedback loop 1100A illustrates the interactive dynamic between makeup look recommendation one 1102, makeup look recommendation two 1108, and makeup look recommendation 1104. Let makeup look recommendation one 1102 be a recommended makeup look implementable within a physical world rendering environment. Let makeup look recommendation two 1108 be a recommended makeup look implementable within an AR world rendering environment. Let makeup look recommendation three 1104 be a recommended makeup look implementable within a metaverse world rendering environment. Makeup look recommendation one 1102, makeup look recommendation two 1108, and makeup look recommendation three 1104 may each respectively be processed as input, or generated as output, for the makeup look recommendation logic 1106 (e.g., makeup look one recommendation one 1102 may be processed as input to generate makeup look recommendation two 1108 as output, makeup look recommendation three 1104 may be processed as input to generate makeup look recommendation one 1102, and so on).

Flow diagram 1100B illustrates an $n^{th}$ generation makeup look recommendation one 1122 being processed as input for makeup look recommendation logic 1142 to generate an $n+1^{th}$ generation makeup look recommendation one 1144 as output. Makeup look recommendation one 1122 is renderable in a physical world rendering environment, thus, when processed by rendering logic 1124, instructions are provided as output to apply makeup look recommendation one 1122 onto the face of user 1128. A smart cosmetic device 1126 is loaded with a cartridge comprising a blue cosmetic substance and a cartridge comprising a pink cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 1128 and the pink cosmetic substance is applied to the lips of user 1128.

In addition to being processed by the rendering logic 1124, the $n^{th}$ makeup look recommendation one 1122 is also processed by makeup look recommendation logic 1142 to generate the $n+1^{th}$ makeup look recommendation one 1144 (i.e., a succeeding makeup look recommendation corresponding to the same rendering environment as the preceding makeup look recommendation; thus, each makeup look recommendation is classified as makeup look recommendation one).

The $n+1^{th}$ generation makeup look recommendation one 1144 is also renderable in a physical world rendering environment, thus, when processed by rendering logic 1126, instructions are provided as output to apply the $n+1^{th}$ makeup look recommendation one 1144 onto the face of user 1150. A smart cosmetic device 1148 is loaded with a cartridge comprising a blue cosmetic substance and a cartridge comprising a purple cosmetic substance, respectively. In one implementation of the technology disclosed, each cartridge is loaded individually to dispense the contained cosmetic substance. In another implementation of the technology disclosed, multiple cartridges may be concurrently loaded to dispense their respective contained cosmetic substances. The blue cosmetic substance is applied to the eyelids of user 1150 and the purple cosmetic substance is applied to the lips of user 1150.

In some implementations of the technology disclosed, the user's behavioral history is used as input to generate inter-reality recommendations such that a user's digital behavior may influence their physical behavior and vice versa. In other implementations of the technology disclosed, the user's behavioral history is used as input to generate further recommendations for a user within the same rendering environment. Selection of a makeup look recommendation within a particular rendering environment does not exclusively influence makeup look recommendations within a separate rendering environment; the selection also influences makeup look recommendations within the same rendering environment. This may be true for any rendering environment and is not limited to physical world makeup look recommendations.

Application of a Makeup Look in the Physical World

The technology disclosed is compatible with a smart cosmetic device used to apply makeup within the physical world. In some implementations of the technology disclosed, the makeup look recommendations are influenced by, and implemented within, the application of cosmetics within the physical world using a cosmetic device. Application of cosmetics using a smart cosmetic device system is elaborated upon further below.

Figure 12:
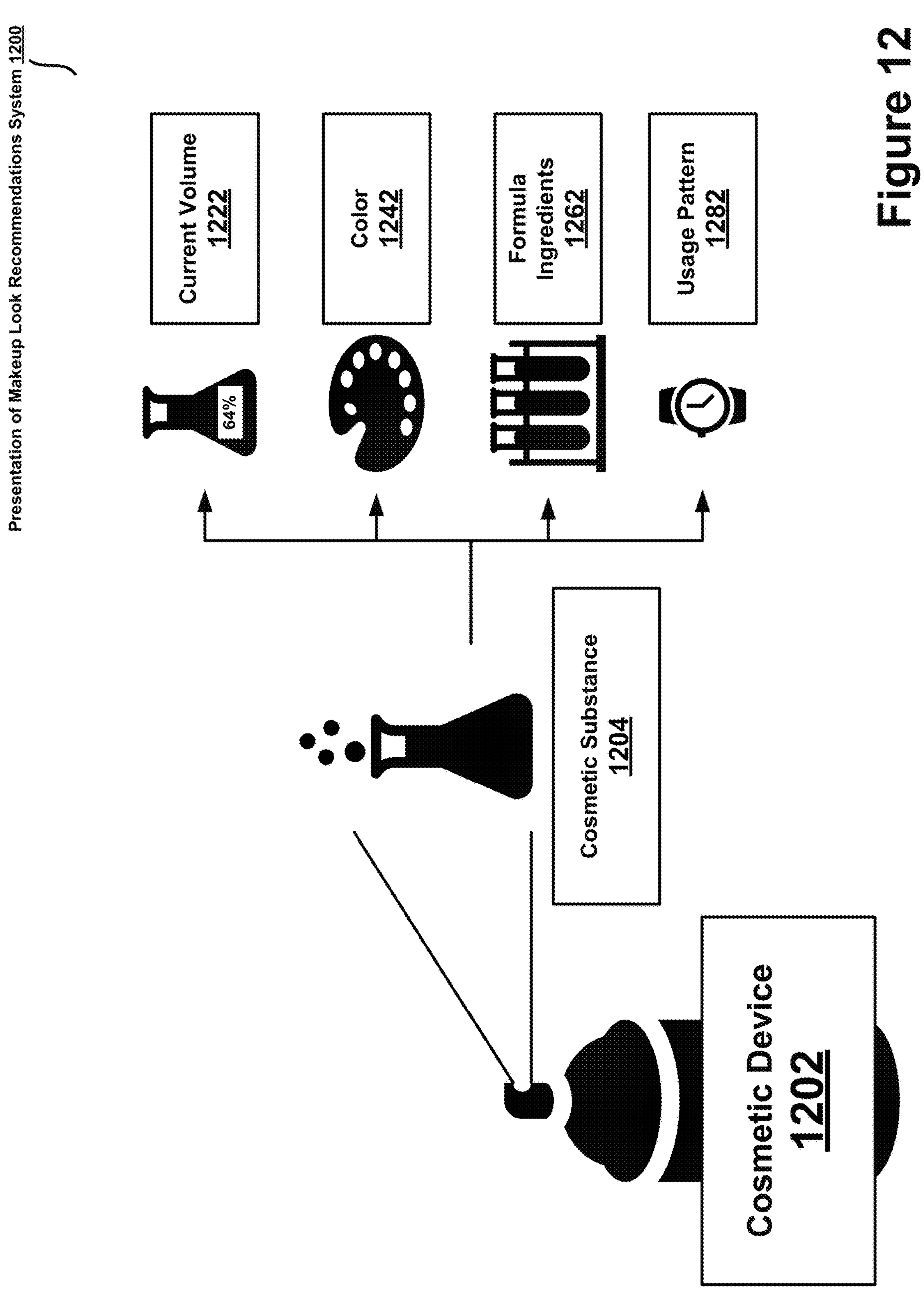
FIG. 12 is an illustration of cosmetic device configurations corresponding to features of a physical world makeup look.

FIG. 12 is an illustration 1200 of cosmetic device configurations corresponding to features of a physical world makeup look. The cosmetic device configurations corresponding to a smart cosmetic device 1202 comprise particular cosmetic substance configurations in addition to particular structural configurations wherein the output of the makeup look recommendation logic is partially influenced by the cosmetic substance configuration. A cartridge comprising the cosmetic substance 1204 is loaded within the cosmetic device 1202. In some implementations of the technology disclosed, a plurality of cartridges is loaded within the cosmetic device 1202. The cosmetic substance 1204 has a current volume 1222, wherein the current volume 1222 of the cosmetic substance 1204 within the cartridge may be monitored by the cosmetic device 1202. The color 1242 of the cosmetic substance 1204 may also be monitored by the cosmetic device. In some implementations of the technology disclosed, the cosmetic device 1202 monitors the characteristics of the cartridge via near-range communication (e.g., NFC tags, Bluetooth, and so on). The color of a cosmetic substance is a translatable feature that may overlap with makeup look recommendations respective to a non-physical world rendering environment.

The formula ingredients 1262 of the cosmetic substance 1204 determine one or more features in addition to color, such as finish (e.g., gloss, matte, or glitter finish) and target function (e.g., hypoallergenic formula, redness reduction formula, pigment retention formula, or waterproof formula) wherein a first cosmetic substance and a second cosmetic substance can have the same color but differing formula ingredients (e.g., a plurality of foundation cosmetic substances comprising an identical shade wherein only one foundation cosmetic substance is formulated for sensitive skin; a plurality of lip tint cosmetic substances comprising an identical shade wherein only one is formulated for a matte finish). The formula of a cosmetic substance is a non-translatable feature that cannot be described for makeup look recommendations respective to a non-physical world rendering environment.

The cosmetic device 1202 collects data on the usage pattern 1282 of a given cosmetic substance 1204. The usage pattern tracks days of week when a particular cosmetic substance is dispensed and times of day when a particular cosmetic substance is dispensed (i.e., a cosmetic substance is dispensed at a higher frequency at a respective time of day on a respective day of week as compared to other cosmetic substances). The usage pattern of a given cosmetic substance, makeup look recommendation selection, aesthetic vibe, or other makeup look recommendation features are translatable features that may overlap with makeup look recommendations respective to a non-physical world rendering environment.

In one implementation of the technology disclosed, one or more device configurations pertaining to the cosmetic substance 1204 correspond to a cosmetic substance currently loaded in the cosmetic device. In another implementation of the technology disclosed, one or more device configurations pertaining to the cosmetic substance 1204 correspond to two or more cosmetic substances concurrently loaded in the cosmetic device. In yet another implementation of the technology disclosed, one or more device configurations pertaining to the cosmetic substance 1204 correspond to one or more cosmetic substances previously loaded in the cosmetic device.

As data specifying configurations of a cosmetic device are processed by a makeup look recommendation logic, the makeup look recommendation logic learns a history and usage pattern of one or more cosmetic substances currently and previously loaded in the cosmetic device and generates one or more makeup look recommendations implementable by the plurality of cosmetic substances currently loaded in the cosmetic device or previously loaded as determined by the cosmetic device usage history (e.g., a cosmetic device is currently loaded with a blue cosmetic substance and has previously been loaded with a pink cosmetic substance, therefore a makeup look is recommended that is realized by the color blue and/or the color pink). These makeup look recommendations may be respective to any rendering environment.

A cosmetic substance currently loaded in the cosmetic device is prioritized over a cosmetic substance previously loaded in the cosmetic device (e.g., a cosmetic device is currently loaded with a blue cosmetic substance and has previously been loaded with a pink cosmetic substance, therefore makeup looks realized by the color blue will be statistically more likely to be recommended by the makeup look recommendation logic than makeup looks realized by the color pink). In many implementations of the technology disclosed, a makeup look realized by a color refers to the color of a cosmetic substance applied within the makeup look. In some other implementations, the term "to be realized by" may refer to a similar color to previously implemented cosmetic substances, a coordinating color (e.g., a user's eye color, a user's outfit color, media inspiration, and so on), or a complementary color (e.g., a color that is aesthetically complementary, but not the same, as a color otherwise implemented to a user's overall appearance).

Figure 13:
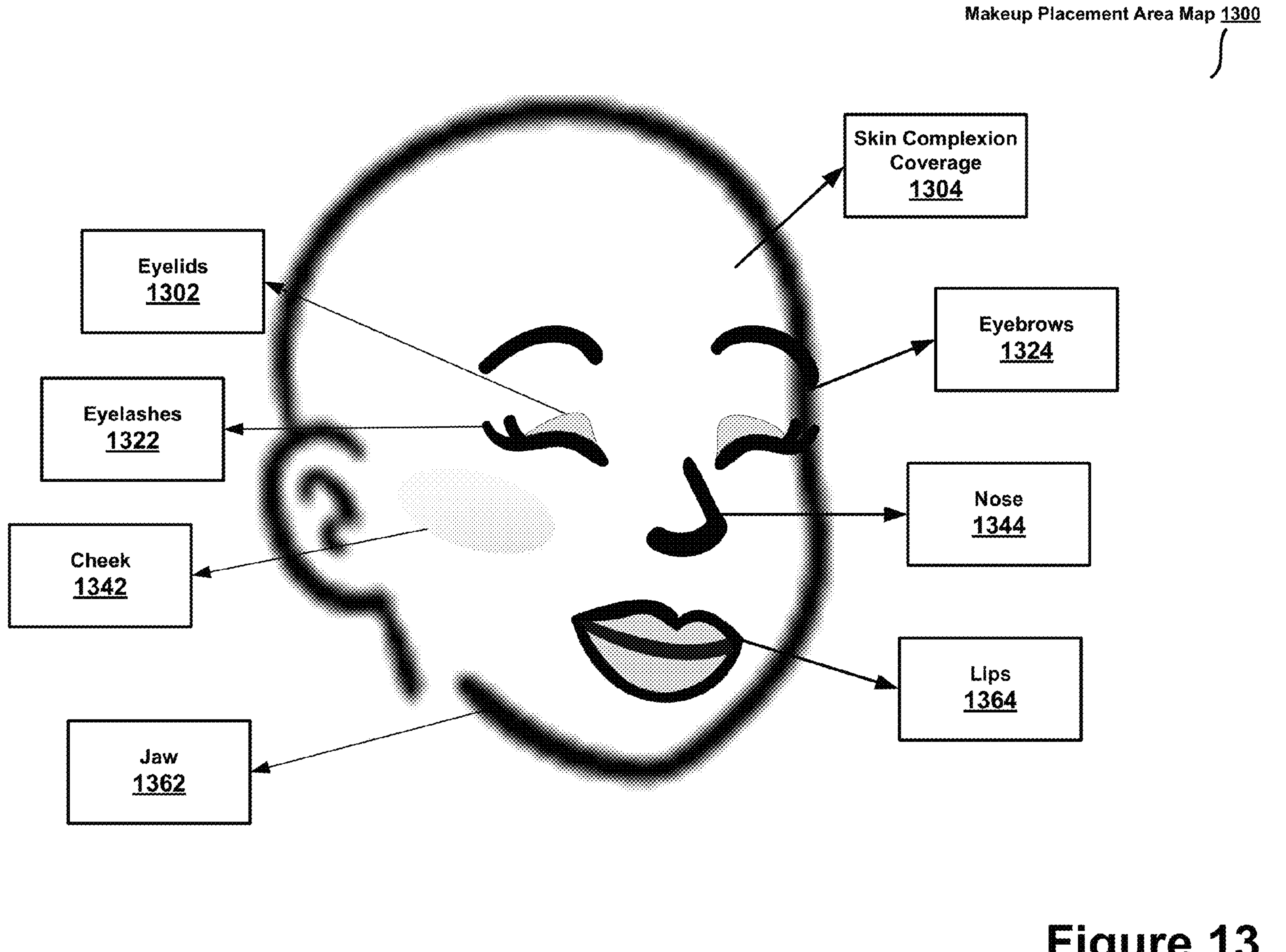
FIG. 13 is an illustration of a human facial map with highlighted makeup placement areas.

FIG. 13 is an illustration 1300 of a human facial map with highlighted makeup placement areas. A makeup look recommendation comprises a particular configuration of makeup placement, style, and color within respective target placement areas on a human face. In some implementations of the technology disclosed, placement areas exist corresponding to non-facial regions (e.g., shoulders, arms, and so on) or non-human features (e.g., wings). A person skilled in the art will recognize that the examples given for cosmetic substance formula and placement are purely for teaching purposes, and a wide range of alternative makeup placement options exist. A cosmetic substance may be applied to the eyelids 1302, wherein the application is characterized by shade, finish, coverage, and detail. In one implementation of the technology disclosed, the cosmetic substance is a colorless priming, moisturizing, or setting formula. In another implementation of the technology disclosed, the cosmetic substance is a pigmented substance intended to render a design in the form of eyeshadow upon the eyelids 1302 using a spray canister or a spray canister augmented by adaptors. In yet another implementation of the technology disclosed, the cosmetic substance is a pigmented substance intended to render a definition line in the form of eyeliner along the lash line or water line of the eye using a pen.

A cosmetic substance applied to the eyelids 1302 comprises characteristics including, but not limited to, shade, finish (e.g., high pigment, glitter, or anti-creasing), formula ingredients particular to one or more target functions (e.g., waterproofing, longtime wear ability, or maintenance of a particular formulation (e.g., vegan, hypoallergenic or gluten-free formula). Each particular cosmetic substance formula for eyelids 1302 application will have one or more particular required design configurations for physical world application (e.g., a pigmented eyeliner wherein the pigmented eyeliner must be applied using a pen comprising a felt-tip brush). In some implementations of the technology disclosed, a makeup look eyelids 1302 component may require one cosmetic substance as a design configuration of the cosmetic device within the plurality of design configurations. In other implementations of the technology disclosed, a makeup look eyelids 1302 component may require two or more cosmetic substances as two or more design configurations of the cosmetic device within the plurality of design configurations. The specific design configuration requirements, final target look characteristics (e.g., artistic design, coverage, and one or more target functions of the cosmetic substance), step-by-step instructions for physical world implementation of the eyelids 1302 component of the makeup look, and rendering code programming are included within the makeup look recommendation.

A cosmetic substance may be applied as a form of skin complexion coverage 1304. Cosmetic substances applied to the skin can be implemented as coverage for the entire face, neck, areas of concern (e.g., blemishes) or specific target placement sub-areas (e.g., contouring of the cheekbone or highlighting of the nose bridge). Cosmetic substances applied for skin complexion coverage 1304 fall under one or more of a plurality of target functions including moisturization, priming (i.e., blending, surface smoothing, redness reduction, providing a base layer with compatible chemistry with future layers such as a silicone primer prior to silicone-based pigmented foundation versus an oil primer prior to oil-based pigmented foundation), pigmented foundation, concealing agents, contouring agents (e.g., bronzer) or setting agents (e.g., waterproofing or smudge-prevention agents dispensed as a fine powder or aerosolized liquid particles).

To achieve a particular target function with a skin complexion coverage 1304 substance, a target combination of formula ingredients is required for physical world rendering. Cosmetic substances intended for skin complexion coverage 1304 comprise characteristics including, but not limited to, a shade, one or more formula ingredients particular to a target function (e.g., oil-control, blendability, or buildability) and formula ingredients necessary to fulfill maintenance of a particular formulation (e.g., vegan, hypoallergenic, or gluten-free formula).

In one implementation of the technology disclosed, a makeup look skin complexion coverage 1304 component may require one cosmetic substance as a design configuration of the cosmetic device within the plurality of design configurations. In other implementations of the technology disclosed, a makeup look skin complexion coverage 1304 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) step-by-step instructions for physical world implementation of the skin complexion coverage 1304 component of the makeup look, and rendering code programming are included within the makeup look recommendation.

A cosmetic substance may be applied to the eyelashes 1322 as a mascara, wherein the cosmetic substance comprises characteristics including, but not limited to, shade, formula ingredients particular to one or more target functions (e.g., waterproofing, anti-smudging, volumizing, lengthening, or curling) and formula ingredients necessary to fulfill maintenance of a particular formulation (e.g., vegan, hypoallergenic, or gluten-free formula). In one implementation of the technology disclosed, physical world application of a cosmetic substance to the eyelashes 1322 may require a particular design configuration wherein the cosmetic device is augmented by one or more adaptors, wherein the compatible adaptors comprise spoolie brushes, eyelash separators, and eyelash curlers. In some implementations of the technology disclosed, a cosmetic substance applied to the eyelashes 1322 is applied to the top eyelashes but not the bottom eyelashes. In other implementations of the technology disclosed, a cosmetic substance applied to the eyelashes 1322 is applied to the bottom eyelashes but not the top eyelashes. In other implementations of the technology disclosed, a cosmetic substance applied to the eyelashes 1322 is applied to both the top and bottom eyelashes.

In one implementation of the technology disclosed, a makeup look eyelashes 1322 component may require one cosmetic substance as a design configuration of the cosmetic device within the plurality of design configurations. In other implementations of the technology disclosed, a makeup look eyelashes 1322 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) step-by-step instructions for physical world implementation of the eyelashes 1322 component of the makeup look, and rendering code programming are included within the makeup look recommendation.

A cosmetic substance may be applied for definition of the eyebrows 1324, wherein the cosmetic substance comprises characteristics including, but not limited to, shade, formula ingredients particular to a target function (e.g., wear longevity or pigmentation contrast), and formula ingredients necessary to fulfill maintenance of a particular formulation (e.g., vegan, hypoallergenic, or gluten-free formula). Cosmetic substances applied to eyebrows 1324 fall under one or more of a plurality of target functions including definition (i.e., shaping and tinting using pigmentation), lifting (i.e., giving the appearance of a heightened brow bone to contour facial structure), and lamination (i.e., sculpting and setting the eyebrow hair in a desired shape).

In one implementation of the technology disclosed, physical world application of a cosmetic substance to the eyebrows 1324 may require a device configuration comprising a spray canister. In another implementation of the technology disclosed, application of a cosmetic substance to the eyebrows 1342 may require a device configuration comprising a spray canister augmented by the use of a particular adaptor brush (e.g., a stiff narrow brush or a spoolie brush) or stencil. In other implementations of the technology disclosed, application of a cosmetic substance to the eyebrows 1324 may require a device configuration comprising a pen. In another implementation of the technology disclosed, application of a cosmetic substance to the eyebrows 1324 may require a device configuration comprising a pen augmented by the use of a particular adaptor brush (e.g., a stiff narrow brush or a spoolie brush) or stencil.

In one implementation of the technology disclosed, a makeup look eyebrows 1324 component may require one cosmetic substance as a design configuration of the cosmetic device within the plurality of design configurations. In other implementations of the technology disclosed, a makeup look eyebrows 1324 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) step-by-step instructions for physical world implementation of the eyebrows 1324 component of the makeup look, and rendering code programming are included within the makeup look recommendation.

A cosmetic substance may be applied to the cheek 1342, wherein the cosmetic substance comprises characteristics including, but not limited to, shade, formula ingredients particular to one or more target functions (e.g., contouring or highlighting) and formula ingredients necessary to fulfill maintenance of a particular formulation (e.g., vegan, hypoallergenic, or gluten-free formula).

While similar to cosmetic substance application for skin complexion coverage 1304, specialized target functions of cosmetic substances exist in contrast to complexion coverage cosmetic substances. In place of or in addition to skin complexion coverage cosmetic substances applied to the face, a cosmetic substance applied to the cheek 1342 can be implemented as a means of contouring, highlighting, or adding pigmentation to the cheekbone and surrounding areas. The processes of contouring or highlighting the skin covering the cheekbone fall under one or more of a plurality of target functions including altering the appearance of bone structure (i.e., to give the impression of a sharper bone structure, higher bone structure, or thinner face), altering the appearance of skin pigmentation (e.g., introducing a bronzed pigment to give the impression of tanned skin or introducing a red pigment to give the impression of a warmer undertone), or altering the appearance of skin texture (e.g., introducing a reflective highlight pigment to give the impression of a hydrated or glowing appearance).

In one implementation of the technology disclosed, physical world application of a cosmetic substance to the cheek 1342 may require a device configuration comprising a spray canister. In another implementation of the technology disclosed, application of a cosmetic substance to the cheek 1342 may require a device configuration comprising a spray canister augmented by the use of a particular adaptor brush (e.g., a wide soft brush or a blending sponge) or stencil.

In one implementation of the technology disclosed, a makeup look cheek 1342 component may require one cosmetic substance as a design configuration of the cosmetic device within the plurality of design configurations. In other implementations of the technology disclosed, a makeup look cheek 1342 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) step-by-step instructions for physical world implementation of the cheek 1342 component of the makeup look, and rendering code programming are included within the makeup look recommendation.

A cosmetic substance may be applied to the nose 1344, wherein the cosmetic substance comprises characteristics including, but not limited to, shade, formula ingredients particular to one or more target functions (e.g., contouring or highlighting) and formula ingredients necessary to fulfill maintenance of a particular formulation (e.g., vegan, hypoallergenic, or gluten-free formula).

While similar to cosmetic substance application for skin complexion coverage 1304, specialized target functions of cosmetic substances exist in contrast to complexion coverage cosmetic substances. In place of or in addition to skin complexion coverage cosmetic substances applied to the face, a cosmetic substance applied to the nose 1344 can be implemented as a means of contouring, highlighting, or adding pigmentation to the nose bridge and surrounding areas. The process of contouring or highlighting the skin covering the nasal bone and cartilage fall under one or more of a plurality of target functions including altering the appearance of bone structure or skin pigmentation (e.g., to give the impression of a different nose size or shape, introducing a red pigment to give the impression of a warmer undertime, or a bright pigment to highlight the tip of the nose).

In one implementation of the technology disclosed, physical world application of a cosmetic substance to the nose 1344 may require a device configuration comprising a spray canister. In another implementation of the technology disclosed, application of a cosmetic substance to the nose 1344 may require a device configuration comprising a spray canister augmented by the use of a particular adaptor brush (e.g., a wide soft brush or a blending sponge) or stencil. In yet another implementation of the technology disclosed, application of a cosmetic substance to the nose 1344 may require a device configuration comprising a pen.

A cosmetic substance may be applied to the jaw 1362, wherein the cosmetic substance comprises characteristics including, but not limited to, shade, formula ingredients particular to one or more target functions (e.g., contouring or highlighting) and formula ingredients necessary to fulfill maintenance of a particular formulation (e.g., vegan, hypoallergenic, or gluten-free formula).

While similar to cosmetic substance application for skin complexion coverage 1304, specialized target functions of cosmetic substances exist in contrast to complexion coverage cosmetic substances. In place of or in addition to skin complexion coverage cosmetic substances applied to the face, a cosmetic substance applied to the jaw 1362 can be implemented as a means of contouring, highlighting, or adding pigmentation to the jawline and surrounding areas. The processes of contouring or highlighting the skin covering the jawbone fall under one or more of a plurality of target functions including altering the appearance of the jawline and neck (i.e., to give the impression of a more defined jawline or thinner neck).

In one implementation of the technology disclosed, physical world application of a cosmetic substance to the jaw 1362 may require a device configuration comprising a spray canister. In another implementation of the technology disclosed, application of a cosmetic substance to the jaw 1362 may require a device configuration comprising a spray canister augmented by the use of a particular adaptor brush (e.g., a wide soft brush or a blending sponge) or stencil.

In one implementation of the technology disclosed, a makeup look jaw 1362 component may require one cosmetic substance as a design configuration of the cosmetic device within the plurality of design configurations. In other implementations of the technology disclosed, a makeup look jaw 1362 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) step-by-step instructions for physical world implementation of the jaw 1362 component of the makeup look, and rendering code programming are included within the makeup look recommendation.

A cosmetic substance may be applied to the lips 1364, wherein the cosmetic substance comprises characteristics including shade, finish (e.g., gloss, glitter, or matte), formula ingredients particular to one or more target functions (e.g., high pigmentation, lip shaping, or hydration) and formula ingredients necessary to fulfill maintenance of a particular formulation (e.g., vegan, hypoallergenic, or gluten-free formula). In one implementation of the technology disclosed, physical world application of a cosmetic substance to the lips 1364 may require a particular design configuration wherein the cosmetic device is augmented by one or more adaptors, wherein the compatible adaptors comprises a doe foot applicator, lip brush, or sponge. In some implementations of the technology disclosed, the cosmetic device is a spray canister used to apply full coverage pigmentation to the lips. In other implementations of the technology disclosed, the cosmetic device is a pen used to apply a line on specific target placement sub-areas (e.g., outer edge of the lips, corner of the lips, or cupid's bow).

In one implementation of the technology disclosed, a makeup look lips 1364 component may require one cosmetic substance as a design configuration of the cosmetic device within the plurality of design configurations. In other implementations of the technology disclosed, a makeup look lips 1364 component may require two or more cosmetic substances as two or more design configurations of the cosmetic device within the plurality of design configurations. The specific design configuration requirements, final target look characteristics (e.g., artistic design, coverage, and one or more target functions of the cosmetic substance) step-by-step instructions for physical world implementation of the lips 1364 component of the makeup look, and rendering code programming are included within the makeup look recommendation.

In some implementations of the technology disclosed, a makeup look may contain cosmetic substance application for all placement areas. In other implementations of the technology disclosed, a makeup look may contain cosmetic substance application for a subset of one or more placement areas within the plurality of placement areas (e.g., skin complexion coverage and lips makeup application, but makeup is not applied to the eyes). A first makeup look and a second makeup look may be distinct in at least one placement area application and may share similarity in at least one placement area application (e.g., a first makeup look and a second makeup look both comprising pink cosmetic substance application on the lips; however, the first makeup look does not comprise cosmetic substance application to the eyelids whereas the second makeup look does). For the facial map shown in FIG. 13, a makeup look is illustrated wherein a pink cosmetic substance is applied to the eyelids 1302, cheek 1342, and lips 1364.

For all described placement areas, physical world non-translatable characteristics are primarily listed for simplicity. Each placement area also corresponds to a plurality of AR world non-translatable characteristics (e.g., depth, object recognition analysis, blur, and so on) and a plurality of VR non-translatable characteristics (e.g., mesh, animation, and so on), respectively.

Figure 14:
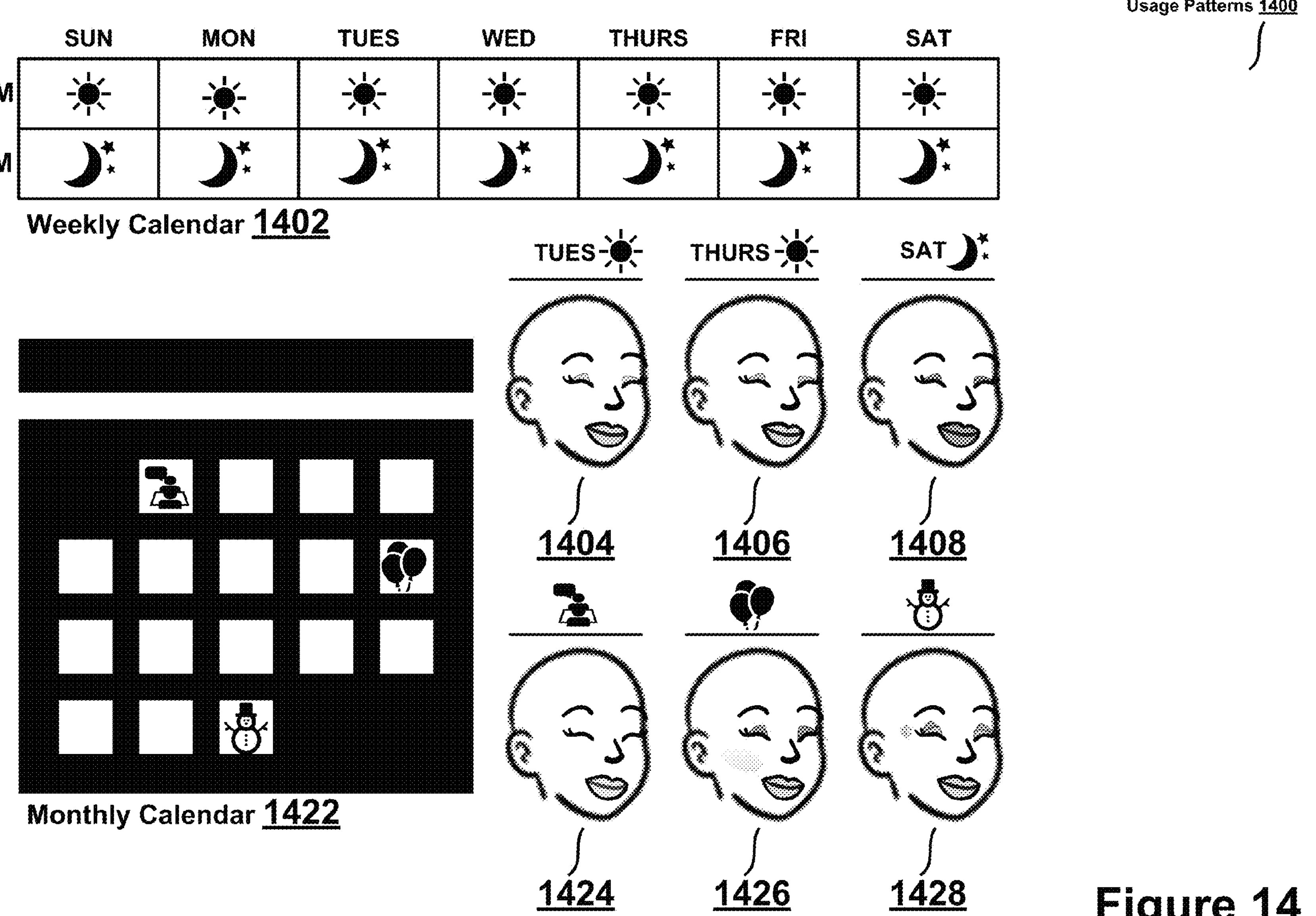
FIG. 14 is a schematic diagram of usage pattern time-frames and occasions.

FIG. 14 is a schematic diagram 1400 of usage pattern timeframes and occasions. A weekly calendar 1402 is shown with days of the week comprising Sunday, Monday, Tuesday, Wednesday, Thursday, Friday, and Saturday. Each day is divided into two time periods, wherein daytime is represented by a sun symbol and nighttime is represented by a moon symbol. A monthly calendar 1422 is shown with various occasions on specific days, wherein a professional engagement in the first week of the month is represented by an icon of two people speaking at a desk, a party in the second week is represented by a balloon symbol, and the Christmas holiday in the fourth week is represented by a snowman symbol. A plurality of makeup look recommendations are illustrated on facial maps, wherein a particular makeup look recommendation conforms to a particular time of a particular day or a particular makeup look recommendation is associated with a particular occasion. In one implementation of the technology disclosed, a makeup look recommendation may propose a makeup look that conforms to a particular time of a particular day, wherein a makeup look recommendation that conforms to the particular time of the particular day comprises at least one cosmetic substance with a usage pattern such that the frequency of the cosmetic substance is higher at that particular time of the particular day than other times of other days. In another implementation of the technology disclosed, a makeup look recommendation may propose a makeup look that conforms to a particular occasion, wherein a makeup look that conforms to the particular occasion comprises at least one cosmetic substance with a usage pattern such that the frequency of the cosmetic substance is higher at that particular occasion than other occasions.

Makeup look recommendation 1404, comprising pink cosmetic substance applied to the eyelids and lips, conforms to daytime on a Tuesday. For makeup look 1404 to conform to daytime on a Tuesday, the pink cosmetic substance usage pattern comprises a high usage frequency during daytime hours on Tuesdays. As a result, a makeup look recommendation logic will be statistically more likely to generate at least one makeup look recommendation that proposes a makeup look that comprises a pink cosmetic substance applied to the eyelids and lips during the daytime on Tuesdays.

Makeup look recommendation 1406, comprising blue cosmetic substance applied to the eyelids and pink cosmetic substance applied to the lips, conforms to daytime on a Thursday. Despite sharing aesthetic similarity with makeup look recommendation 1404 in that both makeup look recommendation 1404 and makeup look recommendation 1406 comprise pink cosmetic substance applied to the lips, blue cosmetic substance applied to the eyelids comprises a higher usage frequency during daytime hours on Thursdays than pink cosmetic substance applied to the eyes. As a result, the makeup look recommendation logic will be statistically more likely to generate at least one makeup look recommendation that proposes a makeup look that comprises a pink cosmetic substance applied to the lips and a blue cosmetic substance applied to the eyelids during the daytime on Thursdays.

Makeup look recommendation 1408, comprising lilac cosmetic substance applied to the eyelids and lips, conforms to nighttime on a Saturday. Makeup look recommendation 1408 conforms to both a different time of day and day of the week than makeup look recommendations 1404 and 1408. For makeup look recommendation 1404 to conform to nighttime on a Saturday, the lilac cosmetic substance usage pattern comprises a high usage frequency during nighttime hours on Saturdays. As a result, the makeup look recommendation logic will be statistically more likely to generate at least one makeup look recommendation that proposes a makeup look that comprises a lilac cosmetic substance applied to the eyelids and lips.

Makeup look recommendation 1424, comprising mauve cosmetic substance applied to the lips, conforms to a professional engagement occasion. For makeup look recommendation 1424 to conform to a professional engagement occasion, the mauve cosmetic substance usage pattern comprises a high usage frequency for professional engagement occasions in one implementation of the technology disclosed. In another implementation of the technology disclosed, makeup look recommendation 1424 conforms to a professional engagement occasion due to the low usage frequency for any cosmetic substance applied to placement areas other than the lips. In some implementations of the technology disclosed, makeup look recommendation 1424 conforms to a professional engagement occasion due to both the high usage frequency of a cosmetic substance applied to the lips and the low usage frequency for any cosmetic substance applied to placement areas other than the lips in combination. As a result, the makeup look recommendation logic will be statistically more likely to generate at least one makeup look recommendation that proposes a makeup look that comprises a mauve cosmetic substance applied to the lips for a professional occasion.

Makeup look recommendation 1426, comprising teal cosmetic substance applied to the eyelids and pink cosmetic substance applied to both the cheeks and lips, conforms to a party occasion. For makeup look recommendation 1426 to conform to a party occasion, at least one respective cosmetic substance applied to a respective placement area within makeup look recommendation 1426 must have a usage pattern comprising a high usage frequency respective to the corresponding placement area illustrated for makeup look recommendation 1426 in some implementations of the technology disclosed. In other implementations of the technology disclosed, each cosmetic substance applied to a respective placement area within makeup look recommendation 1426 must have a usage pattern comprising a high usage frequency respective to the corresponding placement area illustrated for makeup look recommendation 1426. As a result, the makeup look recommendation logic will be statistically more likely to generate at least one makeup look recommendation that proposes a makeup look that comprises a teal cosmetic substance applied to the eyelids and/or pink cosmetic substance applied to both the cheeks and/or lips for a party occasion.

Makeup look recommendation 1428, comprising red cosmetic substance and green cosmetic substance applied to the eyelids, pink cosmetic substance applied to the lips, and blue cosmetic substance applied to the skin as a snowflake design, conforms to a Christmas holiday occasion. For makeup look recommendation 1428 to conform to a party occasion, at least one respective cosmetic substance applied to a respective placement area within makeup look recommendation 1428 must have a usage pattern comprising a high usage frequency respective to the corresponding placement area illustrated for makeup look recommendation 1428 in some implementations of the technology disclosed. In other implementations of the technology disclosed, each cosmetic substance applied to a respective placement area within makeup look recommendation 1428 must have a usage pattern comprising a high usage frequency respective to the corresponding placement area illustrated for makeup look recommendation 1428. As a result, the makeup look recommendation logic will be statistically more likely to generate at least one makeup look recommendation that proposes a makeup look that comprises a red cosmetic substance and green cosmetic substance applied to the eyelids and/or pink cosmetic substance applied to both the lips and/or blue cosmetic substance applied as a snowflake design on the skin for a Christmas holiday occasion.

Figure 15:
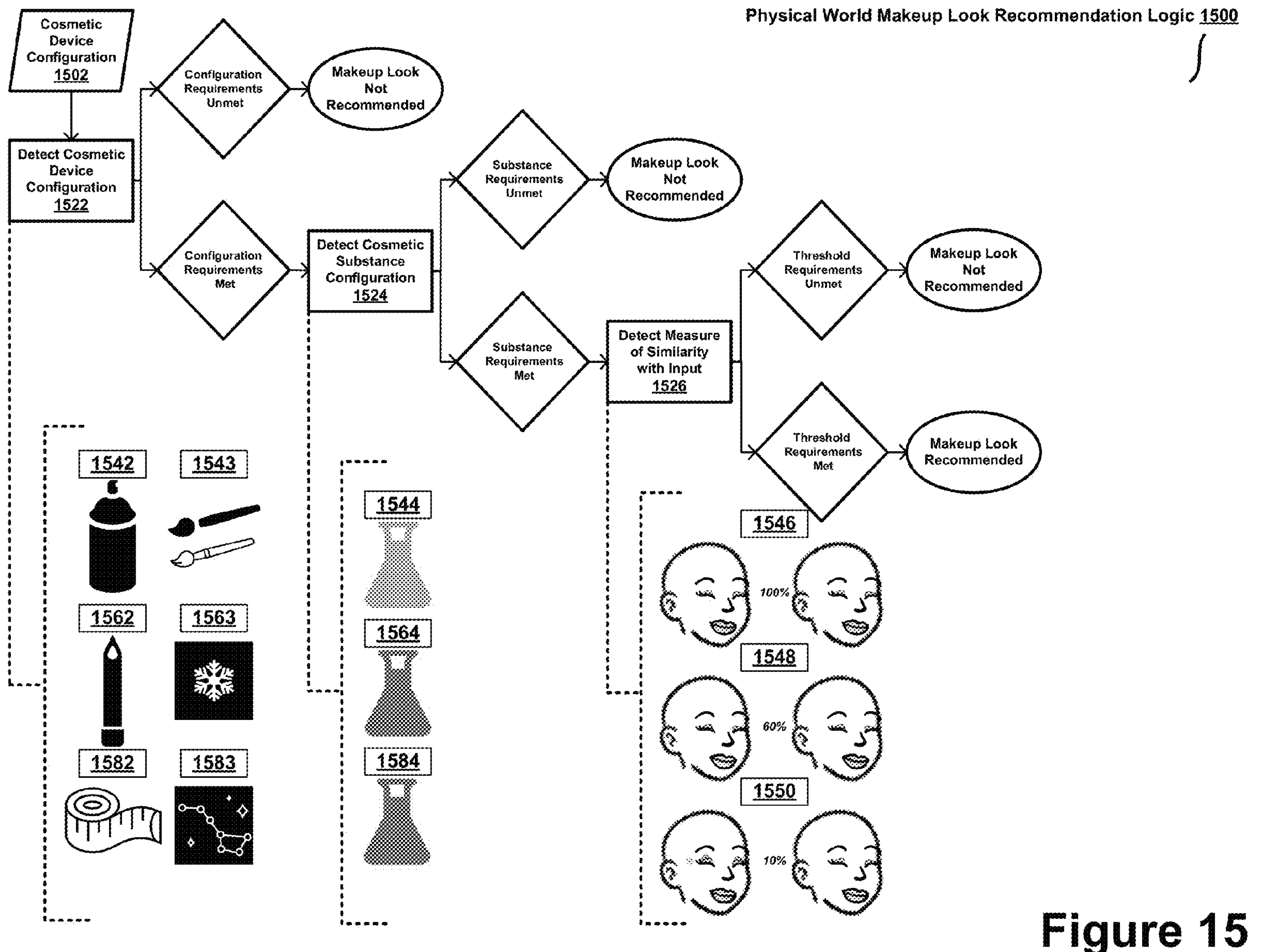
FIG. 15 is an example flow diagram of the makeup look recommendation logic for a physical world makeup look recommendation.

FIG. 15 is an example flow diagram 1500 of the makeup look recommendation logic for a physical world makeup look recommendation. The makeup look recommendation logic 1500 proposes at least one makeup look recommendation that proposes a makeup look that is implementable by a particular design configuration, realized by the features of a particular cosmetic substance, and comparable to an input makeup look recommendation. In some implementations of the technology disclosed, the cosmetic substance is dictated by the usage pattern corresponding to a specific time of a specific day or a specific occasion. In other implementations of the technology disclosed, the cosmetic substance is a currently loaded cosmetic substance. In other implementations of the technology disclosed, the cosmetic substance is a previously loaded cosmetic substance. In some implementations of the technology disclosed, the cosmetic substance currently loaded is prioritized by the makeup look recommendation logic 1500 over a cosmetic substance previously loaded or a cosmetic substance that conforms to a particular usage pattern unless otherwise specified.

A cosmetic device configuration 1502 undergoes a detection process 1522. The process of detecting the cosmetic device configuration 1522 may detect device configurations such as a spray canister 1542, a pen 1562, a tape dispenser 1582, brush adaptors 1543, or stencils such as the snowflake stencil 1563 or the constellation stencil 1583. If the device configuration requirements are not met for a particular makeup look (i.e., the particular makeup look comprises application of a cosmetic substance using a device configuration which is not available), the makeup look is not recommended. If the device configuration requirements are met for the particular makeup look, the plurality of features corresponding to the cosmetic substance is detected.

The process of detecting the plurality of features corresponding to the cosmetic substance 1524 may detect a variety of cosmetic substances including a blue cosmetic substance of a particular formulation 1544, a purple cosmetic substance of a particular formulation 1564, or a green cosmetic substance of a particular formulation 1584. If the cosmetic substance requirements are not met for the particular makeup look (e.g., the particular makeup look comprises the application of a cosmetic substance using a cosmetic substance comprising a color that is not available), the makeup look is not recommended. If the cosmetic substance color requirements are met for the particular makeup look, the measure of similarity with at least one input makeup look recommendation is detected.

The process of calculating a measure of similarity between a potential makeup look recommendation and one or more input makeup look recommendations results in the generation of a similarity score (i.e., the score may be within a range of 0-100% similar) as determined by the similarity of the respective feature vectors corresponding to each respective makeup look recommendation to be compared. Each makeup look recommendation corresponds to a vector comprising feature data (also referred to as a makeup look fingerprint) describing the plurality of translatable and non-translatable features corresponding to the makeup look recommendation.

The makeup look fingerprint for a particular makeup look recommendation allows for standardization of makeup look recommendations corresponding to differing rendering environments. For example, a respective makeup look comprising a blue cosmetic substance applied to the eyelids and a pink cosmetic substance applied to the lips of a user may be described by a respective makeup look fingerprint comprising translatable features (e.g., color) and non-translatable features corresponding to each respective rendering environment the respective makeup look is renderable within (e.g., formula in the physical world, contrast in the AR world, or mesh in the VR world) such that the respective makeup look rendered within a particular rendering environment comprises data values corresponding to non-translatable features of that particular rendering environment and Not A Number (NaN) values corresponding to non-translatable features of all other rendering environments.

This standardized fingerprinting method results in a computationally efficient process for contrasting the implementation of a particular makeup look recommendation within different rendering environments while maintaining the integrity of the aesthetic nature of the makeup look recommendation. Moreover, standardized fingerprinting also allows for a robust measure of similarity to be calculated for two or more makeup look recommendations regardless of the respective rendering environments of the respective makeup look recommendations.

In example comparison 1546, the first and second makeup look recommendations possess 100% similarity (i.e., the set of makeup look recommendation features corresponding to the first makeup look recommendation and the set of makeup look recommendation features corresponding to the second makeup look recommendation are fully overlapping sets). In example comparison 1548, the first and second makeup look recommendations possess 60% similarity (i.e., the set of makeup look recommendation features corresponding to the first makeup look recommendation and the set of makeup look recommendation features corresponding to the second makeup look recommendation are moderately overlapping sets with some non-overlapping features). In example comparison 1550, the first and second makeup look recommendations possess 10% similarity (i.e., the set of makeup look recommendation features corresponding to the first makeup look recommendation and the set of makeup look recommendation features corresponding to the second makeup look recommendation are minimally overlapping sets with a large number of non-overlapping features).

If a particular makeup look recommendation has an acceptable degree of similarity with the input makeup look recommendation(s), as defined by a pre-determined threshold value, the makeup look will be recommended to the user.

Makeup Look Recommendation Features and Fingerprints

Features associated with a particular makeup look recommendation are expanded upon further below.

Figure 16:
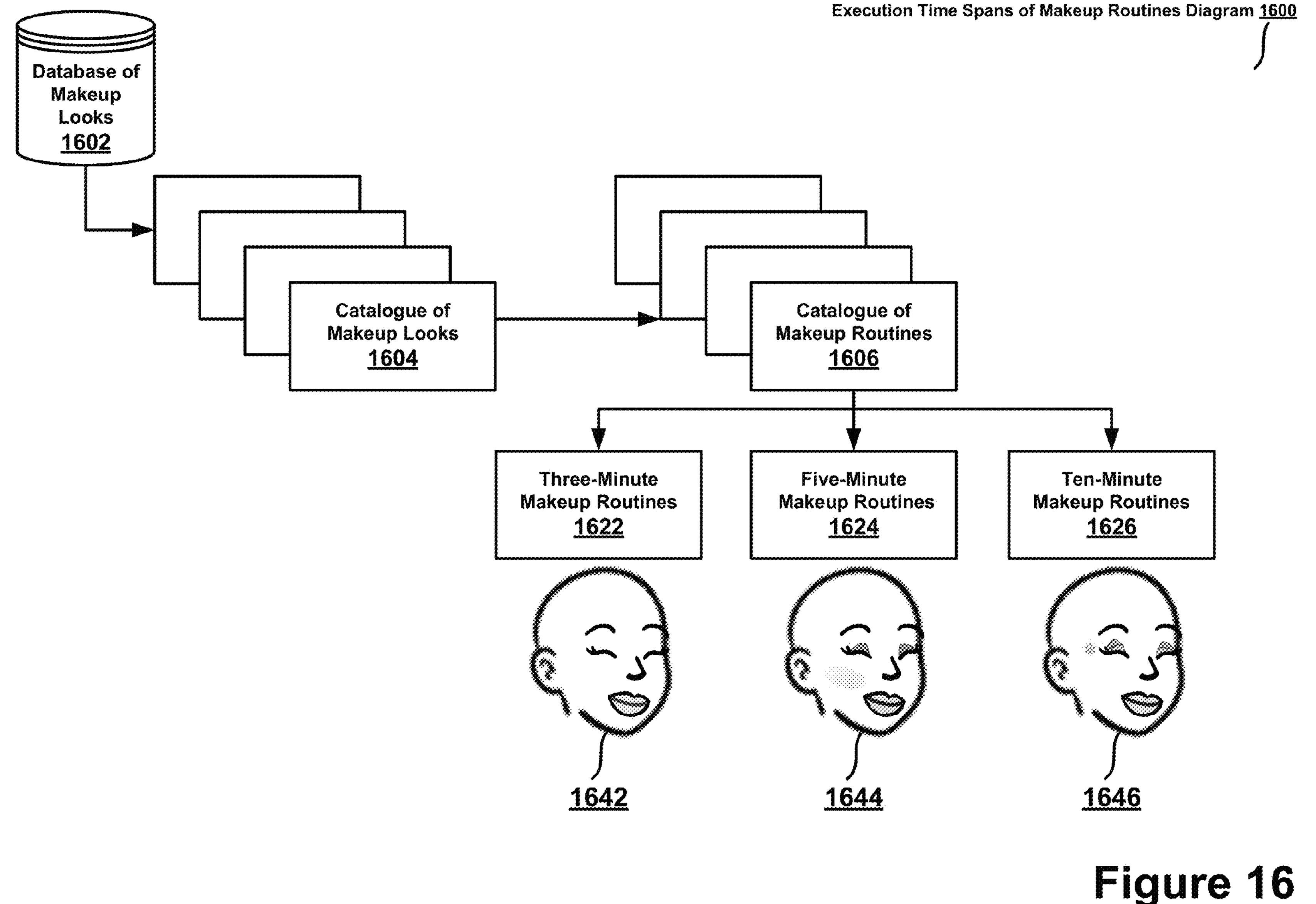
FIG. 16 contains a flow diagram describing the selection of makeup routines executable within a specified time span from a catalogue of makeup routines.

FIG. 16 contains a flow diagram 1600 describing the selection of makeup routines executable within a specified time span from a catalogue of makeup routines. A catalogue of makeup looks 1604 can be selected from a catalogue of makeup looks 1606. Each respective makeup look within the catalogue of makeup looks 1604 is realized by a respective makeup routine within a catalogue of makeup routines 1606. The catalogue of makeup routines 1606 can be categorized by the time spans in which a makeup routine can be executed.

For example, three-minute makeup routines 1622 can be extracted from the catalogue. Makeup look 1642 is an example of a makeup look realized by a three-minute makeup routine, wherein the only makeup application is a pink cosmetic substance applied as lipstick to the lips. Additionally, five-minute makeup routines 1624 can be extracted from the catalogue. Makeup look 1644 is an example of a makeup look realized by a five-minute makeup routine, wherein the makeup application comprises a pink cosmetic substance applied as lipstick to the lips and as blush to the cheeks and a blue cosmetic substance applied as eyeshadow to the eyelids. Finally, ten-minute makeup routines 1646 can be extracted from the catalogue. Makeup look 1646 is an example of a makeup look realized by a ten-minute makeup routine, wherein the makeup application comprises a pink cosmetic substance applied as lipstick to the lips, a red cosmetic substance and a green cosmetic substance applied as eyeshadow to the eyelids, and a blue cosmetic substance applied as a snowflake design on the skin.

A wide range of execution time spans for a particular makeup routine exist beyond the three-minute, five-minute, and ten-minute makeup routines ranging from one minute up to any number of minutes. A person skilled in the art will appreciate that three-, five-, and ten-minute time spans are expressed explicitly as examples of execution time spans, and that in other implementations, these can be any other execution time spans, such as one-minute, thirty-minutes, forty-five-minutes, and so on.

Figure 17:
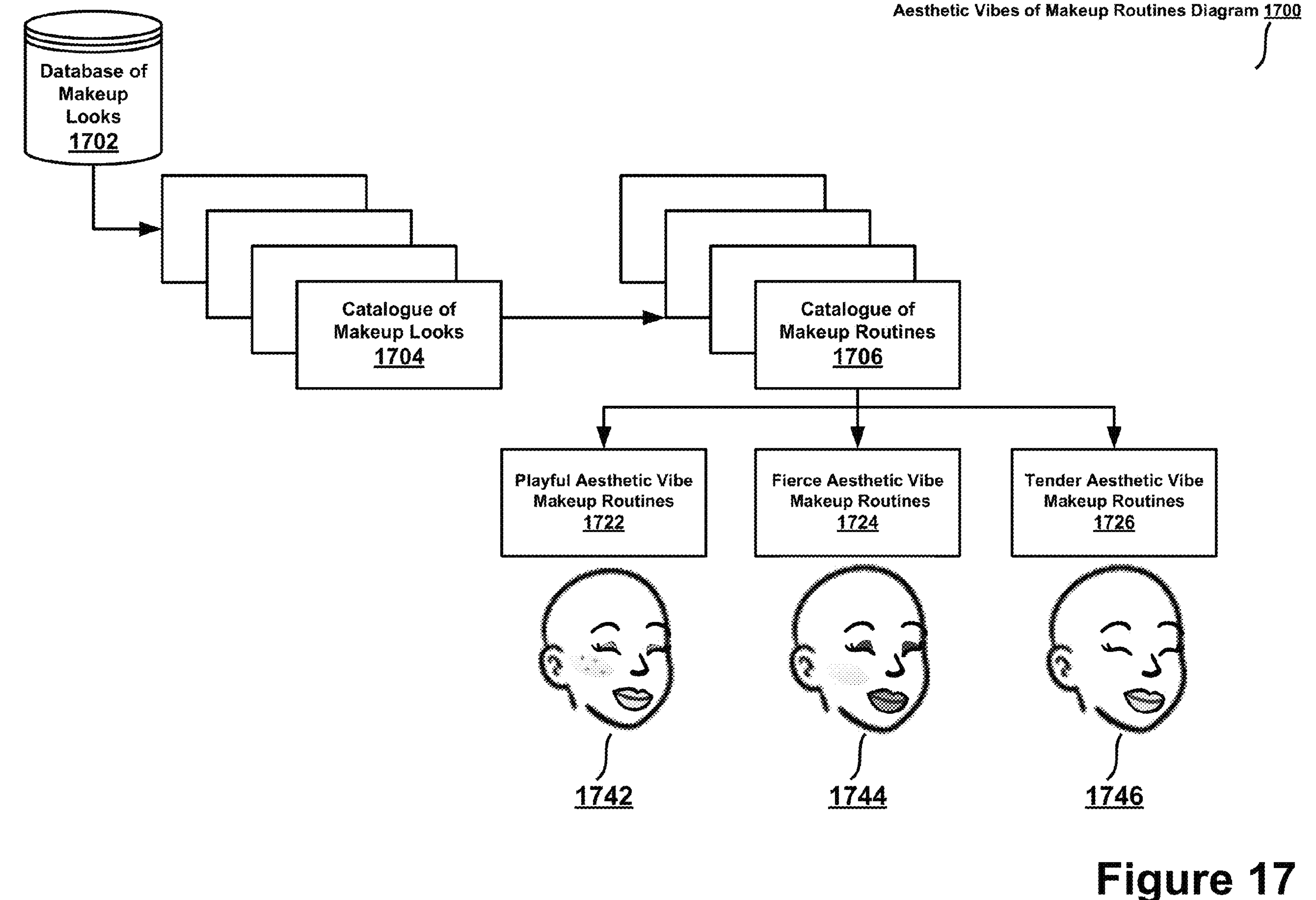
FIG. 17 contains a flow diagram describing selection of makeup routines applicable to a specific aesthetic vibe from a catalogue of makeup routines.

FIG. 17 contains a flow diagram 1700 describing selection of makeup routines applicable to a specific aesthetic vibe from a catalogue of makeup routines. A catalogue of makeup looks 1704 can be selected from a database of makeup looks 1702. Each respective makeup look within the catalogue of makeup looks 1704 is realized by a respective makeup routine within a catalogue of makeup routines 1706. The catalogue of makeup routines 1706 can be categorized by the specific aesthetic vibe applicable to a specific makeup routine.

For example, playful aesthetic vibe makeup routines 1722 can be extracted from the catalogue. Makeup look 1742 is an example of a makeup look realized by a playful aesthetic vibe makeup routine, wherein the makeup application comprises pink and blue blend glitter cosmetic substance applied as eyeshadow to the eyelids, pink glitter cosmetic substance applied as highlighter to the cheeks, and pink cosmetic substance applied as lipstick to the lips. Additionally, fierce aesthetic vibe makeup routines 1724 can be extracted from the catalogue. Makeup look 1744 is an example of a makeup look realized by an fierce aesthetic vibe makeup routine, wherein the makeup application comprises a blue cosmetic substance applied as eyeshadow to the eyes, pink cosmetic substance applied as blush to the cheeks, and purple cosmetic substance applied as lipstick to the lips. Finally, tender aesthetic vibe makeup routines 1746 can be extracted from the catalogue. Makeup look 1746 is an example of a makeup look realized by a tender aesthetic vibe makeup routine, wherein the makeup application comprises a light pink cosmetic substance applied as tinted lip balm to the lips.

Additional aesthetic vibes for a particular makeup routine exist beyond playful, fierce, and tender. A person skilled in the art will appreciate that playful, fierce, and tender aesthetic vibes are expressed explicitly as examples of applicable aesthetic vibes, and that in other implementations, these can be any other aesthetic vibes, such as free, angry, magnetic, punk, joyous, chill, and so on. Moreover, a person skilled in the art will appreciate that many aesthetic vibes may overlap and one makeup routine can correspond to two or more aesthetic vibes, such as fierce and punk, mysterious and tender, and so on.

Figure 18:
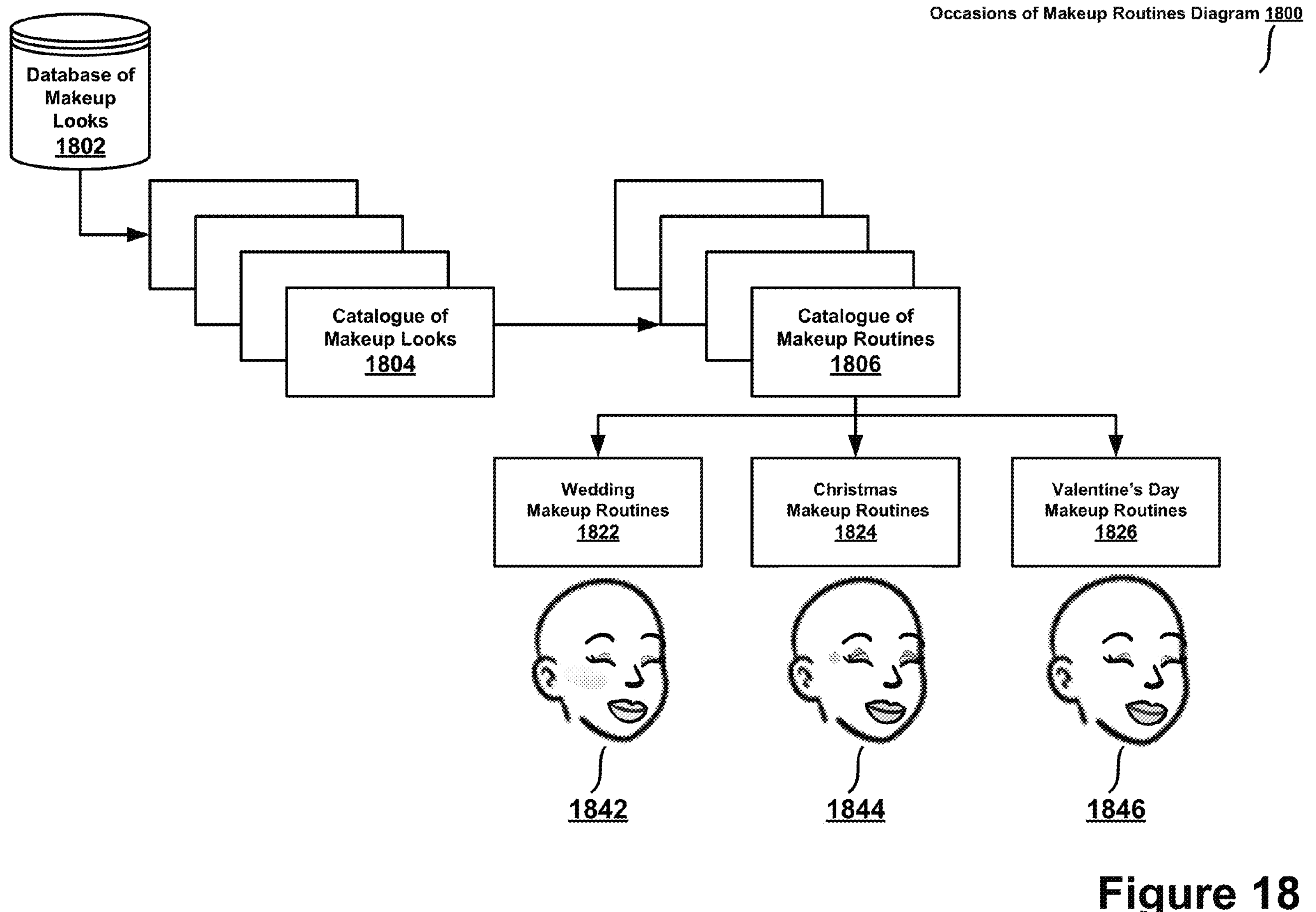
FIG. 18 contains a flow diagram describing selection of makeup routines applicable to a specific occasion from a catalogue of makeup routines.

FIG. 18 contains a flow diagram 1800 describing selection of makeup routines applicable to a specific occasion from a catalogue of makeup routines. A catalogue of makeup looks 1804 can be selected from a database of makeup looks 1802. Each respective makeup look within the catalogue of makeup looks 1804 is realized by a respective makeup routine within a catalogue of makeup routines 1806. The catalogue of makeup routines 1806 can be categorized by the specific occasion applicable to a specific makeup routine.

For example, wedding occasion makeup routines 1822 can be extracted from the catalogue. Makeup look 1842 is an example of a makeup look comprising pink cosmetic substance applied as eyeshadow to the eyelids, blush to the cheeks, and lipstick to the lips. Additionally, Christmas occasion makeup routines 1824 can be extracted from the catalogue. Makeup look 1844 is an example of a makeup look realized by a Christmas occasion makeup routine, wherein the makeup application comprises a pink cosmetic substance applied as lipstick to the lips, a red cosmetic substance and a green cosmetic substance applied as eyeshadow to the eyelids, and a blue cosmetic substance applied as a snowflake design on the skin. Finally, Valentine's Day occasion makeup routines 1846 can be extracted from the catalogue. Makeup look 1846 is an example of a makeup look realized by a Valentine's Day occasion makeup routine, wherein the makeup application comprises a hot pink cosmetic substance applied as lipstick to the lips, a red and white blend cosmetic substance applied as eyeshadow to the eyelids, and a red cosmetic substance applied as a heart design on the skin.

Additional occasions for a particular makeup routine exist beyond wedding, Christmas, and Valentine's Day. A person skilled in the art will appreciate that wedding, Christmas, and Valentine's Day occasions are expressed explicitly as examples of applicable occasions, and that in other implementations, these can be any other occasions, such as Rosh Hashanah, Diwali, graduation and so on. Moreover, a person skilled in the art will appreciate that many occasions may overlap and one makeup routine can correspond to two or more occasions, such as weddings and Valentine's Day, birthdays and graduation, and so on.

Figure 19:
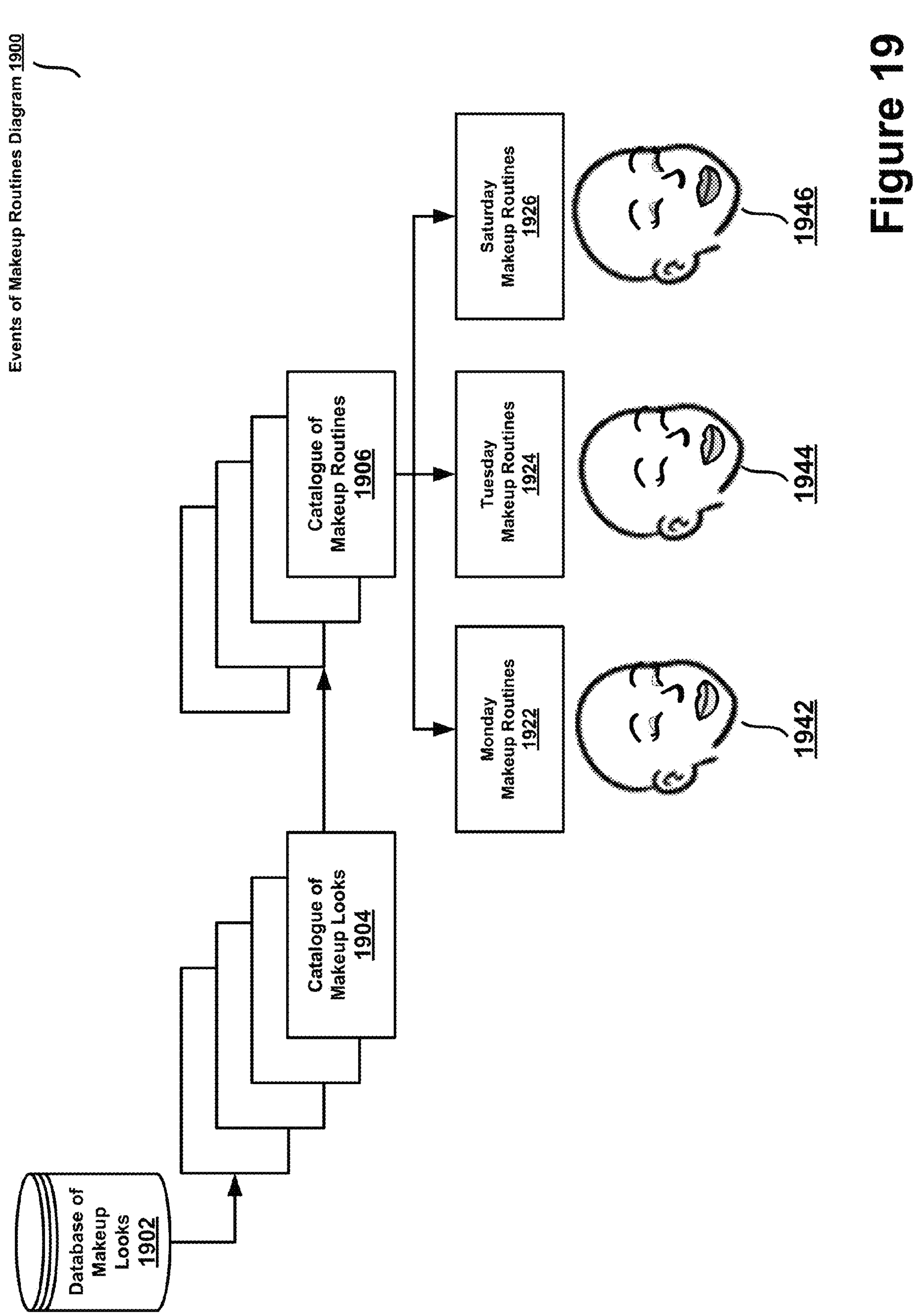
FIG. 19 contains a flow diagram describing selection of makeup routines applicable to a specific event from a catalogue of makeup routines.

FIG. 19 contains a flow diagram 1900 describing selection of makeup routines applicable to a specific event from a catalogue of makeup routines. A catalogue of makeup looks 1904 can be selected from a database of makeup looks 1902. Each respective makeup look within the catalogue of makeup looks 1904 is realized by a respective makeup routine within a catalogue of makeup routines 1906. The catalogue of makeup routines 1906 can be categorized by the specific event applicable to a specific makeup routine.

For example, Monday event makeup routines 1922 can be extracted from the catalogue. Makeup look 1942 is an example of a makeup look comprising pink cosmetic substance applied as eyeshadow to the eyelids and as lipstick to the lips. Additionally, Tuesday event makeup routines 1924 can be extracted from the catalogue. Makeup look 1944 is an example of a makeup look realized by a Tuesday event makeup routine, wherein the makeup application comprises only a pink cosmetic substance applied as lipstick to the lips. Finally, Saturday event makeup routines 1946 can be extracted from the catalogue. Makeup look 1946 is an example of a makeup look realized by a Saturday event makeup routine, wherein the makeup application comprises a purple and white blend cosmetic substance applied as eyeshadow to the eyelids, and a red cosmetic substance applied as lipstick to the lips.

Additional events for a particular makeup routine exist beyond Monday, Tuesday, and Saturday. A person skilled in the art will appreciate that Monday, Tuesday, and Saturday events are expressed explicitly as examples of applicable events, and that in other implementations, these can be any other events, such as Wednesday, Friday, Sunday and so on. Moreover, a person skilled in the art will appreciate that many events may overlap and one makeup routine can correspond to two or more events, such as Monday and Tuesday, Friday and Saturday, and so on. Additionally, as illustrated in weekly calendar 1402, events for a particular makeup routine can also be specific to a specific time of a specific day, such as Tuesday morning, Saturday evening, and so on.

Figure 20:
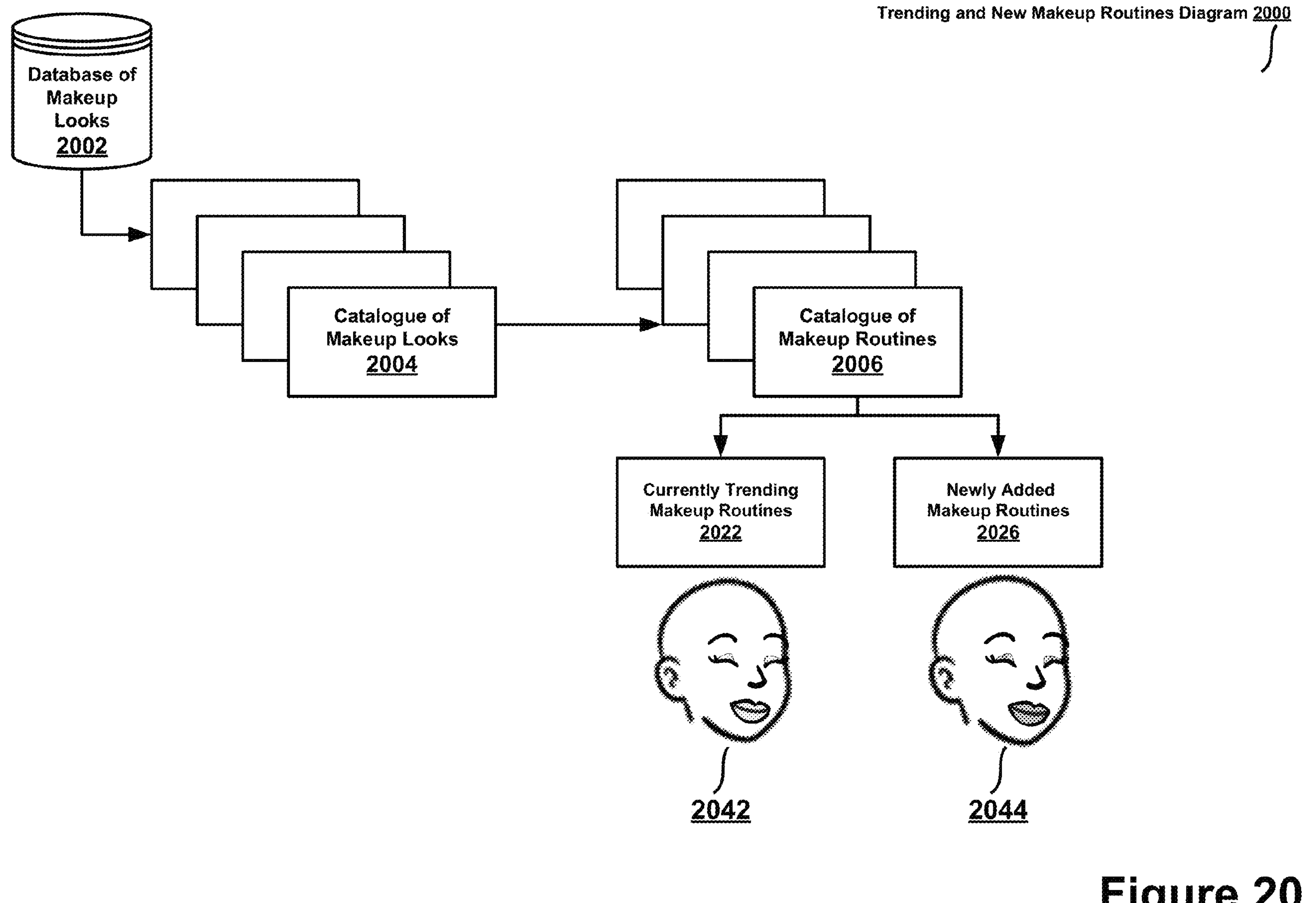
FIG. 20 contains a flow diagram describing selection of makeup routines currently trending or newly added within a catalogue of makeup routines.

FIG. 20 contains a flow diagram 2000 describing selection of makeup routines currently trending or newly added within a catalogue of makeup routines. A catalogue of makeup looks 2004 can be selected from a database of makeup looks 2002. Each respective makeup look within the catalogue of makeup looks 2004 is realized by a respective makeup routine within a catalogue of makeup routines 2006. The catalogue of makeup routines 2006 can be categorized as currently trending, wherein currently trending makeup looks are inferred from most frequently selected makeup looks in one or more online networks. The catalogue of makeup routines 2006 can also be categorized as newly added, wherein the newly added makeup looks are the most recently added makeup looks within the database of makeup looks. A makeup look can be both currently trending and newly added. A makeup look can also be neither currently trending nor newly added. A makeup look recommendation logic will prioritize newly added and/or currently trending makeup looks above looks that are not newly added or currently trending.

For example, currently trending makeup routines 2022 can be extracted from the catalogue. Makeup look 2042 is an example of a currently trending makeup look comprising pink cosmetic substance applied as eyeshadow to the eyelids and as lipstick to the lips. Additionally, newly added makeup routines 2026 can be extracted from the catalogue. Makeup look 2044 is an example of a newly added makeup look, wherein the makeup application comprises a purple and white blend cosmetic substance applied as eyeshadow to the eyelids and a red cosmetic substance applied as lipstick to the lips.

FIG. 21 is an illustration of makeup look fingerprint features corresponding to different rendering environments. Makeup Look A 2100 comprises a blue cosmetic substance applied to the eyelids and a pink cosmetic substance applied to the lips of a human face. Makeup Look A 2100 comprises a respective makeup look fingerprint, and the respective makeup look fingerprint comprises translatable features between rendering environments and non-translatable features corresponding to a particular rendering environment. Makeup Look A 2100 may be rendered in a physical environment with the application of physical cosmetic substances onto the face of user 2104 using a cosmetic device 2102. Some of the fingerprint values corresponding to the physical world 2106 are translatable to the AR world and the metaverse world (e.g., color, placement area, usage pattern and other non-italicized features). Other fingerprint values corresponding to the physical world 2106 are non-translatable to the AR world and the metaverse world (e.g., finish, formula, and device configuration; italicized).

Makeup Look A 2100 may be rendered in an AR environment with the application of AR filter cosmetic substances onto the image of user 2122 using a smart device 2124. Some of the fingerprint values corresponding to the AR world 2126 are translatable to the physical world and the metaverse world (e.g., color, placement area, usage pattern and other non-italicized features). Other fingerprint values corresponding to the AR world 2126 are non-translatable to the physical world and the metaverse world (e.g., focus, brightness/contrast, and resolution/refresh rate; italicized).

Makeup Look A 2100 may be rendered in a metaverse environment with the application of digital cosmetic substances onto the face of a virtual reality avatar 2122 within a smart device application. Some of the fingerprint values corresponding to the metaverse world 2146 are translatable to the physical world and the AR world (e.g., color, placement area, usage pattern and other non-italicized features). Other fingerprint values corresponding to the metaverse world 2146 are non-translatable to the physical world and the AR world (e.g., animation blend shapes, texture atlasing, and 3D modeling mesh; italicized).

A person skilled in the art will appreciate that the maximum dimensionality of a makeup look fingerprint is substantially higher than that of the example Makeup Look A 2100. Substantially more translatable features (e.g., vibrance, complexity, associated media or celebrities, and so on) and non-translatable features (e.g., financial cost of a cosmetic substance cartridge, depth sensoring, avatar movement, and so on) may be used to characterize a particular makeup look.

Computer System

Figure 22:
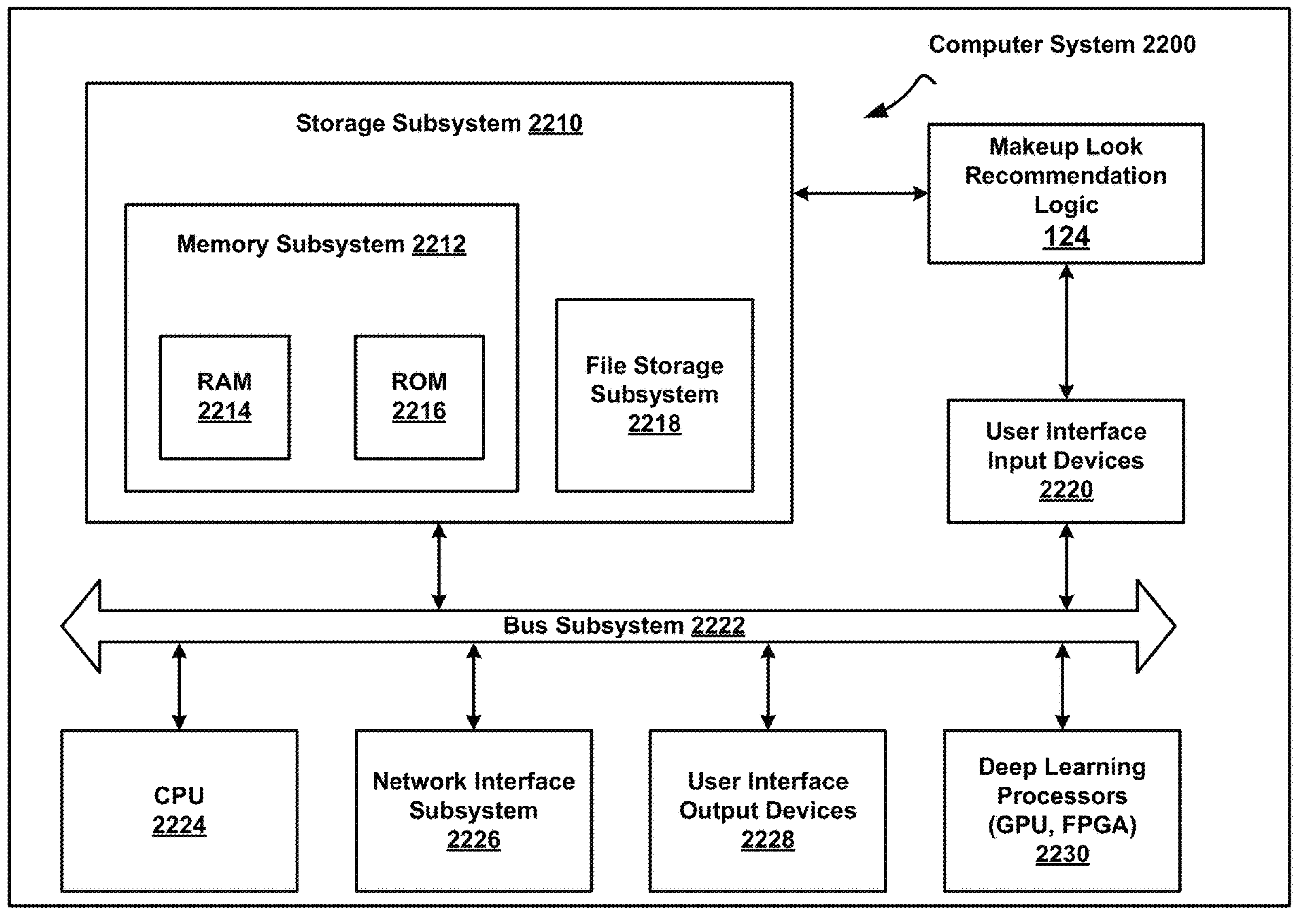
FIG. 22 shows an example computer system that can be used to implement the technology disclosed.

FIG. 22 shows an example computer system 2200 that can be used to implement the technology disclosed. Computer system 2200 includes at least one central processing unit (CPU) 2272 that communicates with a number of peripheral devices via bus subsystem 2255. These peripheral devices can include a storage subsystem 2210 including, for example, memory devices and a file storage subsystem 2236, user interface input devices 2238, user interface output devices 2276, and a network interface subsystem 2274. The input and output devices allow user interaction with computer system 2200. Network interface subsystem 2274 provides an interface to outside networks, including an interface to corresponding interface devices in other computer systems.

In one implementation, the makeup look recommendation logic 124 is communicably linked to the storage subsystem 2210 and the user interface input devices 2238.

User interface input devices 2238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2200.

User interface output devices 2276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2200 to the user or to another machine or computer system.

Storage subsystem 2210 stores programming and data constructs that provide the functionality of some or all of the modules and methods described herein. These software modules are generally executed by processors 2278.

Processors 2278 can be graphics processing units (GPUs), field-programmable gate arrays (FPGAs), application-specific integrated circuits (ASICs), and/or coarse-grained reconfigurable architectures (CGRAs). Processors 2278 can be hosted by a deep learning cloud platform such as Google Cloud Platform™, Xilinx™, and Cirrascale™. Examples of processors 2278 include Google's Tensor Processing Unit (TPU)™, rackmount solutions like GX4 Rackmount Series™, GX22 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 2222 used in the storage subsystem 2210 can include a number of memories including a main random access memory (RAM) 2232 for storage of instructions and data during program execution and a read only memory (ROM) 2234 in which fixed instructions are stored. A file storage subsystem 2236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2236 in the storage subsystem 2210, or in other machines accessible by the processor.

Bus subsystem 2255 provides a mechanism for letting the various components and subsystems of computer system 2200 communicate with each other as intended. Although bus subsystem 2255 is shown schematically as a single bus, alternative implementations of the bus subsystem can use multiple busses.

Computer system 2200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2200 depicted in FIG. 22 is intended only as a specific example for purposes of illustrating the preferred implementations of the present invention. Many other configurations of computer system 2200 are possible having more or less components than the computer system depicted in FIG. 22.

CLAUSES

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

1. A system, comprising:
   - makeup look recommendation logic configured to use a selection of a first makeup look recommendation that is specific to a first rendering environment to generate a second makeup look recommendation that is specific to a second rendering environment; and
   - rendering logic configured to render the first makeup look recommendation in the first rendering environment, and the second makeup look recommendation in the second rendering environment.

2. The system of clause 1, wherein the first rendering environment is a physical world.

3. The system of clause 2, wherein the first makeup look recommendation depicts real-world cosmetics applied on a human face.

4. The system of clause 1, wherein the second rendering environment is an augmented reality world.

5. The system of clause 4, wherein the second makeup look recommendation depicts virtual cosmetics overlaid onto a human face.

6. The system of clause 1, wherein the makeup look recommendation logic is further configured to use the selection of the first makeup look recommendation to generate a third makeup look recommendation that is specific to a third rendering environment.

7. The system of clause 6, wherein the third rendering environment is a metaverse world.

8. The system of clause 6, wherein the third makeup look recommendation depicts computer-generated imagery (CGI) of cosmetics applied on a human avatar.

9. The system of clause 1, wherein the first makeup look recommendation is based on a first set of features.

10. The system of clause 9, wherein the makeup look recommendation logic processes the first set of features as input and produces a second set of features as output.

11. The system of clause 10, wherein the second makeup look recommendation is based on the second set of features.

12. The system of clause 11, wherein the first and second sets of features have at least one overlapping feature.

13. The system of clause 12, wherein the overlapping feature is a makeup color.

14. The system of clause 12, wherein the overlapping feature is a makeup placement area.

15. The system of clause 14, wherein the makeup placement area is a facial region.

16. The system of clause 12, wherein the overlapping feature is an aesthetic vibe.

17. The system of clause 11, wherein the first and second sets are non-overlapping.

18. The system of clause 11, wherein the first and second makeup look recommendations share a cross-environment makeup look fingerprint, wherein the cross-environment makeup look fingerprint renders the first feature set in the first rendering environment, and wherein the cross-environment makeup look fingerprint renders the second feature set in the second rendering environment.

19. The system of clause 9, wherein the makeup look recommendation logic processes the first set of features as input and produces a third set of features as output.

20. The system of clause 19, wherein the third makeup look recommendation is based on the third set of features.

21. The system of clause 20, wherein the first and third sets of features have at least one overlapping feature.

22. The system of clause 21, wherein the overlapping feature is a makeup color.

23. The system of clause 21, wherein the overlapping feature is a makeup placement area.

24. The system of clause 23, wherein the makeup placement area is a facial region.

25. The system of clause 21, wherein the overlapping feature is an aesthetic vibe.

26. The system of clause 20, wherein the first and third sets are non-overlapping.

27. The system of clause 20, wherein the first and third makeup look recommendations share a cross-environment makeup look fingerprint, wherein the cross-environment makeup look fingerprint renders the first feature set in the first rendering environment, and wherein the cross-environment makeup look fingerprint renders the third feature set in the third rendering environment.

28. The system of clause 1, wherein the first makeup look recommendation is a currently selected makeup look recommendation.

29. The system of clause 1, wherein the first makeup look recommendation is a previously selected makeup look recommendation.

30. The system of clause 1, wherein the first makeup look recommendation is a not-yet-selected makeup look recommendation.

31. The system of clause 1, wherein the makeup look recommendation logic is further configured to use a selection of an $n^{th}$ instance of the first makeup look recommendation to generate an $n+_1$th instance of the first makeup look recommendation.

32. The system of clause 1, wherein the makeup look recommendation logic is further configured to use a selection of an $n^{th}$ instance of the second makeup look recommendation to generate an $n+1^{th}$ instance of the second makeup look recommendation.

33. The system of clause 1, wherein the makeup look recommendation logic is further configured to use a selection of an $n^{th}$ instance of the third makeup look recommendation to generate an $n+1^{th}$ instance of the third makeup look recommendation.

34. The system of clause 1, wherein the makeup look recommendation logic is configured to generate the first makeup look recommendation based on at least one user-specified feature.

35. The system of clause 1, wherein the makeup look recommendation logic is configured to generate the second makeup look recommendation based on at least one user-specified feature.

36. The system of clause 1, wherein the makeup look recommendation logic is configured to generate the third makeup look recommendation based on at least one user-specified feature.

37. A computer-implemented method, including:

using a selection of a first makeup look recommendation that is specific to a first rendering environment to generate a second makeup look recommendation that is specific to a second rendering environment; and rendering the first makeup look recommendation in the first rendering environment, and the second makeup look recommendation in the second rendering environment.

38. The computer-implemented method of clause 37, wherein the first rendering environment is a physical world.

39. The computer-implemented method of clause 38, wherein the first makeup look recommendation depicts real-world cosmetics applied on a human face.

40. The computer-implemented method of clause 37, wherein the second rendering environment is an augmented reality world.

41. The computer-implemented method of clause 40, wherein the second makeup look recommendation depicts virtual cosmetics overlaid onto a human face.

42. The computer-implemented method of clause 37, wherein the makeup look recommendation logic is further configured to use the selection of the first makeup look recommendation to generate a third makeup look recommendation that is specific to a third rendering environment.

43. The computer-implemented method of clause 42, wherein the third rendering environment is a metaverse world.

44. The computer-implemented method of clause 42, wherein the third makeup look recommendation depicts computer-generated imagery (CGI) of cosmetics applied on a human avatar.

45. The computer-implemented method of clause 37, wherein the first makeup look recommendation is based on a first set of features.

46. The computer-implemented method of clause 45, wherein the makeup look recommendation logic processes the first set of features as input and produces a second set of features as output.

47. The computer-implemented method of clause 46, wherein the second makeup look recommendation is based on the second set of features.

48. The computer-implemented method of clause 47, wherein the first and second sets of features have at least one overlapping feature.

49. The computer-implemented method of clause 48, wherein the overlapping feature is a makeup color.

50. The computer-implemented method of clause 48, wherein the overlapping feature is a makeup placement area.

51. The computer-implemented method of clause 50, wherein the makeup placement area is a facial region.

52. The computer-implemented method of clause 48, wherein the overlapping feature is an aesthetic vibe.

53. The computer-implemented method of clause 47, wherein the first and second sets are non-overlapping.

54. The computer-implemented method of clause 47, wherein the first and second makeup look recommendations share a cross-environment makeup look fingerprint, wherein the cross-environment makeup look fingerprint renders the first feature set in the first rendering environment, and wherein the cross-environment makeup look fingerprint renders the second feature set in the second rendering environment.

55. The computer-implemented method of clause 45, wherein the makeup look recommendation logic processes the first set of features as input and produces a third set of features as output.

56. The computer-implemented method of clause 55, wherein the third makeup look recommendation is based on the third set of features.

57. The computer-implemented method of clause 56, wherein the first and third sets of features have at least one overlapping feature.

58. The computer-implemented method of clause 57, wherein the overlapping feature is a makeup color.

59. The computer-implemented method of clause 57, wherein the overlapping feature is a makeup placement area.

60. The computer-implemented method of clause 59, wherein the makeup placement area is a facial region.

61. The computer-implemented method of clause 57, wherein the overlapping feature is an aesthetic vibe.

62. The computer-implemented method of clause 56, wherein the first and third sets are non-overlapping.

63. The computer-implemented method of clause 56, wherein the first and third makeup look recommendations share a cross-environment makeup look fingerprint, wherein the cross-environment makeup look fingerprint renders the first feature set in the first rendering environment, and wherein the cross-environment makeup look fingerprint renders the third feature set in the third rendering environment.

64. The computer-implemented method of clause 37, wherein the first makeup look recommendation is a currently selected makeup look recommendation.

65. The computer-implemented method of clause 37, wherein the first makeup look recommendation is a previously selected makeup look recommendation.

66. The computer-implemented method of clause 37, wherein the first makeup look recommendation is a not-yet-selected makeup look recommendation.

67. The computer-implemented method of clause 37, wherein the makeup look recommendation logic is further configured to use a selection of an $n^{th}$ instance of the first makeup look recommendation to generate an $n+1^{th}$ instance of the first makeup look recommendation.

68. The computer-implemented method of clause 37, wherein the makeup look recommendation logic is further configured to use a selection of an $n^{th}$ instance of the second makeup look recommendation to generate an $n+1^{th}$ instance of the second makeup look recommendation.

69. The computer-implemented method of clause 37, wherein the makeup look recommendation logic is further configured to use a selection of an $n^{th}$ instance of the third makeup look recommendation to generate an $n+1^{th}$ instance of the third makeup look recommendation.

70. The computer-implemented method of clause 37, wherein the makeup look recommendation logic is configured to generate the first makeup look recommendation based on at least one user-specified feature.

71. The computer-implemented method of clause 37, wherein the makeup look recommendation logic is configured to generate the second makeup look recommendation based on at least one user-specified feature.

72. The computer-implemented method of clause 37, wherein the makeup look recommendation logic is configured to generate the third makeup look recommendation based on at least one user-specified feature.

73. A non-transitory computer readable storage medium impressed with computer program instructions to:

- use a selection of a first makeup look recommendation that is specific to a first rendering environment to generate a second makeup look recommendation that is specific to a second rendering environment; and
- render the first makeup look recommendation in the first rendering environment, and the second makeup look recommendation in the second rendering environment.

74. The non-transitory computer readable storage medium of clause 73, wherein the first rendering environment is a physical world.

75. The non-transitory computer readable storage medium of clause 74, wherein the first makeup look recommendation depicts real-world cosmetics applied on a human face.

76. The non-transitory computer readable storage medium of clause 73, wherein the second rendering environment is an augmented reality world.

77. The non-transitory computer readable storage medium of clause 76, wherein the second makeup look recommendation depicts virtual cosmetics overlaid onto a human face.

78. The non-transitory computer readable storage medium of clause 73, wherein the makeup look recommendation logic is further configured to use the selection of the first makeup look recommendation to generate a third makeup look recommendation that is specific to a third rendering environment.

79. The non-transitory computer readable storage medium of clause 78, wherein the third rendering environment is a metaverse world.

80. The non-transitory computer readable storage medium of clause 78, wherein the third makeup look recommendation depicts computer-generated imagery (CGI) of cosmetics applied on a human avatar.

81. The non-transitory computer readable storage medium of clause 73, wherein the first makeup look recommendation is based on a first set of features.

82. The non-transitory computer readable storage medium of clause 81, wherein the makeup look recommendation logic processes the first set of features as input and produces a second set of features as output.

83. The non-transitory computer readable storage medium of clause 82, wherein the second makeup look recommendation is based on the second set of features.

84. The non-transitory computer readable storage medium of clause 83, wherein the first and second sets of features have at least one overlapping feature.

85. The non-transitory computer readable storage medium of clause 84, wherein the overlapping feature is a makeup color.

86. The non-transitory computer readable storage medium of clause 84, wherein the overlapping feature is a makeup placement area.

87. The non-transitory computer readable storage medium of clause 86, wherein the makeup placement area is a facial region.

88. The non-transitory computer readable storage medium of clause 84, wherein the overlapping feature is an aesthetic vibe.

89. The non-transitory computer readable storage medium of clause 83, wherein the first and second sets are non-overlapping.

90. The non-transitory computer readable storage medium of clause 83, wherein the first and second makeup look recommendations share a cross-environment makeup look fingerprint, wherein the cross-environment makeup look fingerprint renders the first feature set in the first rendering environment, and wherein the cross-environment makeup look fingerprint renders the second feature set in the second rendering environment.

91. The non-transitory computer readable storage medium of clause 81, wherein the makeup look recommendation logic processes the first set of features as input and produces a third set of features as output.

92. The non-transitory computer readable storage medium of clause 91, wherein the third makeup look recommendation is based on the third set of features.

93. The non-transitory computer readable storage medium of clause 92, wherein the first and third sets of features have at least one overlapping feature.

94. The non-transitory computer readable storage medium of clause 93, wherein the overlapping feature is a makeup color.

95. The non-transitory computer readable storage medium of clause 93, wherein the overlapping feature is a makeup placement area.

96. The non-transitory computer readable storage medium of clause 95, wherein the makeup placement area is a facial region.

97. The non-transitory computer readable storage medium of clause 93, wherein the overlapping feature is an aesthetic vibe.

98. The non-transitory computer readable storage medium of clause 92, wherein the first and third sets are non-overlapping.

99. The non-transitory computer readable storage medium of clause 92, wherein the first and third makeup look recommendations share a cross-environment makeup look fingerprint, wherein the cross-environment makeup look fingerprint renders the first feature set in the first rendering environment, and wherein the cross-environment makeup look fingerprint renders the third feature set in the third rendering environment.

100. The non-transitory computer readable storage medium of clause 73, wherein the first makeup look recommendation is a currently selected makeup look recommendation.

101. The non-transitory computer readable storage medium of clause 73, wherein the first makeup look recommendation is a previously selected makeup look recommendation.

102. The non-transitory computer readable storage medium of clause 73, wherein the first makeup look recommendation is a not-yet-selected makeup look recommendation.

103. The non-transitory computer readable storage medium of clause 73, wherein the makeup look recommendation logic is further configured to use a selection of an $n^{th}$ instance of the first makeup look recommendation to generate an $n+1^{th}$ instance of the first makeup look recommendation.

104. The non-transitory computer readable storage medium of clause 73, wherein the makeup look recommendation logic is further configured to use a selection of an $n^{th}$ instance of the second makeup look recommendation to generate an $n+1^{th}$ instance of the second makeup look recommendation.

105. The non-transitory computer readable storage medium of clause 73, wherein the makeup look recommendation logic is further configured to use a selection of an $n^{th}$ instance of the third makeup look recommendation to generate an $n+1^{th}$ instance of the third makeup look recommendation.

106. The non-transitory computer readable storage medium of clause 73, wherein the makeup look recommendation logic is configured to generate the first makeup look recommendation based on at least one user-specified feature.

107. The non-transitory computer readable storage medium of clause 73, wherein the makeup look recommendation logic is configured to generate the second makeup look recommendation based on at least one user-specified feature.

108. The non-transitory computer readable storage medium of clause 73, wherein the makeup look recommendation logic is configured to generate the third makeup look recommendation based on at least one user-specified feature.

We claim:

1. A system, comprising:

makeup look recommendation logic configured to use a selection of a first makeup look recommendation that is specific to a first rendering environment to generate a second makeup look recommendation that is specific to a second rendering environment; wherein the first makeup look recommendation is based on a first set of features; wherein the makeup look recommendation logic processes the first set of features as input and produces a second set of features as output; wherein the second makeup look recommendation is based on the second set of features; and wherein the first and second makeup look recommendations share a cross-environment makeup look fingerprint, wherein the cross-environment makeup look fingerprint renders the first set of features in the first rendering environment, and wherein the cross-environment makeup look fingerprint renders the second set of features in the second rendering environment; and rendering logic configured to render the first makeup look recommendation in the first rendering environment, and the second makeup look recommendation in the second rendering environment.

2. The system of claim 1, wherein the first rendering environment is a physical world.

3. The system of claim 2, wherein the first makeup look recommendation depicts real-world cosmetics applied on a human face.

4. The system of claim 1, wherein the second rendering environment is an augmented reality world.

5. The system of claim 4, wherein the second makeup look recommendation depicts virtual cosmetics overlaid onto a human face.

6. The system of claim 1, wherein the makeup look recommendation logic is further configured to use the selection of the first makeup look recommendation to generate a third makeup look recommendation that is specific to a third rendering environment.

7. The system of claim 6, wherein the third rendering environment is a metaverse world.

8. The system of claim 6, wherein the third makeup look recommendation depicts computer-generated imagery (CGI) of cosmetics applied on a human avatar.

9. The system of claim 1, wherein the first makeup look recommendation is based on a first set of features.

10. The system of claim 9, wherein the makeup look recommendation logic processes the first set of features as input and produces a second set of features as output.

11. The system of claim 10, wherein the second makeup look recommendation is based on the second set of features.

12. The system of claim 11, wherein the first and second sets of features have at least one overlapping feature.

13. The system of claim 12, wherein the overlapping feature is a makeup color.

14. The system of claim 12, wherein the overlapping feature is a makeup placement area.

15. The system of claim 14, wherein the makeup placement area is a facial region.

16. The system of claim 12, wherein the overlapping feature is an aesthetic vibe.

17. The system of claim 11, wherein the first and second sets are non-overlapping.

18. The system of claim 11, wherein the first and second makeup look recommendations share a cross-environment makeup look fingerprint, wherein the cross-environment makeup look fingerprint renders the first set of features in the first rendering environment, and wherein the cross-environment makeup look fingerprint renders the second set of features in the second rendering environment.

19. A computer-implemented method, including:

using a selection of a first makeup look recommendation that is specific to a first rendering environment to generate a second makeup look recommendation that is specific to a second rendering environment; wherein the first makeup look recommendation is based on a first set of features; processing, by makeup look recommendation logic, the first set of features as input and producing a second set of features as output; wherein the second makeup look recommendation is based on the second set of features; and wherein the first and second makeup look recommendations share a cross-environment makeup look fingerprint, wherein the cross-environment makeup look fingerprint renders the first set of features in the first rendering environment, and wherein the cross-environment makeup look fingerprint renders the second set of features in the second rendering environment; and rendering the first makeup look recommendation in the first rendering environment, and the second makeup look recommendation in the second rendering environment.

20. A non-transitory computer readable storage medium impressed with computer program instructions to:

use a selection of a first makeup look recommendation that is specific to a first rendering environment to generate a second makeup look recommendation that is specific to a second rendering environment; wherein the first makeup look recommendation is based on a first set of features; wherein the computer program instructions further cause processing of the first set of features as input and production of a second set of features as output; wherein the second makeup look recommendation is based on the second set of features; and wherein the first and second makeup look recommendations share a cross-environment makeup look fingerprint, wherein the cross-environment makeup look fingerprint renders the first set of features in the first rendering environment, and wherein the cross-environment makeup look fingerprint renders the second set of features in the second rendering environment; and render the first makeup look recommendation in the first rendering environment, and the second makeup look recommendation in the second rendering environment.

* * * * *